US010192275B2

(12) United States Patent
Smith

(10) Patent No.: US 10,192,275 B2
(45) Date of Patent: Jan. 29, 2019

(54) AUTOMATED REAL ESTATE VALUATION SYSTEM

(71) Applicant: Creed Smith, Denver, CO (US)

(72) Inventor: Creed Smith, Denver, CO (US)

( * ) Notice: Subject to any disclaimer, the term of this patent is extended or adjusted under 35 U.S.C. 154(b) by 523 days.

(21) Appl. No.: 14/673,810

(22) Filed: Mar. 30, 2015

(65) Prior Publication Data

US 2016/0292800 A1 Oct. 6, 2016

(51) Int. Cl.
*G06Q 50/16* (2012.01)
*G06Q 30/02* (2012.01)

(52) U.S. Cl.
CPC ......... *G06Q 50/16* (2013.01); *G06Q 30/0206* (2013.01)

(58) Field of Classification Search
CPC .......................... G06Q 50/16; G06Q 30/0206
See application file for complete search history.

(56) References Cited

U.S. PATENT DOCUMENTS

| | | | |
|---|---|---|---|
| 5,857,174 A | 1/1999 | Dugan | |
| 6,178,406 B1 | 1/2001 | Cheetham et al. | |
| 6,401,070 B1 | 6/2002 | McManus et al. | |
| 6,609,118 B1 | 8/2003 | Khedkar et al. | |
| 7,254,559 B2 | 8/2007 | Florance et al. | |
| 7,389,242 B2 | 6/2008 | Frost | |
| 7,970,674 B2 * | 6/2011 | Cheng ................... | G06Q 10/10 705/35 |
| 8,335,747 B1 * | 12/2012 | Roberts .............. | G06Q 30/0206 705/306 |
| 8,650,067 B1 * | 2/2014 | Moss .................. | G06Q 30/0201 705/306 |
| 2002/0087389 A1 | 7/2002 | Sklarz et al. | |
| 2003/0191723 A1 * | 10/2003 | Foretich ............. | G06Q 30/0283 705/400 |
| 2004/0049440 A1 | 3/2004 | Shinoda et al. | |
| 2005/0154657 A1 | 7/2005 | Kim et al. | |
| 2008/0183597 A1 * | 7/2008 | Veerappan ............. | G06Q 30/00 705/26.1 |
| 2010/0076881 A1 * | 3/2010 | O'Grady ................ | G06Q 40/00 705/35 |
| 2013/0346151 A1 * | 12/2013 | Bleakley .............. | G06Q 10/063 705/7.31 |
| 2014/0279176 A1 | 9/2014 | Taylor et al. | |

(Continued)

*Primary Examiner* — Sujay Koneru
(74) *Attorney, Agent, or Firm* — Marin Patents LP; Gustavo Marin

(57) ABSTRACT

An automated real estate valuation system for a selected specific property, that uses specific property input attributes items and a plurality of primary token features that are disposed within a specific tract of land, in addition, a plurality of recently sold property input data set items and a plurality of secondary token features that are disposed within the same specific tract of land. Sold properties are qualified by being within first and second ranges of first and second matched items to the specific property, wherein common features are removed and remaining features are given a tokenized grouping and weight via an algorithm to explain price per square foot differences between sold properties. These weights are used determine a calculated value of the specific property by determining a calculated value per square foot based upon the weight of the features associated with the specific property.

9 Claims, 38 Drawing Sheets

(56) References Cited

U.S. PATENT DOCUMENTS

2015/0324939 A1* 11/2015 Malaviya ............... H04L 67/20
                                                    705/14.66
2016/0048934 A1*  2/2016 Gross ................. G06K 9/00637
                                                    705/313
2016/0292800 A1* 10/2016 Smith ................ G06Q 30/0206

* cited by examiner

Fig. 31

| Maids Quarters, Midcentury, New Home, Media Room, Backs to Park, Wolf Stove, Subzero Refrigerator, 42 inch Ebony Cabinets, Master Suite | | Nanny's Quarters, Midcentury Modern, Newly Built, Media Room, Backs to Open Space, Viking Stove, Subzero Refrigerator, 42 inch Walnut Cabinets, Master Suite |
|---|---|---|
| Wine Cellar, Terrazzo Flooring, Corian Counters | | Circular Drive, Granite Counters |

Midcentury, Master Suite

Maids Quarters, New Home, Media Room, Backs to Park, Wolf Stove, Subzero Refrigerator, 42 inch Ebony Cabinets, Wine Cellar, Terrazzo Flooring, Corian Counters

Midcentury Modern, Master Suite

Updated, Newer Paint, Newer Carpet, GE Profile Appliances, Concrete Counters

| Q3 | Q2 | Q1 | Q0 | Q-1 | Q-2 | Q-3 |
|----|----|----|----|----|----|----|
| $735k | $675k | $620k | $590k | $550k | $515k | $490k |

Partial Sample of Uniform Residential Appraisal Report

| PROPERTY | SUBJECT | | | COMPARABLE SALE #1 | | | |
|---|---|---|---|---|---|---|---|
| | Description | | | Description | | | +/- adjust. |
| Site | | | | | | | |
| View | | | | | | | |
| Design (Style) | | | | | | | |
| Quality of Construction | | | | | | | |
| Actual Age | | | | | | | |
| Condition | | | | | | | |
| Above Grade | Total | Bdrms. | Baths | Total | Bdrms. | Baths | |
| Room Count | | | | | | | |
| Gross Living Area | | sq. ft. | | | sq. ft. | | |
| Basement & Finished Rooms Below Grade | | | | | | | |
| Functional Utility | | | | | | | |
| Heating/Cooling | | | | | | | |
| Energy Efficient Items | | | | | | | |
| Garage/Carport | | | | | | | |
| Porch/Patio/Deck | | | | | | | |
| Net Adjustment (Total) | | | | ☐ + | ☐ - | | $ |
| Adjusted Sale Price of Comparables | | | | Net Adj. % Gross Adj. % | | | $ |

Prior Art
Fig. 34

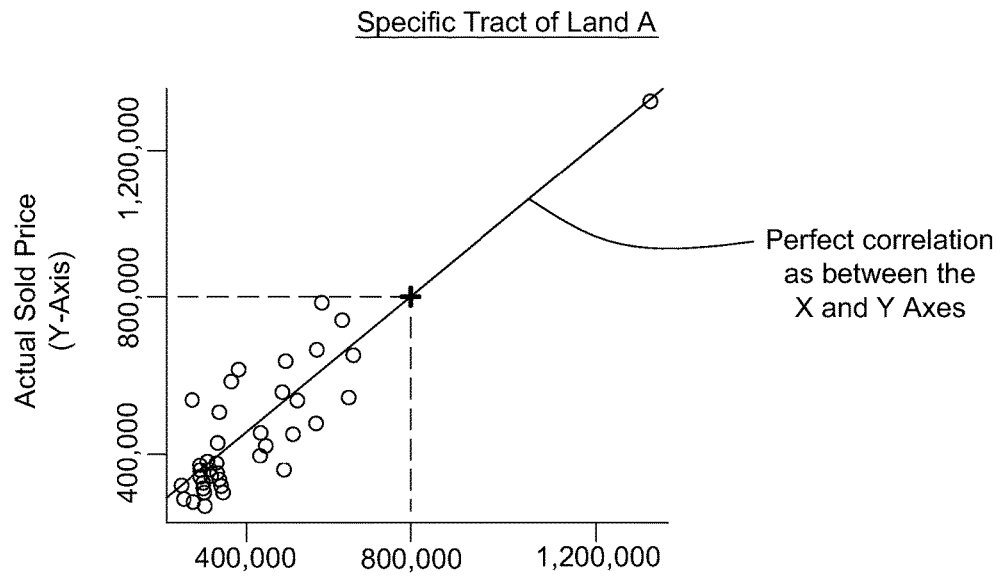
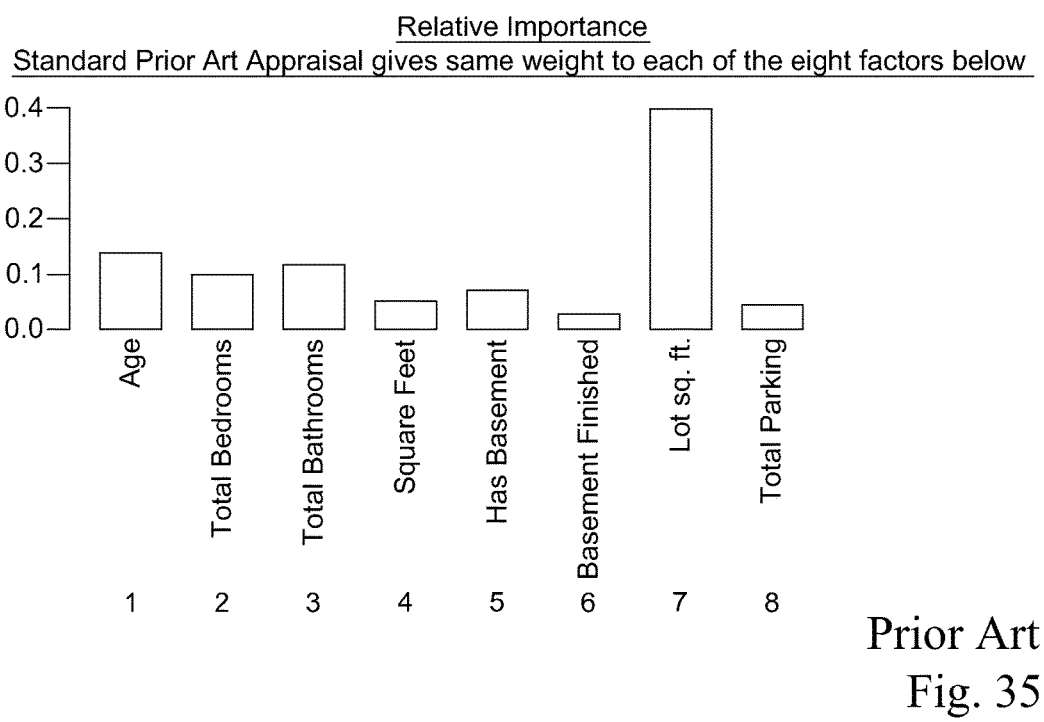
Prior Art
Fig. 35

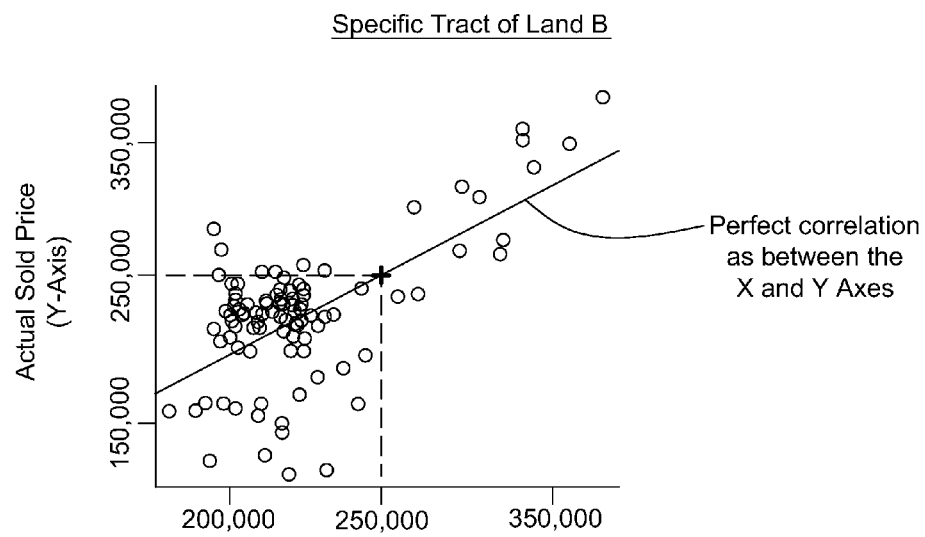
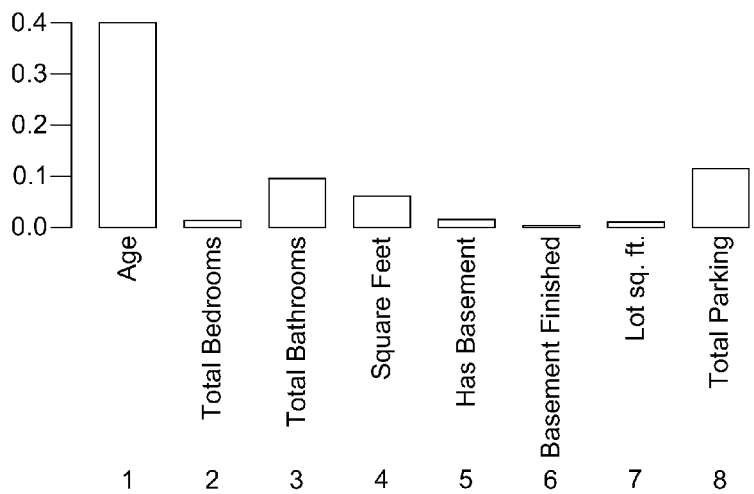
Prior Art
Fig. 36

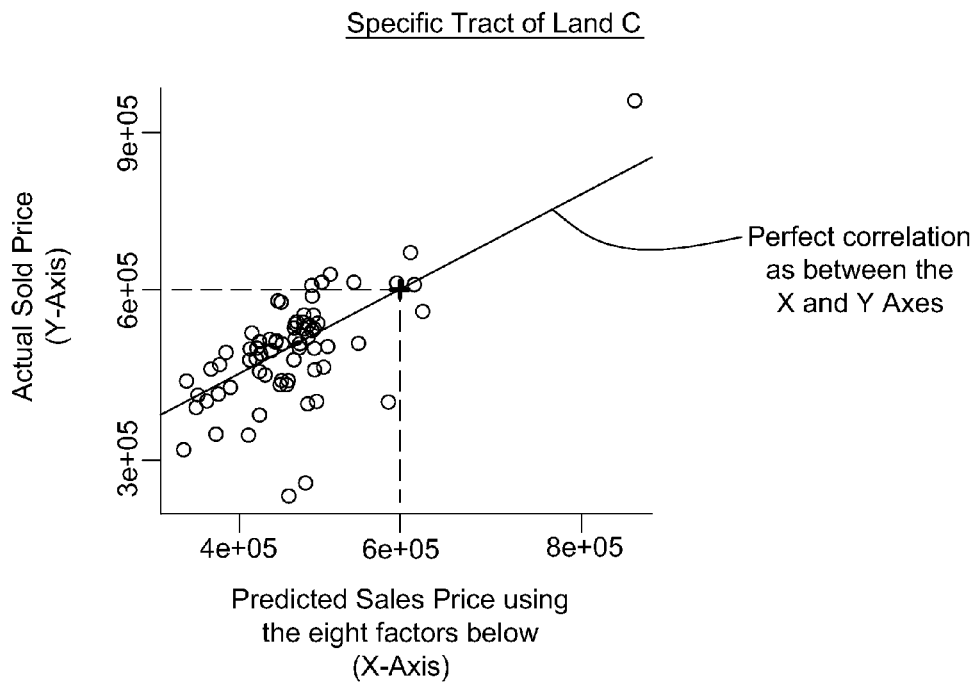
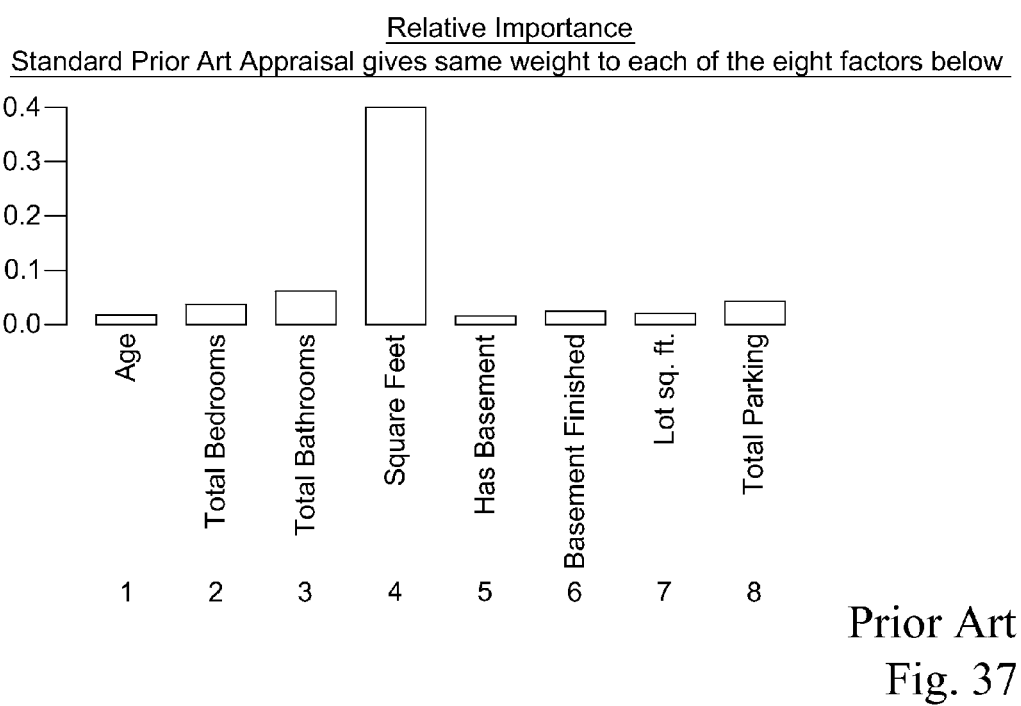
Prior Art
Fig. 37

AUTOMATED REAL ESTATE VALUATION SYSTEM

FIELD OF THE INVENTION

The present invention generally relates to appraisal valuation systems for ascertaining the monetary value of an asset for the purpose of selling, buying, collateralizing, or any other reason for desiring the worth of an asset. More particularly, the present invention presents an automated or routine appraisal valuation system or automated valuation model (AVM) specifically for meeting the needs of assets in real estate. Furthermore, the present invention discloses an automated valuation system which utilizes software to consistently automate the knowledge and skills that a seasoned real estate expert has for a selected geographic area, especially their ability to know exactly which physical, psychological, and other boundaries represent particularly comparable values for a selected piece of real estate. This is accomplished by combining a number of geographically based input attributes in conjunction with additional data from non-geographically based attributes for determining a value for a selected piece of real estate with optional real estate value comparison algorithms for added value to the system user. In addition, the present invention can proactively seek out, evaluate, determine, and inform users of properties within a selected area, further to inform users of properties within a selected spread of a calculated automated value of properties that are between a property list price and the calculated automated value of properties as determined from the valuation algorithm.

DESCRIPTION OF THE RELATED ART

When looking to purchase real estate, whether it is residential or commercial, the intended buyer typically consults a real estate broker/agent, due to their experience in that field and related to a particular geographic area. The broker/agent helps to determine the appropriate property for the buyer with consideration to the buyer's best interest. Before the purchase of real estate can be made, the property must be accurately valued, thus this valuation having a major impact of the potential property purchase decision. Current state of the art within the real estate appraisal or valuation industry runs the gamut of individuals who through time, experience, and training have learned to value real estate within particular geographic areas through the conventional manual real estate appraisal means by an individual of researching the particular geographic area, inspecting the subject property, and then calculating an appraisal value for the particular property typically based on a checklist. This as opposed to the extreme other end of the real estate appraisal process that is represented by wholly automated systems, which attempt to derive a real estate value through a proprietary mathematical formula or series of formulas. These automated real estate appraisal systems further attempt to narrow the parameters for valuing real estate based on subdivision name, size of the property, number of bedrooms, zip code, or census track location, without the direct intervention of individual human experience that appraisers and brokers offer. Although the use of the word "homes" is predominant, within this disclosure, it is to be understood that any type of real estate such as multi unit, both residential and commercial, and all other forms of personal and/or commercial real estate is meant to be included.

Continuing, in looking at more detail at the conventional manual real estate appraiser group that can include dedicated appraisers or real estate brokers/agents who start by personally researching comparable (also known as COMPS) homes that have recently been sold in the immediate area of the subject home to be appraised and also have a limited number of similar features to the subject home (based on a checklist) to be appraised and then these individuals manually investigate/inspect the subject property being appraised to access and conform its particulars, being pluses and minuses of the subject home in relation to the COMPS such as general condition (better or worse shape), added or missing features (extra garage, pool, patios, and the like), and then the appraiser subsequently using experience and personal judgment to arrive at a probable value for the subject home. Thus in the conventional method, appraisers would personally inspect the subject property being valued, manually research COMPS real estate they equate to the inspected property, inspect the neighboring properties and neighborhood the real estate resides in, and attribute all these factors using their experience and personal judgment to determine an appropriate value to appraise the property. However, this method is highly subject to individual discretions and determinations that can alter the value given to the subject property, and is time-consuming as the inspector must travel to the site, appraise the property, examine the neighborhood—past, present, and any future development, record the information, submit the data to the real estate broker, as well as update the records regularly to coincide with the increase or decrease in value of the property. Further, the appraiser typically has knowledge of the sale contract price for the subject home, which can potentially skew or cloud the judicious nature of the subject home appraisal.

With the coming of computers and the internet, a migration of appraising real estate property is starting to become faster and more automated. Computers would define a property according to its zip code, subdivision, or other geographic parameter, with association to physical characteristics of the properties within that area, and determine the property value. Unfortunately, this method holds a high potential level of inaccuracy from grouping a set of properties into one value calculation scheme. For example, a zip code can contain a range of property values that an individual property inspector would allocate, subdivisions can misrepresent a property appearance through their promotional documents, and census blocking isn't designed to group a series of properties based on similar value, comparability, or of similar market demand within an area, and furthermore with the advent of the Global Positioning System (GPS) integrated into computing systems, the GPS can add another criterion by which real estate can be geographically segmented which can be a much finer division geographically and therefore potentially more accurate real estate appraisal segmentation as opposed to the much coarser mailing zip code geographic designation.

Further, continuing with the automated appraisal systems using proprietary mathematical formulas to derive values, such as zillow.com and trulia.com as examples. These fully automated systems attempt to bypass the individual experience and skills of appraisers and brokers/agents and the manual labor involved in the valuation as described above, by utilizing pure mathematical analysis based on location, arbitrary defined by subdivision, size of the property, number of bedrooms, zip code, census track location, the relative physical characteristics of the properties in an area, or other geographic parameters. In looking at the automated valuation model (AVM) in a closer manner, a number of inaccuracies are identified that ultimately result in deviation of the AVM calculated subject real estate value as compared to the actual as sold real estate value, as an example if one were to compare the AVM value for a subject property versus the actual sales value, optimally the AVM value should be within 3-5% of the subject property's actual sales value, preferably being within 3% of the actual sales value for an AVM system having highly reliable validity and reliability aspects. To date the AVM has predicted to within an almost acceptable 5% of actual sales value for the subject property for about one-forth of the properties it is used on, thus leaving three out of four AVM property value predictions considerably off of a 5% error margin, being 25% or more in error which is not acceptable. Thus, the AVM system is fraught with inaccuracies when personal experience and judgment are removed from the appraisal process and is therefore of little economic value due to ranking low on validity and reliability for the AVM appraisal value versus the actual sales value of a selected piece of property. Of course the accuracy of the AVM is no better than the foundational data that it is built upon, plus the data that is it not built upon, such as psychological boundaries, social values, and the like, thus missing data can seriously impair the accuracy of the AVM system further.

For example, in the typical AVM system, utilizing zip codes as a geographic parameter of location is far too coarse or large to accurately value real estate through comparison. A zip code can turn up tremendous ranges of prices even for properties of equal size within any zip code. Subdivision names, while superficially appear to allow for accurate comparable properties can also turn up tremendous ranges of prices for seemingly similarly sized homes. The use of a subdivision name further allows for errors due to misspelled names, duplicate, or similar subdivision names within a metropolitan area, and sometimes intentional misrepresentation of the name of a property's subdivision for the sake of improving its perceived value or status, i.e. being somewhat near a highly desirable area wherein the subject property is not very near to the desirable area.

While the use of census blocks for geographic segmenting in AVM systems, would appear to create valuations based on very small geographic areas and thus be very accurate, in application the opposite is true. Census blocks were created for the purpose of complete compilation of data from homes via a physical search pattern within an area. The goal for use of census blocks was to create a system to locate all homes being physically searched, particularly with limiting the probability of missing a property in a geographic area, and not designed to group a series of properties based on similar value, comparability, or of similar market demand within an area, in addition to the fact that these attributes of similar value, comparability, or of similar market demand within an area are very dynamic and thus the 10 year interval census, even if usable for AVM systems, could become quickly outdated and of little use. Therefore, using census tracks for grouping properties of similar value and/or social status typically creates inaccuracies in spite of their compact size.

While the manual appraisal method of the appraiser/broker/agent group allows for personal involvement, experience, and greater accuracy, however a negative of being dependent upon the individual expertise of the appraiser, it also does not make for an instantaneous or even a quick valuation of the subject property; it certainly is not automated. Moreover, while the AVM group can give an instant valuation, the means by which they determine the acceptability of comparable properties often turns up unacceptably erroneous appraisal values of the subject property. Currently, the manual appraisal method personal touch is more accurate, but slow, and subject to individual appraiser abilities and motivations. Also, currently the fully mathematical and automated system is much quicker, but substantially less accurate or consistent.

Looking at the prior art in this area starting with the use of Global Positioning System (GPS) in the field of real estate directly or indirectly related to the appraisal process, starting with U.S. Pat. No. 7,389,242 to Frost, disclosed is an interactive process for real estate transactions through which one or more providers integrate products (e.g. photographs, documents, property-related data, etc.) into a property file for a parcel of land. In Frost, a user sends a request for supplemental information to be added to a property file. In response, information from the property file is sent to a provider, wherein the provider generates and sends supplemental information to be added to the property file in Frost. Preferably in Frost, the supplemental information is automatically associated and integrated with the property file. A user can thus conveniently in Frost add content to a property file from one or more providers, see column 2, lines 45-57.

Another feature in Frost's invention involves a process through which the GPS coordinates of a parcel of land may conveniently be used to initiate generation of a property file for that parcel. A user in Frost having a GPS receiver obtains the GPS coordinates of the parcel of land during a visit thereto, supplies these GPS coordinates to a server system which responds by identifying the corresponding parcel of land (e.g. by tax ID number), retrieves the information about the parcel from one or more sources, and incorporates this information into a property file that may thereafter be viewed by the user. In one embodiment in Frost's invention, to obtain the GPS coordinates, a user selects a portion of a displayed photographic image (e.g. a satellite photo, aerial photo, etc.) having associated GPS coordinates, and thus initiates generation of the property file even if the user does not know the tax ID or the property address of the parcel, column 3, lines 1-18. Frost claims a process for data transaction and management through a network-style correspondence, wherein property information is submitted from various sources physically collected and compiled into one all-encompassing database. However, Frost's invention only collects the physical limitations of a property without conducting the psychological and emotional boundaries the consumer considers when purchasing real estate. Also Frost's GPS receiver is only taught to be used for locating the property for publically available file records.

Another patent utilizing GPS in real estate marketing is in U.S. Pat. No. 7,254,559 to Florance et al. that discloses a system and method for creating a unified commercial real estate data model through collection, distribution, and use of information in connection with commercial real estate and a web-based marketplace that facilitates the buying and selling of commercial properties, see column 6, lines 21-26. Florance's invention features properties for sale, including correlating content on comparable sales, for-lease space availability, commercial real estate inventory, and market statistics, tenant information, and an image library of building photographs, floor plans, aerials, and maps. Florance also includes background information on buyers, sellers, lenders, owners, principals, and service providers. The system in Florance also allows real estate buyers to review potential deals through a search engine that matches properties for sale with buyer's investment criteria, reference column 6, lines 48-57. The system preferably uses a mobile information-collecting device that is equipped with a GPS system and a link to the databases of the system in Florance.

Florance's device further includes a display screen and input device, and can also include a web camera.

Florance's system is also able to provide location-sensitive real estate information automatically, and to perform other useful tasks by correlating a vehicle's instantaneous position to data stored in a remote database to identify geographically pertinent information and transmitting the geographically pertinent information to the truck for display within the truck. Optionally in Florance, the mobile information-collecting device also includes audio capabilities and the geographically pertinent information includes audio data. Florance's system uses GPS and the internet to coordinate remote field research vehicles equipped with GPS transponders, laptop computers, cellular communications, and laser measurement devices, to provide the more precise and timely inventory of available buildings, reference column 10, lines 14-35. Florance claims a system and method for data transaction, data management, and marketing statistical inventory, to be collected and stored in a database with search engine capabilities. As with Frost, Florance's invention limits itself to the physical aspects of a property without consideration to the psychological and emotional boundaries the consumer considers when purchasing real estate. Thus, the system in Florance is disclosed basically as a comprehensive real estate database, however, with no teaching related to in depth analysis of the data for specific real estate appraisal purposes.

Continuing, in this area of computer integration into the real estate transaction process, looking at U.S. Pat. No. 6,401,070 to McManus et al., disclosed is a system and method for estimating real estate property values based on a repeat sales model by accessing a plurality of properties in a database with a set of property value data corresponding to each of the plurality of properties, wherein each property has two or more property value data. With each property value data in McManus et al., derived from a refinance or a purchase transaction, thus determining property value is based on the set of property values data for the plurality of properties. A time-varying price index in McManus et al., corresponding to the overall change over time of the values of the plurality of properties, wherein the price index takes into account a transaction type bias between the property value data derived from refinance transactions and the property value data derived from purchase transactions, please see column 2, lines 21-34, and the abstract. Although McManus et al., relies on computers to estimate the value of a property using data collected over time on the fluctuation of the property, McManus et al., does not take into account other varying factors such as neighborhood development, retail development, psychological factors, and social status among others, which buyers infer to their purchase, in other words a time attribute is considered within the calculation, however, geographical attributes are not manipulated to refine any appraisal estimates.

Yet another prior art example of computer based real estate property valuation is in U.S. Pat. No. 6,609,118 to Khedkar et al. that offers another approach to property valuation, wherein Khedkar et al. discloses a method and system for automating the valuation process which produces an estimated value of a subject property that is based on the fusion of three processes for valuing property. The first process in Khedkar et al. called LOCVAL, which uses the location and living area to provide an estimate of the subject property's value. The second process in Khedkar et al., called AIGEN, is a generative artificial intelligence method that trains a fuzzy neural network using a subset of cases from a case-base, and produces a run-time system to provide an estimate of the subject property's value. The third process in Khedkar et al., called AICOMP, uses a case-based reasoning process similar to the sales comparison approach (such as the previously discussed COMPS) to determine an estimate of the subject property's value. The fusion of LOCVAL, AIGEN, and AICOMP in Khedkar et al. is claimed to provide a better estimate than any one method alone in providing a way to assess the quality or reliability of the fused property value estimate.

If the reliability in Khedkar et al. is high, the fused estimate is claimed to be more accurate than any of the individual estimates, reference column 1, lines 48-67. If reliability in Khedkar et al. is limited, an explanation is provided as to the limitations of the estimate. These characteristics in Khedkar et al. allow for a determination of the suitability of the estimate within a given business application context, reference column 2, lines 1-4. Using a combination of subject location, subject history, and subject comparison, Khedkar et al., determines a subject property's value. However Khedkar et al., solely relies on artificial intelligence to determine a property value without any human inspection. In Khedkar, essentially three separate property valuation estimates are made and then combined, however, the mere combining of separate estimates does not automatically equate to a more reliable and valid property value estimate, it's the quality of the individual estimates that matters, wherein three bad estimates fused together does not make for a better estimate, as the fused estimate is no better that its three base estimates, further the reliability of each estimate is based upon their differences, not upon a objective criterion.

Continuing in the prior art, another computer implemented method for determining property value is disclosed in U.S. Pat. No. 6,178,406 to Cheetham et al. The method in Cheetham et al., retrieves a set of real estate properties comparable to the subject property from a case base. The comparable properties (COMPS) and the subject properties in Cheetham et al., are characterized by a plurality of common attributes each having a respective value. Each attribute value from the comparable properties in Cheetham et al., are evaluated to the same attribute value of the subject property on a fuzzy preference scale indicating desirable and tolerable deviations from an ideal match with the subject property, and each evaluation generates a preference vector having a value between 0 and 1. A measurement of similarity between each comparable property and the subject property is then determined in Cheetham et al. Next in Cheetham et al., comparable properties are extracted according to a predetermined threshold, and the price of the extracted comparable properties are then adjusted to the value of the subject property by evaluating additional characteristics between the comparable properties and the subject property, somewhat similar to Khedkar as previously described for AICOMP. Comparable properties are then extracted according to predetermined selection criteria in Cheetham et al., where the extracted comparable properties are then aggregated into an estimated price of the subject property, reference column 1, lines 38-67 and column 2, lines 1-3. Cheetham et al., uses a computer implemented method of determining property value by comparable properties without accounting for property location, property history, or human evaluation.

Further, in the prior art in another computer implemented method for determining property value is disclosed in U.S. Pat. No. 7,970,674 to Cheng et al., being a facility procuring information about a particular property from the property owner that is usable to refine an automatic valuation of the particular property, wherein the owner information is used to output a refined property valuation that is based upon the obtained owner input. In Cheng, the owner input on the property (could also be another method user, i.e. one who has specific knowledge of any particulars related to the subject property) is combined with publically available information on the property to produce a more accurate valuation of the property, rather than based upon the publically available information alone, however this system is subject to inaccuracies of the user input resulting in inaccuracies in the value output, meaning that the system is not completely self-contained and thus does not output a truly completely automated real estate value.

Continuing, in the prior art in yet another computer implemented method for determining property value is disclosed in U.S. Pat. No. 5,857,174 to Dugan that discloses both to a manual and computer based method of appraising real estate. In Dugan, FIG. 3 depicts the method going towards FIG. 4 for the general process or FIG. 5 to revise a record wherein the appraiser and the property buyer assign points (termed ideal point system or IPS) based upon desirability factors for five categories of elements for weighting purposes to the that property as a comparable property. Thus in Dugan the appraiser can select a subject property and obtain the IPS values for the seller of the property, wherein the sale price of each comparable property is adjusted based on the relative difference between the total IPS value for the comparable properties and the total IPS value of the subject property. In Dugan, with this the appraiser can average the adjusted sale price of all the comparable properties to be used as an appraised value of the subject property, which can be combined with other appraisal methodologies.

Further, in the prior art in yet another computer implemented method for determining property value is disclosed in United States Patent Application Publication Number 2014/0279176 to Taylor et al., that discloses a system to calculate real estate market conditions within a geographic sub-region that is obtained from a user. In Taylor, stored are what is known a "Comps" or comparable real properties that have a sales history adjacent to or within the sub-region, wherein a value (sold comps) or range of values (for sale comps) is calculated for the subject real property in the sub-region. Also, in Taylor the user inputs physical attributes of the subject property such as square footage, number of bedrooms, bathrooms, and the like, plus estimated property price, wherein a match is made as between user inputs which can be buyers and sellers for similar property physical attributes and estimated property prices.

Further, continuing, in the prior art in yet another computer implemented method for determining property value is disclosed in United States Patent Application Publication Number 2005/0154657 to Kim discloses a condition scoring for a property appraisal system via using information relating to subjective property characteristics plus characteristics of comparable properties and quantifying these characteristics that result in a property appraisal. In Kim, a user may adjust the ranking of comparable properties then apply a weighting value method to the ranked comparable properties with manually input property weights, with default weights available to be saved and reused. Further, in Kim the appraiser may add characteristics to the property to improve the description of the property, to increase the odds of finding additional similar comparable properties. In Kim the user can specify high weight items such as "new furnace", wherein the valuation engine assigns condition points to the furnace condition based upon the estimated cost to build, replace, or renovate, also geographic output is given for relative locations of comparable properties and the subject property.

Next, in the prior art in yet another computer implemented method for determining property value is disclosed in United States Patent Application Publication Number 2004/0049440 to Shinoda et al., discloses a real estate appraisal that includes a map database that relates land value information and urban planning drawing information with use zoning information. Shinoda also uses multiple conditions to help assist in determining a specific land value such as street condition, road access, general environment, applicable regulations, lot shape and scale, plus frontage and depth.

Further, in the prior art in yet again another computer implemented method for determining property value is disclosed in United States Patent Application Publication Number 2002/0087389 to Sklarz et al., that discloses a home value system that collects real estate related data and adjusts the data using trend analysis, comparable market analysis, buy/sell signal analysis and appraisal engines, plus further responding to user inputs to output a property value. Sklarz completes a quick home value estimate in a particular zip code by taking a recent price per square foot and multiplying by respective living area values.

What is needed is a system that attempts to embody the best features of both the conventional manual system of real property appraisal and the Automated Valuation Model (AVM), wherein the conventional manual system can have good accuracy, assuming of course a skilled and competent appraiser, however, with the drawback of the excess amount of time and cost that a manual appraisal takes along with the potential inconsistency (lack of reliability) related to the individual appraiser's abilities as opposed to the AVM system with its consistent, excellent economies of scale, and instantaneous real property valuation results, albeit with the potential for accuracy problems. This of course leads to the need for refining the AVM system input and analysis to better reflect actual real property sales values in comparison to the appraisal values.

The present invention addresses these needs of refinements in AVM system input and analysis, by overcoming the disadvantages disclosed in the referenced prior art, particularly in the realm of defining precise geographic and psychological boundaries in which properties are comparable in value, social status, and demand. This initial step of defining geographically what causes values to change at very specific physical and psychological boundaries are defined broadly here as "tracts". The present invention intends to routinize and systemize this skilled knowledge of local experts to define precise areas for real property valuation, and then utilizes computer models to quickly derive values of properties within each area. Thus, the present invention offers the accuracy of hands-on skilled and competent real estate appraisal valuation professionals, with the speed and convenience of the AVM systems, while simultaneously helping to overcome the shortcomings of each previously described valuation option when used independently.

The aforementioned tracts may be of any shape or size, and may certainly vary from one tract to the next. The shapes, boundaries, and sizes are defined for creating a set of property data to accurately determine value of the properties based on common geographic location, psychological boundaries, social status, and market demand, and particularly to determine potentially under/overvalued properties within any particular tract and of course by its very nature the tract related data is very dynamic and is constantly updated. The present invention utilizes data extracted from multiple listing services (MLSs), county property sales data, and/or other databases tracking real estate sold property information and/or properties actively for sale. The raw information is stored in a database for additional manipulations and calculations.

Longitude and latitude data are attached to each property, and then each property dataset is placed within a specifically defined subset for value calculations and tracking, further defined here as "tracts". These tracts have been initially defined by real estate development filings that are a good starting point for a geographic area based on similarity of properties, homogenization of property values, and social and psychological characteristics in the marketplace affecting demand and value, also reflecting like area amenities such as access to schools, stores, banks, parks, mass transit, and the like. To derive real property values, each set of property data is compared to existing properties within a defined tract, which are currently for sale, along with comparing each property to other sold properties similar to the subject property that are further qualified on similar house structure style, square footage, lot size, etc., in order to determine values in conjunction with subjective factors or the "emotional" features that add or detract from a property's value that are listed in the remarks section of a property description.

Thus in summary, the goals of the present invention include helping to overcome the inconsistencies in manual real property appraisal and the inaccuracies of current AVM systems by initially looking at recently sold properties in the same tract as the subject property, then further qualifying the recently sold properties by having similar structural style, square footage, and lot size, etc.; and then taking into account the subjective descriptive terms from the remarks section of a property listing, wherein the subjective terms are tokenized for analysis and effect upon the sales price. In other words, attempting to explain the actual sold property price through a combination of physical parameters and subjective terms to create a more accurate "buildup" of the actual sold price, which can later be used to access the effect of the subjective terms upon property sold price, i.e. seeing the effects of different subjective terms upon property value changes. Furthermore, another goal of the present invention is to overcome the substantial time period a manual valuation by an appraiser or broker/agent would take by automating the vast majority of steps needed to complete a valuation, and nearly instantly offering the same information via a database and/or the internet. The preeminent goal of the present invention is to more accurately account for not only physical data related to a property, but the psychological and emotional characteristics buyers seek out when purchasing a property and their effect on property value.

SUMMARY OF INVENTION

Broadly, the present invention is of an automated real estate valuation system for a selected specific property, the present invention includes a direct physical selected specific property input attributes database that is existing being affixed to the selected specific property, the attributes database includes a plurality of input attributes that are fixed, tangible, and existing for the selected specific property that is disposed within a specific tract of land. Further included in the automated real estate valuation system is a plurality of primary token features associated with the selected specific property that are within the specific tract of land. In addition, for the automated real estate valuation system included are a plurality of direct physical property input data sets, wherein each of the direct physical property input data sets are defined by sales data for a recently sold property that are existing being affixed to each recently sold property, each input data set includes a plurality of input data that are fixed, tangible, and existing for each recently sold property that is disposed within the specific tract of land. Also for the recently sold properties a group of secondary token feature sets that are each formed from a plurality of secondary token features associated with each recently sold property that is disposed within the specific tract of land.

Continuing for the automated real estate valuation system, included are one or more processors, memory, and one or more programs, wherein the one or more programs are stored in the memory and configured to be executed by the one or more processors, the one or more programs including instructions to locate at least a selected number of recently sold properties that are all disposed within the specific tract of land. The selected number recently sold properties include the direct physical property input data sets, with one input data set for each recently sold property, each input data set for each recently sold property and the selected specific property input attributes database are each further compared to one another to be within a first selected range of a first matched item from each input data set. Further, the input attributes database are each further compared to a second selected range of a second matched item from each input data set to the input attributes database forming a first qualified assemblage of the recently sold properties disposed within the specific tract of land that include a group of secondary token feature sets associated with the recently sold properties in the first qualified assemblage.

Continuing, for the automated real estate valuation system are instructions for utilizing from the first qualified assemblage the group of secondary token feature sets wherein each secondary token feature set is associated with a recently sold property within the first qualified assemblage. Wherein each of the secondary token feature sets as between each of the first qualified assemblage recently sold properties are compared on a matching feature basis, wherein matching features are removed to form a remaining group of first qualified secondary differentiated token feature sets wherein each first qualified secondary token feature set is associated with each recently sold property of the first qualified assemblage. Further, each of a remaining collection of first qualified secondary token features are given a weight to explain differences in input data set items of a third matched item as between the first qualified assemblage recently sold properties via a valuation algorithm.

Next, for the automated real estate valuation system are instructions for determining a calculated output value for the selected specific property by utilizing the weights of the first qualified secondary token features that have the highest number of matching equivalents to the plurality of primary token features forming an equivalent batch portion of the first qualified weighted secondary token features that are used to adjust the third matched item to calculate a value for the third matched item defined as a secondary tokenized value that is applied to the third matched item to output a calculated value for the selected specific property via the valuation algorithm.

These and other objects of the present invention will become more readily appreciated and understood from a consideration of the following detailed description of the exemplary embodiments of the present invention when taken together with the accompanying drawings, in which;

BRIEF DESCRIPTION OF DRAWINGS

FIG. 8 shows a graph for a single tract of land wherein the left side Y axis has the mean sales sold price per square foot, the X axis has genus clusters of primary and secondary token features, and the right side Y axis has the number of occurrences of particular token features in certain sales sold price per square foot ranges, being basically to show at what price level specific token features are prevalent at;

FIG. 11 shows a raw data plot that FIG. 10 is an idealized version of, wherein FIG. 11 shows the change in slope of the sold price per square foot over a range of properties sale prices within a single tract of land using a "K-Means" algorithm to create the horizontal divisions that are parallel to the "X" axis into what is termed "Q-Values" that are basically ranges of sold prices per square foot for various properties within a specific tract of land;

FIG. 31 shows an expanded screen shot of FIGS. 20 and 30 to depict the effects of different Q values upon various groupings of token features that result in value deviations from Q 0, wherein in this particular screen shot Q 2 is highlighted that shows token feature differences that add to the value at Q 0, wherein the box on the left side represents the token feature set for the value at Q 0 and the box on the right represents the token feature set that adds to value Q 0 going to the value at Q 2, wherein the weights that the token features have upon the various Q values as shown are derived from the valuation algorithm that reflect actual property market value influence of the various token features;

FIG. 32 shows the opposite effect of what is shown in FIG. 31 also with an expanded screen shot of FIGS. 20 and 30 to depict the effects of different Q values upon various groupings of token features that result in value deviations from Q 0, wherein in this particular screen shot Q −2 is highlighted that shows token feature differences that detract from the value at Q 0, wherein the box on the left side represents the token feature set for the value at Q 0 and the box on the right represents the token feature set that subtracts from value Q 0 going to the value at Q −2, wherein the weights that the token features have upon the various Q values as shown are derived from the valuation algorithm that reflect actual property market value influence of the various token features;

FIG. 34 shows a prior art sample of a portion of a standard appraisal report that delineates the basic input attributes that apply to the selected specific property and the like grouping of input data that apply to the comparable properties, although additional input attributes and input data could also be included, prior art manual on-site appraisals by an individual appraiser use the basic input attributes and input data in comparing the selected specific property to the comparable properties, which could be termed comparing the fixed tangible physical aspects of various properties to one another, wherein manual appraisal value adjustments are made for differences in the fixed tangible physical aspects of various properties to one another (such as adding or subtracting a set amount from the manual appraisal for different numbers of bedrooms between properties), note that there is no consideration of unique individual property aspects of function/feature/finish/quality/material/groupings that do have a market influence upon property value;

FIG. 35 shows a single tract of land specific group of sales data for a number of sold properties disposed within a single tract of land with the lower bar chart showing the eight typical basic fixed tangible physical aspects of various properties and their relative varying influence upon property price which correlates with the upper plot that shows the deviation of actual property sold prices in relation to the linear sloped line, such that if the eight typical basic fixed tangible physical aspects of various properties are given equal weight for their influence in actual property sold price then the property sold prices would fall on the linear sloped line, however, as shown the deviation of property sold prices from the linear sloped line that is explained by the varying heights of the lower bar charts, wherein for this particular tract of land the lot size had a large price influence and the finished basement had a small price influence;

FIG. 36 is the same setup as FIG. 35 except for a different tract of land that shows a group of sales data for a number of sold properties disposed within the different tract of land with the lower bar chart showing the eight typical basic fixed tangible physical aspects of various properties and their relative varying influence upon property price which correlates with the upper plot that shows the deviation of actual property sold prices in relation to the linear sloped line, noting that the fixed tangible physical aspects of various properties have a differing variance from what is shown in FIG. 35, such that if the eight typical basic fixed tangible physical aspects of various properties are given equal weight for their influence in actual property sold price then the property sold prices would fall on the linear sloped line, however, as shown the deviation of property sold prices from the linear sloped line that is explained by the varying heights of the lower bar charts, wherein for this different tract of land the age of the property had a large price influence and the finished basement had a small price influence, thus as comparing between FIGS. 35 and 36 it can be seen that the influence in sold price of each of the eight fixed tangible physical aspects of the various properties changes depending upon what tract of land the sales data is taken from, meaning that giving each one of the eight fixed tangible physical aspects of the various properties equal weight upon sold price as do prior art manual appraisal methods does not accurately reflect the dynamic importance (tract by tract differences) that buyers place upon each of the eight fixed tangible physical aspects of the various properties in what they will pay for a particular property;

FIG. 37 is the same setup as FIGS. 35 and 36 except for yet another different tract of land that shows a group of sales data for a number of sold properties disposed within the different tract of land with the lower bar chart showing the eight typical basic fixed tangible physical aspects of various properties and their relative varying influence upon property price which correlates with the upper plot that shows the deviation of actual property sold prices in relation to the linear sloped line, noting that the fixed tangible physical aspects of various properties have a differing variance from what is shown in FIGS. 35 and 36, such that if the eight typical basic fixed tangible physical aspects of various properties are given equal weight for their influence in actual property sold price then the property sold prices would fall on the linear sloped line, however, as shown the deviation of property sold prices from the linear sloped line that is explained by the varying heights of the lower bar charts, wherein for this different tract of land the square feet of the property had a large price influence and the age of the property had a small price influence, thus as comparing between FIGS. 35 and 36 it can be seen that the influence in sold price of each of the eight fixed tangible physical aspects of the various properties changes depending upon what tract of land the sales data is taken from, meaning that giving each one of the eight fixed tangible physical aspects of the various properties equal weight upon sold price as do prior art manual appraisal methods does not accurately reflect the dynamic importance (tract by tract differences) that buyers place upon each of the eight fixed tangible physical aspects of the various properties in what they will pay for a particular property.

DEFINITIONS

Agent

Figure 1:
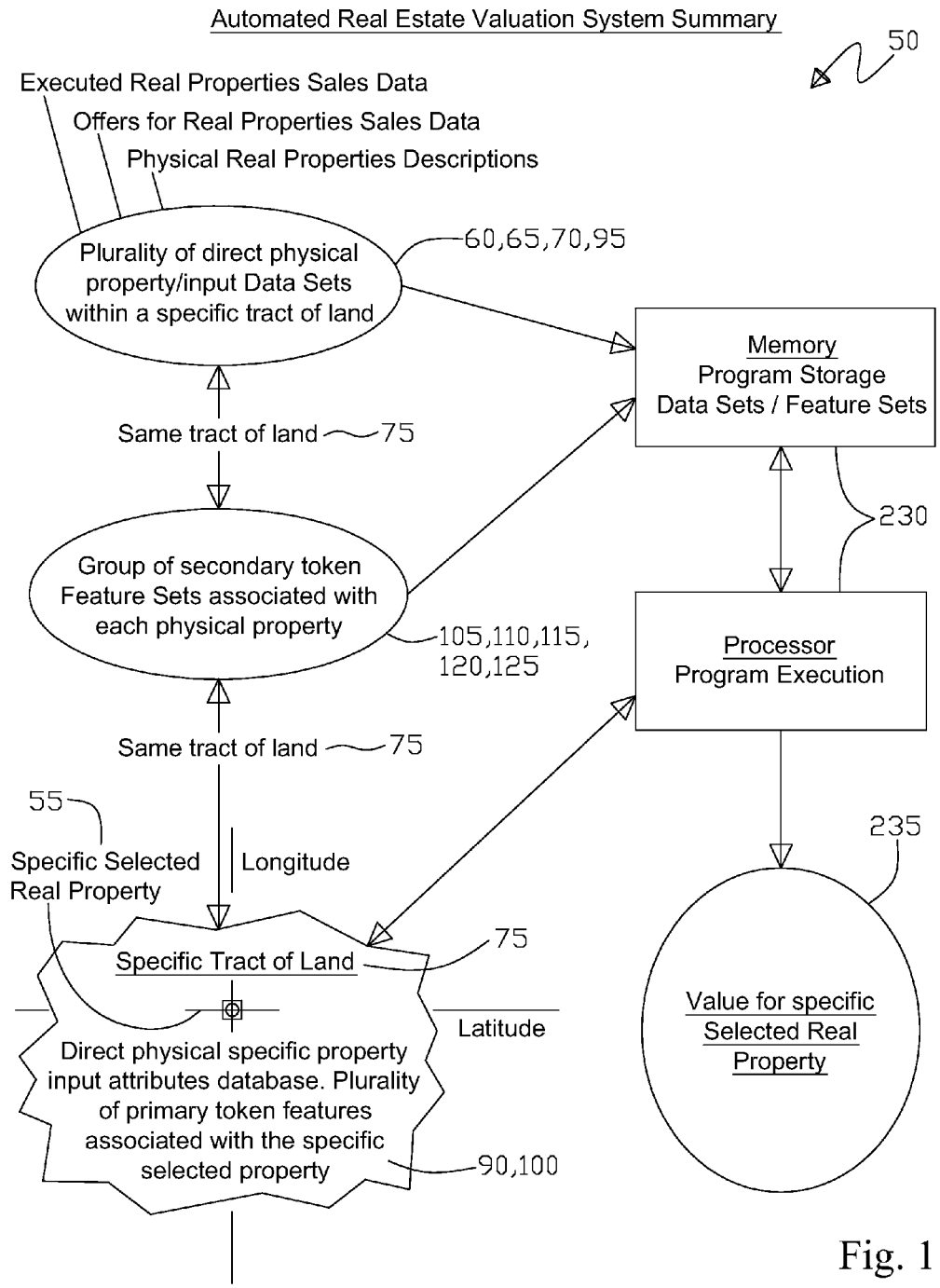
FIG. 1 shows a summary schematic diagram of the automated real estate valuation system that includes the memory, the processor, the selected specific property input attributes, the primary token features, the input data sets, the secondary token features, and the output calculated value for the selected specific property.

An entity who acts as an agent for the seller as a principal to basically do the marketing and promotion of the article or property and arrange for the consummation of the article or property sale.

Automatic Valuation Model (AVM) 50

An automatic property valuation model, system, or process that uses data based values available from numerous sources without the need of an onsite traditional prior art manual property appraisal, wherein property values are determined on a mass basis for multiple properties wholly through an automated system gathering data, processing the data, and outputting a calculated property value, wherein the sole user manual input is what particular property they want a value calculated on. Although the data based values can be specific to a property from databases that reflect direct physical property attributes or input data sets 95 or attributes 90 (bedrooms, bathrooms, etc.), geographically based property attributes (proximity to amenities-banks, stores, etc.) which are common within a specific tract of land 75, and subjective more emotion based token features 100, 105 (finish, materials, appliances, etc.) being the non-geographical property features, all of which play a role in the value of the property 55. In other words, the true AVM is completely self-contained to generate a specific property valuation based on currently available databases without human intervention based solely upon a value manually requested for a specific property by a user.

AVM Output Record

A matrix of specific property 55 valuation 235 outputs recording a series of assumptions for each specific property 55 valuation output 235.

Confidential User Communication Portal

Facilitates user access to the AVM 50 to perform their specific property 55 valuations 235 confidentially.

County

Land area as defined by public records being the county that the specific property 55 is located in.

Credential Protected Portal for User

Limited access to only allow a single user access to their specific account in the user database.

Direct Physical Specific Property Attribute Authentication Module

Using at least two independent sources to confirm a particular specific property 55 item.

Eighth Selected Range 180

An eighth range comparison, being preferably either more than one acre or less than one acre for the property 55, 60,

65, 70 lot size within the specific tract of land 75 and the same criterion for the adjacent 80 or nearby 85 tracts of land, as between an input data set 95 fourth matched item 200 from one selected recently sold property 60 to a fourth matched item 200 from the specific property 55 input attributes database 90. This is to make property 55, 60, 65, 70 comparisons compatible as properties with significant land area are not compared to properties with a city size lot.

Equivalent Batch Portion of the First Qualified Weighted Secondary Token Features 105

The group of weighted first qualified secondary token features 105 that match the primary token features 100 of the selected specific property 55.

Extent=A perimeter defining a particular surface area that can be any shape or any size that is independently derived from data that specifically excludes the direct physical property attributes 90 or input data sets 95, wherein the extent is derived from subjective data 100, 105 that has a selected degree of commonality.

Factions

Figure 10:
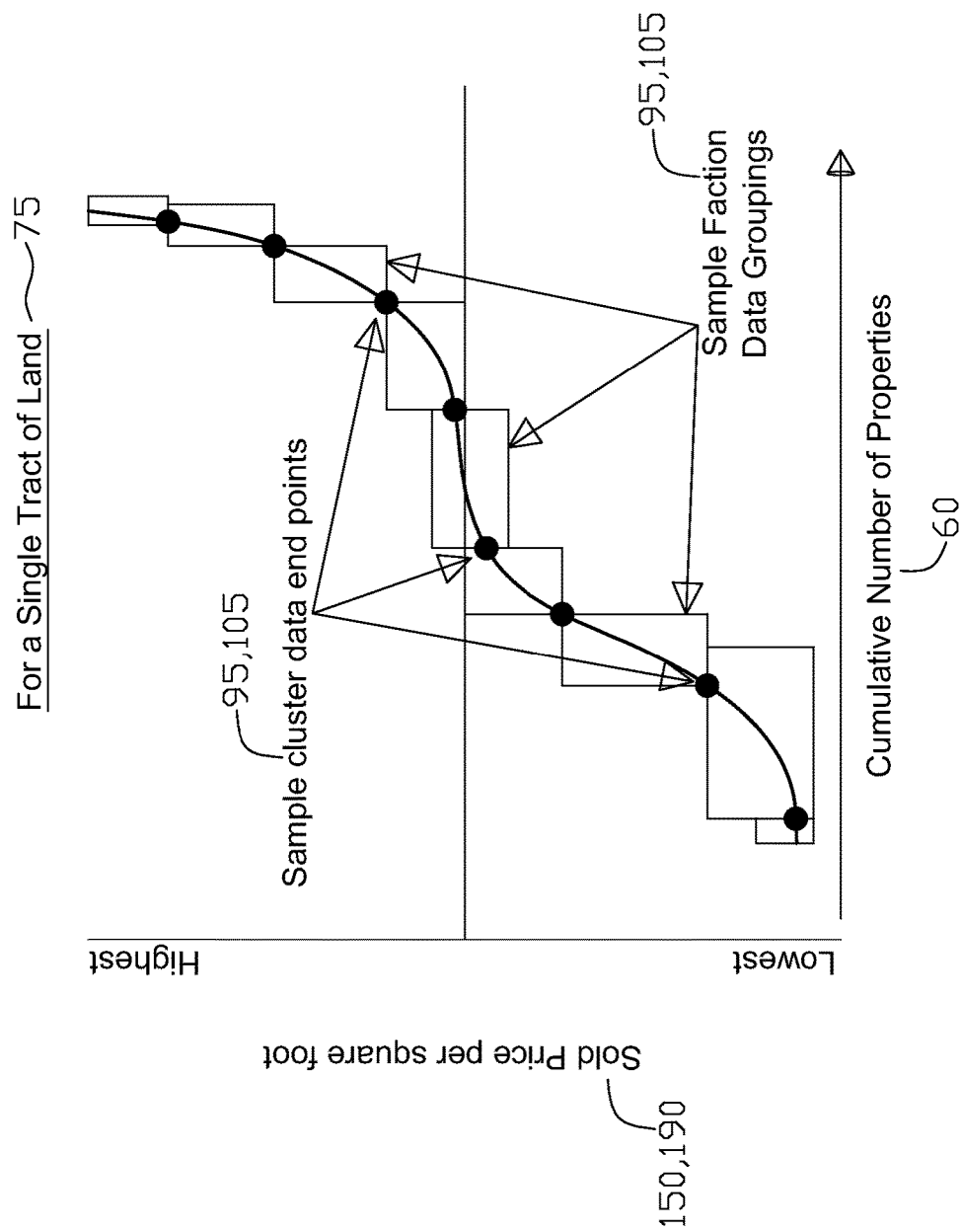
FIG. 10 shows a plot for a single tract of land that is somewhat of a derivative of FIG. 8 that shows the effects of the Y axis changes in sold price per square foot over a sample of recently sold properties that has ranges of sold price per square foot going from low to high, wherein the slope of the curve changes based up the faction groupings which have like groupings of token features, thus again showing the effect of token features upon sold price per square foot.
Figure 11:
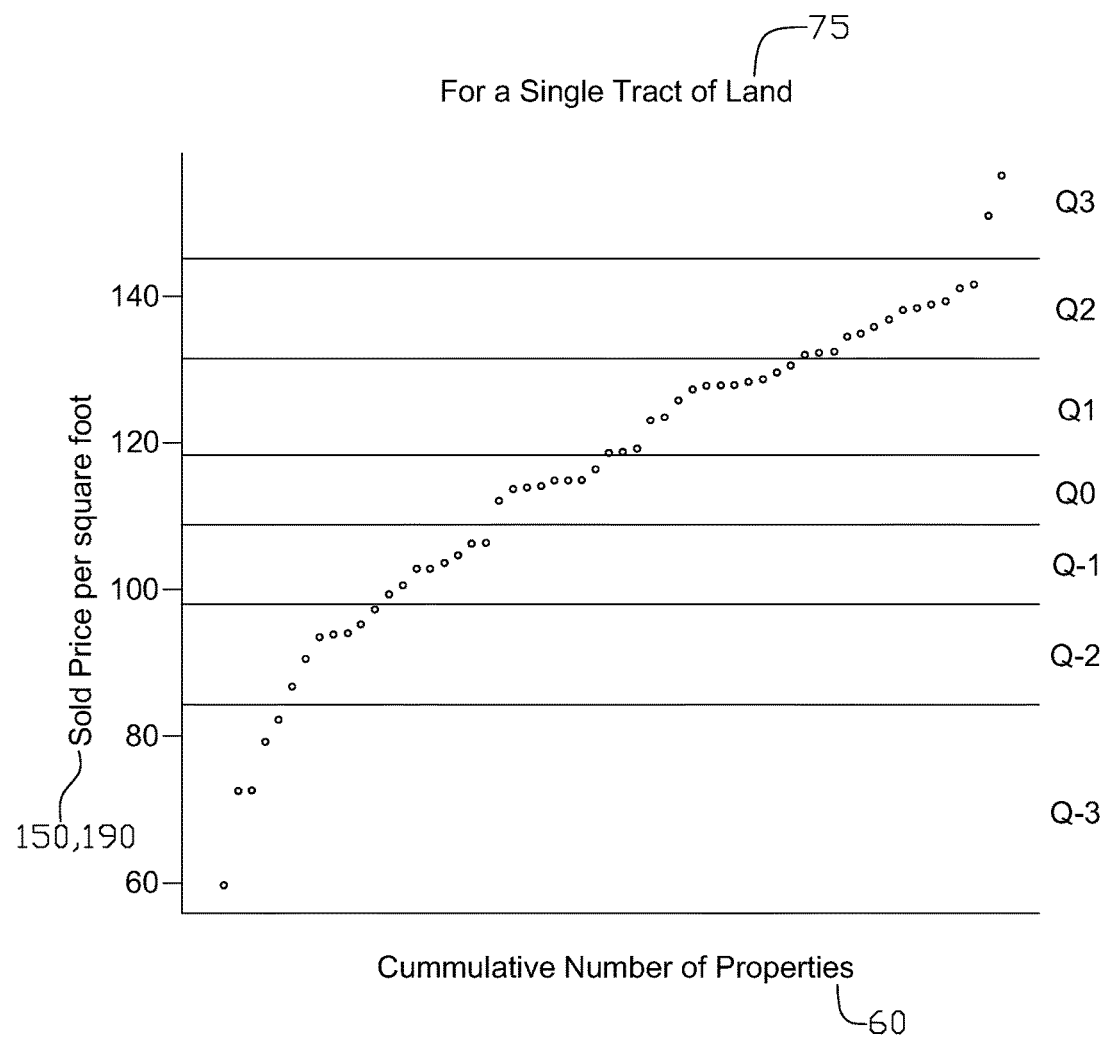

A portion of the varied grouping as determined by the change in sold property 60 price per square foot 150, 190 wherein a faction starts upon a cluster grouping change in sold price per square foot 150, 190 and ends upon a cluster grouping change in sold price per square foot 150, 190 for the purpose of parsing the secondary token feature sets 105 via their influence on sold price per square foot 150, 190 for each recently sold property 60, see FIGS. 10 and 11 in particular. Using "K means" (see definition) or an equivalent means of unsupervised learning algorithm (also known as machine learning) which clusters form from data being the input data sets 95 and the secondary token features 105 from the recently sold properties 60 to sold price per square foot 150, 190 that are clustered into groupings of sold price per square foot 150, 190 often using a centroid method and evaluating the distance between each point (being the sold price per square foot 150, 190) relative to the centroid of the faction (being a sold price per square foot 150, 190) to discover and create natural groupings of data (being the sold price per square foot 150, 190) on the basis of similarity that form each faction.

Fifth Selected Range 165

A fifth range comparison, being preferably less than the second selected range 150 as between an input data set 95 second matched item 190 from one selected adjacent tract 80 recently sold property 60 to a second matched item 190 from the specific property 55 input attributes database 90.

Filing for Real Property in a Subdivision 75

Based on public records that defines a fixed existing surface area that can be any size or shape that is filed initially for construction of the specific property 55 as being one of a group of typically like properties, wherein the specific property 55 is disposed within the filing 75 on a parcel, wherein a filing can be one or more parcels.

First Matched Item 185

Like items that are compared in the first selected range 145 that include an item from the input data set 95 and the input attributes database 90.

First Qualified Assemblage 205

Figure 2:
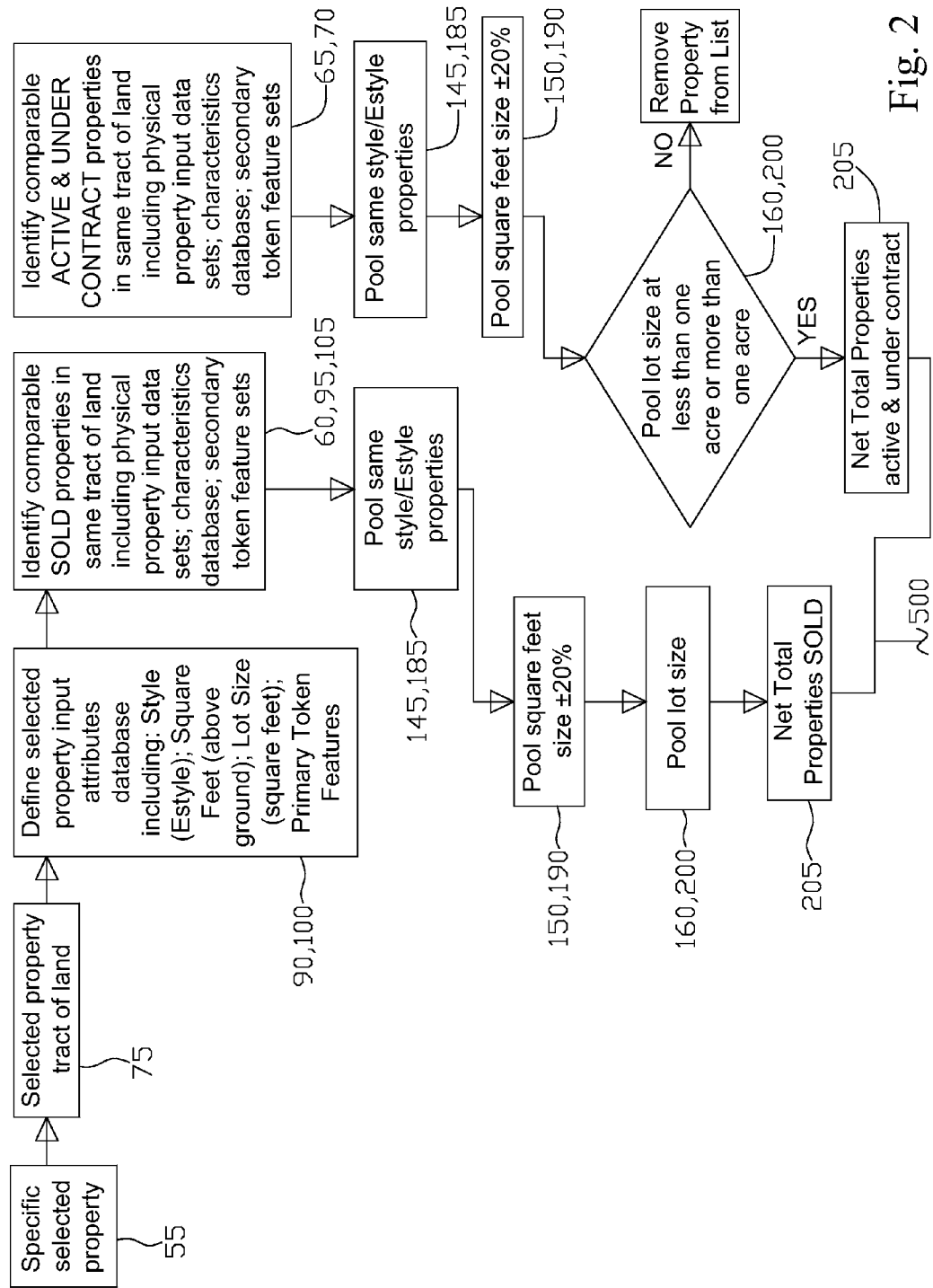
FIG. 2 shows a flowchart schematic starting with the selected specific property that is disposed within a specific tract of land with the selected specific property input attributes database and a step of locating a selected number of recently sold properties in the specific tract of land plus optionally locating actively for sale and under contract properties also within the specific tract of land, wherein the sold or active/contract properties are compared to building style, square footage, and lot size to further qualify into a first qualified assemblage for the comparable properties in the specific tract of land.

A subset of recently sold properties 60 within the specific tract of land 75, wherein each recently sold property 60 is within a first selected range 145 on a first matched item 185 from the input data set 95 and the input attributes database 90 for the selected specific property 55 and are within a second selected range 150 on a second matched item 190 from the input data set 95 and the input attributes database 90 for the selected specific property 55, see FIGS. 1 and 2 in particular.

First Qualified Secondary Token Features

The group of remaining secondary token features 105 as between the properties in the first qualified assemblage 205 after common matching secondary token features 105 are removed.

First Selected Range 145

A first range comparison, being preferably the first matched item 185 that is a grouping of building styles that can include ranch, multi-story, bi-level, split-level, patio home, town house, condo, apartment, and the like from the input data set 95 first matched item 185 from one selected recently sold property 60 to a first matched item 185 from the specific property 55 input attributes database 90.

Fourth Matched Item 200

Like items that do not include the first 185 and second 190 matched items that are compared in the eighth selected range 180 that include an item from the input data set 95 and the input attributes database 90.

Fourth Selected Range 160

A fourth range comparison, being preferably less than the second selected range 150, as between an input data set 95 first matched item 185 from one selected adjacent tract 80 recently sold property 60 to a first matched item 185 from the specific property 55 input attributes database 90.

Input Attributes Database 90 and Input Data Sets 95

A plurality of direct physical selected specific property input attributes 90 forming a database, the input attributes database 90 is existing for the selected specific property 55 that are affixed to the selected specific property 55 and a plurality of direct physical specific property input data sets 95, wherein each data set 95 is associated for each of a plurality of recently sold properties 60, both the input attributes database 90 and the input data sets 95 are fixed, tangible, and existing, both the input attributes database 90 and the input data sets 95 are typically what is called the publically available information on a particular property 55, 60, 65, 70 which can vary, thus can include a portion of, however, not limited to what is listed, depending upon information availability, wherein each one of the following is defined as an item of the input attributes database 90 and input data sets 95;

Address of property.
Age of appliances.
Age of property.
Age of roof.
Aluminum wire.
Building code/permit issues/zoning issues.
Building physical/structural issues such as cracks, settling, or heaving.
Building positional orientation to sun, the street, neighboring properties, and the like.
Carbon monoxide detector system.
Chemical contamination of building.
Condemnation.
Configuration of the property being detached or duplex, three-plex, four-plex, condo, apartment, and/or with basement, i.e. the property type.
Cooling system.
Covenants.
Easements.
Electrical system.
Eminent domain.
Encroachments.

Environmental issues with land including sink holes, contamination, soil composition.
Exclusions.
Flood plane.
General condition of property.
Heating system.
Home Owners Association.
Inclusions.
Insulation levels.
Insurance history.
Leases.
Legal description of the lot.
Liens on the property.
Longitude and latitude of property address.
Lot good and bad features such as; waterfront, adjacent to golf course, horses allowed, adjacent to open space, view, adjacent to park, on dead end street, on busy thoroughfare, adjacent to commercial area, adjacent to industrial area, and the like.
Lot or parcel shape.
Materials of construction of building, roof, walls, foundation, floors, countertops, and the like.
Mineral and other rights.
Mold, water, insect infestation.
Mortgage amount, age, interest rate, and assumable status of each mortgage.
Mortgages that are existing on the property-assumable-wrapable-refinanceable, and the like.
Number of bathrooms.
Number of bedrooms.
Parking spaces-off street, carport, or garage.
Pet free property.
Pipe material.
Property deed type and status.
Property special features such as pool, drive through driveway, RV and/or boat parking, solar, generator, pet friendly, fireplace, sprinkler system, dead end Street, and the like.
Property style being ranch, two story, three story, multi-story, bi-level, tri-level, condo, apartment, patio home, row house, loft, town house, and the like.
Property tax history.
Sales Price history.
Sales price per square foot.
Security system.
Sewer system.
Smoke detector system.
Smoker free property.
Solar.
Square feet of living area.
Square feet of lot if applicable.
Text, photo, video, and audio of the property.
Warranties.
Water system.
Window type.
Jump Terms
Are a subset of the Primary Token Features 100 and Secondary Token Feature Sets 105 that are used for property matching purposes only when the algorithm 230 finds properties that match the selected specific property 55 in so far as matching the input attributes database 90 and the input data sets 95 within the first 145, second 150, third 155, fourth 160, fifth 165, sixth 170, seventh 175, and eighth 180 selected ranges, along with the primary token features 100 and the secondary token features 105 that are matched for finding the matching properties 60, 65, or 70 that are output from the "find similar properties" option shown in FIG. 20. The Jump Terms are the primary token features 100 and the secondary token features 105 that have the most pronounced emotional effect on users desire of the properties 60, 65, or 70 that determine the best matched properties for falling within the first 205, second 210, and third 215 qualified assemblages of properties 60, 65, or 70, thus the jump terms carry a higher emotional buying influence weight in choosing a selected specific property 55. Jump Terms are preselected based upon manual real estate industry experience, wherein the user of the valuation algorithm 230 is not burdened with having to select Jump Terms.
K-Means
As termed k-means clustering, takes data being in this case the sold price per square foot for the properties 55, 60, 65, and 70 from the input attributes database 90 and the input data sets 95 for all properties in the first qualified assemblage 205 for a specific tract of land 75 with the end result of creating groupings termed "Q-Values" in the present invention of sold price per square foot ranges for various properties in the first qualified assemblage 205, see FIGS. 10, 11, 20, 21, and 30. It is assumed that "K-Means" is known in the art of data mining/machine learning as an algorithm.
List Price of Selected Specific Property 55
The asking price for the specific property 55, this may or may not be available.
List Price and Automated Value Difference
A difference in percent as between the list price and the output calculated value 235 for the specific property 55.
List Price Selected Percentage that is Substituted in an Averaging Calculation for the Output Calculated Value 235 for the Specific Property 55
The selected percentage is preferably is less than about fifteen percent.
List Price and Automated Value Difference Expressed as a Selected Percentage
For example if list price is $115,000 and the automated calculated value output 235 is $100,000 then the selected percentage is 15%.
Output Calculated Value 235 for the Selected Specific Property 55
The output calculated value 235 from the AVM 50 for the selected specific property 55 that is self-contained to generate a selected specific property 55 valuation 235 based on currently available databases 90, 95, 100, 105 without human intervention based solely upon a value 235 requested for the selected specific property 55 by a user.
Modified Output Value for the Selected Specific Property 55
An averaging of the list price and the automated calculated value output 235.
Outside Party
An individual or entity who is not an agent, not an owner, and not a seller.
Owner
Owner of record for the specific property 55.
Population Density
In comparing two tracts 75 to 80 to 85 of land the population density shall be within a selected percentage say for instance about 15% as one of the qualifications to use an adjoining tract 80 of land to the specific tract of land 75 in addition to comparing the specific tract of land 75 to the nearby tract of land 85 for population density.
Primary Token Features 100 and Secondary Token Feature Sets 105
These are like groups of features that are associated with both the selected specific property 55 and the recently sold properties 60, properties under sales contract 65, and actively listed properties 70 that are preferably derived from the text and remark 110 sections related to a property listing.

Note that as the "raw" words or slogans 110 that are from the text and remarks section of the property listing often contain duplicates (with one meaning being spelled slightly different ways or with different words meaning a similar thing), market "fluff" or promotional terms, wherein there are not consistent definitional terms used in the text and remarks section of the property listing. Thus, there has to be an indexing 120 or tokenizing of the remarks 110 for the database to be built to organize the remarks into logical groups and the index 120 token is then given a unique dynamic relative weight 125 via the algorithm 230 each time it is run to access the relative importance of the index 120 tokens to one another in influencing the value of a property (note that the weight or influence of an index 120 token varies depending upon the property 55, 60, 65, 70), thus giving a consideration of the remarks influence in the valuation of a property or as could be termed the "emotional" factors that influence the property purchase and the price that will be paid. The result is that groups of remarks termed species of singular words, phrases, or slogans 110, can be consolidated into like function/feature/finish/quality/material/groupings that are termed genus clusters 115, thus varying multiple remarks (species) can make up a single (genus) cluster 115 that have like token genus number identifiers 120. However, sometimes a single species 110 of singular words, phrases, or slogans can make up a single (genus) cluster 115 that can have its own single token index number 120 identifier. The following list is a fairly complete example but by no means completely exhaustive, thus the Primary Token Features 100 and Secondary Token Feature Sets 105 can include none of, or a portion of, however, not limited to what is listed in the following, depending upon information availability, wherein each one of the following is defined as a feature 100, 105 associated with a property 55, 60, 65, 70. Note that for example the "Jump Terms" are shown in bold for the tokenized index identifier.

| Raw Text Remarks/<br>Text Descriptions (species) | Tokenized/Index<br>Identifier (genus) |
|---|---|
| 110 | 115 |
| Cash only | 5001 |
| Land value only | 5001 |
| Scrape | 5001 |
| Structural issues | 5002 |
| Structural problem | 5002 |
| Needs structural work | 5002 |
| Bring tool belt | 5201 |
| Complete fix up | 5201 |
| Diamond in the rough | 5201 |
| Handy man | 5201 |
| Needs complete remodel | 5201 |
| TLC special | 5201 |
| Rough | 5201 |
| Sweat equity | 5201 |
| Investor special | 5203 |
| Investors only | 5203 |
| Tenant occupied | 5204 |
| Renters | 5204 |
| Needs cosmetic | 5206 |
| Needs re-finished | 5206 |
| Needs updated | 5206 |
| A lot of house for the money | 5401 |
| Affordable | 5401 |
| Best deal | 5401 |
| Upside potential | 5401 |
| Low price | 5401 |
| Tremendous value | 5401 |
| Great bones | 5401 |
| Needs carpet | 5403 |
| Needs paint | 5403 |
| Needs appliances | 5403 |

-continued

| Raw Text Remarks/<br>Text Descriptions (species) | Tokenized/Index<br>Identifier (genus) |
|---|---|
| Needs roof | 5403 |
| Architectural | 4001 |
| Discriminating | 4001 |
| Luxurious | 4206 |
| Serene | 4206 |
| Dramatic | 4206 |
| Exclusive | 4207 |
| Immaculate | 4207 |
| Impress | 4207 |
| Spectacular | 4208 |
| Stunning | 4208 |
| Upscale | 4208 |
| Bluestone | 3201 |
| Limestone | 3201 |
| Cherry | 3203 |
| Chesnutt | 3203 |
| Ebony | 3203 |
| Mahogany | 3203 |
| Walnut | 3203 |
| Maple | 3401 |
| Sandalwood | 3401 |
| Teak | 3401 |
| Concrete counter | 3402 |
| Granite counter | 3404 |
| Slab granite | 3404 |
| Steel | 3407 |
| Stone | 3408 |
| Brick | 3603 |
| Copper | 3604 |
| Bronze | 3604 |
| Corian | 3605 |
| Caesar stone | 3605 |
| Silestone | 3605 |
| Slate | 3609 |
| Bulthaup | 2001 |
| Poggenpohl | 2001 |
| William Ohs | 2001 |
| AGA | 2201 |
| Gaggenau | 2201 |
| Subzero | 2201 |
| Viking | 2201 |
| Asko | 2402 |
| Bosch | 2402 |
| Jenn-air | 2402 |
| Commercial grade kitchen | 2403 |
| Gourmet | 2403 |
| Professional kitchen | 2403 |
| New cabinets | 2405 |
| New kitchen | 2405 |
| Five piece bath | 2802 |
| Formal dining | 2803 |
| Caretakers quarters | 1204 |
| Maids quarters | 1204 |
| Nanny quarters | 1204 |
| Grand hall | 1212 |
| Elevator | 1211 |
| Sweeping staircase | 1213 |
| Curved staircase | 1213 |
| Grand staircase | 1213 |
| In ground pool | 1219 |
| Mid-century modern | 1223 |
| Modern | 1223 |
| New construction | 1226 |
| Newly built | 1226 |
| New home | 1226 |
| High ceilings | 1403 |
| Tall ceilings | 1403 |
| Faces golf course | 1410 |
| Fairway | 1410 |
| On hole | 1410 |
| Master suite | 1426 |
| Retreat | 1426 |
| High end finishes | 1432 |
| High end | 1432 |
| Home theatre | 1438 |
| Movie theatre | 1438 |

-continued

| Raw Text Remarks/<br>Text Descriptions (species) | Tokenized/Index<br>Identifier (genus) |
|---|---|
| Surround sound | 1438 |
| Water feature | 1455 |
| Water fall | 1455 |
| Equestrian | 1465 |
| Horses allowed | 1465 |
| Loafing shed | 1465 |
| Backs to green belt | 1601 |
| Back to open space | 1601 |
| Back to park | 1601 |
| View city | 1631 |
| View mountains | 1632 |
| Garage (weight times spaces) | 1801 |
| Move in ready | 1808 |
| Move in | 1808 |
| Move in condition | 1808 |

Q-Value

The selected specific property 55 calculated output value 235 is derived through the valuation algorithm 230 that is preferably the Random-Forest-Regression analysis of all physical characteristics being the input attributes 90 and input data sets 95 (such as square feet size and bedroom count), along with the emotional triggers that are termed the primary 100 and secondary 105 token features as discovered through text analysis comparing a property's text description and inclusions to a tokenized proprietary lexicon of key terms, being the primary 100 and secondary 105 token features initially for all properties in the first qualified assemblage 205 for the specific tract of land 75. The final value output 235 is a dollar value based on all of these factors and their correlation to the sold, under contract, or listing value of properties 60, 65, or 70. Once the calculated dollar value 235 is derived for the selected specific property 55 then it is placed within a specific subset of the range of all calculated values 235 for the specific tract of land 75, referred to as a QValue, see FIGS. 10, 11, 20, 21, and 30. The total range of all base values (wherein the calculated output value 235 is derived from) per square foot for each property 60, 65, and/or 70 is analyzed through the K-Means algorithm to determine a series of clusters along the range of values 235, see FIGS. 10, 11, 20, 30, 31, and 32. These resulting clusters are each referred to as QValues, which may range in number from three to eleven based on the volume of properties 60, 65, or 70 within the total set analyzed and the spread of the gross range of calculated values per square foot of the properties 60, 65, or 70.

Recently Sold Property 60

Preferably a property that has sold within the last eighteen months that is located or disposed within the tract 70 of the specific property 55 or in addition an adjoining 80 or nearby 85 tract(s).

Sales Data

Sold price, ratio of sold price to listing price, time on market, financing required, or cash deal for the recently sold property 60.

Second Matched Item 190

Like items that do not include the first matched item 185 that are compared in the second selected range 150 that include an item from the input data set 95 and the input attributes database 90.

Second Qualified Assemblage 210

A subset of recently sold properties 60 within the adjacent tract of land 80, wherein each recently sold property 60 is within a fourth selected range 160 on a first matched item 185 from the input data set 95 and the input attributes database 90 for the selected specific property 55 and are within a fifth selected range 165 on a second matched item 190 from the input data set 95 and the input attributes database 90 for the selected specific property 55.

Second Selected Range 150

A second range comparison, being preferably about plus or minus twenty percent as between an input data set 95 second matched item 190 from one selected recently sold property 60 to a second matched item 190 from the specific property 55 input attributes database 90.

Secondary Token Feature Sets that are First Qualified

Secondary token features 105 that are remaining as between recently sold properties 60 in the first qualified assemblage 205 after matching secondary token features 105 as between recently sold properties 60 in the first qualified assemblage 205 are removed.

Secondary Tokenized Value

A calculation of the third matched item 195 into a single composite value based upon the equivalent batch portion of the first qualified weighted secondary token features 105, this is where the sold properties 60 price per square foot differences are explained via the secondary token features 105 weights that are in the first qualified assemblage 205, wherein these secondary token features 105 are then matched to the primary token features 100 to determine the calculated output value 235 for the specific property 55.

Selected Number of Recently Sold Properties 60

Preferably this would be at least five properties sold within the last eighteen months.

Selected Number of Adjacent Tract of Land 80 Sold Recently Sold Properties 60

Preferably this would be equal to at least five properties sold 60 within the last eighteen months less the number of properties sold 60 within the last eighteen months in the specific tract of land 75.

Selected Number of Nearby Tract of Land 85 Sold Recently Sold Properties 60

Preferably this would be equal to at least five properties sold 60 within the last eighteen months less the number of properties sold 60 within the last eighteen months in the adjacent tract of land 80 and less the number of properties sold 60 within the last eighteen months in the specific tract of land 75.

Seller

Owner of record for the selected specific property 55, wherein the selected specific property 55 is for sale.

Selected Specific Property 55

The property that the automated value model 50 is directed to for producing a calculated value 235.

Seventh Selected Range 175

A seventh range comparison, being preferably less than the fourth selected range 160 as between the input data set 95 second matched item 190 from one selected nearby tract 85 recently sold property 60 to a second matched item 190 from the specific property 55 input attributes database 90.

Sixth Selected Range 170

A sixth range comparison, being preferably less than the fourth selected range 160, as between an input data set 95 first matched item 185 from one selected nearby tract 85 recently sold property 60 to a first matched item 185 from the specific property 55 input attributes database 90.

Third Matched Item 195

Like items that are compared in the third selected range 155 that are derived as a comparison index such as sales (sold) price per living area square foot for each recently sold property 60.

Third Qualified Assemblage 215

A subset of recently sold properties 60 within the nearby tract of land 85, wherein each recently sold property 60 is within a sixth selected range 170 on a first matched item 185 from the input data set 95 and the input attributes database 90 for the selected specific property 55 and are within a seventh selected range 175 on a second matched item 190 from the input data set 95 and the input attributes database 90 for the selected specific property 55.

Third Selected Range 155

A third comparison as between an input data set 95 third matched item 195 from one selected recently sold property 60 to a matching input data set 95 third matched item 195 from another selected recently sold property 60.

Tract of Land Basic Definition 75

A perimeter border defining a particular land surface area that can be any shape or any size that is independently derived from data that preferably is based on what is termed a "filing" for real property. Note that for the source code section of this application, tracts of land are defined as "Polygons". The tract of land 75 typically includes common elements that are external to the properties 55, 60, 65, or 70 such as;

Amenity elements nearby such as schools, shopping, grocery, restaurants, gas stations, banks, post office, building supplies, parks, public transit, and churches.

Area desirability elements.

Crime elements.

Demographic elements including population density.

Financial elements such as mortgage credit available; such as, mortgages are easy to obtain, mortgages are moderate to obtain, mortgages are difficult to obtain.

Neighborhood elements such as hilly, mountains, flat, creeks, rivers, lakes, ocean, golf course, and lake/ocean front, walkability, bicycle friendly, and the like.

Trendy area elements-having notable residents.

Weather related elements.

Tract of Land Specific 75

The tract of land that the specific property 55 is located or disposed within.

Tract of Land Adjacent or Adjoining that is Qualified 80

The tract of land that is the closest to the specific tract of land 75, or in the same county as the specific tract of land, or has a population density that is within a selected population density range being preferably within plus or minus ten percent, of a population density of the specific tract of land 75, or in other words the qualified adjacent or adjoining tract of land 80 has the highest number of matching elements as defined in the basic tract of land definition as the specific tract of land 75. Further evaluated are the subdivision names as between the specific tract of land 75 and the adjacent tract of land 80, if the subdivision names do not match then the above criterion is used, if the subdivision names do match the adjacent tract of land 80 is given a priority in qualification.

Tract of Land Nearby that is Qualified 85

The tract of land that is the closest to the adjacent tract of land (however, not being adjacent or in contact with the specific tract of land 75), or in the same county as the specific tract of land 75, or has a population density that is within a selected population density range being preferably less than plus or minus ten percent, of a population density of the specific tract of land 75, or in other words the qualified nearby tract of land 85 has the highest number of matching elements as defined in the basic tract of land definition as the specific tract of land 75. Further evaluated are the subdivision names as between the specific tract of land 75 and the nearby tract of land 85, if the subdivision names do not match then the above criterion is used, if the subdivision names do match the nearby tract of land 85 is given a priority in qualification.

User

Can be an agent, an owner, a seller, a buyer, or an outside party.

Valuation Algorithm 230

Is preferably a Random Forest Regression, that starts with Random Forests, it is the ensemble learning method for classification, regression, and other tasks, that operate by constructing a multitude of decision trees at training time and outputting the class that is the mode of the classes (classification) or mean prediction (regression) of the individual trees, wherein in this particular case is for regression. The valuation algorithm can output the selected specific property value based upon matching the input attributes database 90 and the input data sets 95 within the first 145, second 150, third 155, fourth 160, fifth 165, sixth 170, seventh 175, or eighth 180 selected ranges, along with the primary token features 100 and the secondary token features 105 being matched, thus as a result the algorithm 230 finds properties 60, 65, or 70 that match the selected specific property 55 in so far as matching the input attributes database 90 and the input data sets 95 along with the primary token features 100 and the secondary token features 105 for finding the matching properties 60, 65, or 70 that are output from the "find similar properties" option shown in FIG. 20. It is assumed that "Random Forest Regression" is known in the art of data mining/machine learning as an algorithm.

Value Calculated of the Specific Property 235

This is the bottom line result for the program or system in attempting to give an automated value-solely based on a user inputting a specific address, wherein the automated value is generated in a totally self-contained manner being highly accurate via accounting for numerous factors 100, 105 that are in addition to the traditional physical property descriptions 90, 95 for the specific property 55.

Varied Grouping

Defined as a range of sold prices per square foot for all properties 60, 65, or 70 in the first qualified assemblage 205 or as required in the first 220 or second 225 combined qualified assemblages.

Weight of First Qualified Secondary Token Features 105

The tokens are divided into a plurality of genus cluster categories 115 wherein each token 105 equated into an index 120 is given a weight factor to vary that token's 105 influence upon the explanation of sales data differentials 60, 65, or 70 within the qualified assemblage groups 205, 220, or 225 and upon the value calculated 235 for the specific property 55, the weighting factor is dynamically determined by the valuation algorithm 230 for each run.

REFERENCE NUMBERS IN DRAWINGS

Figure 3:
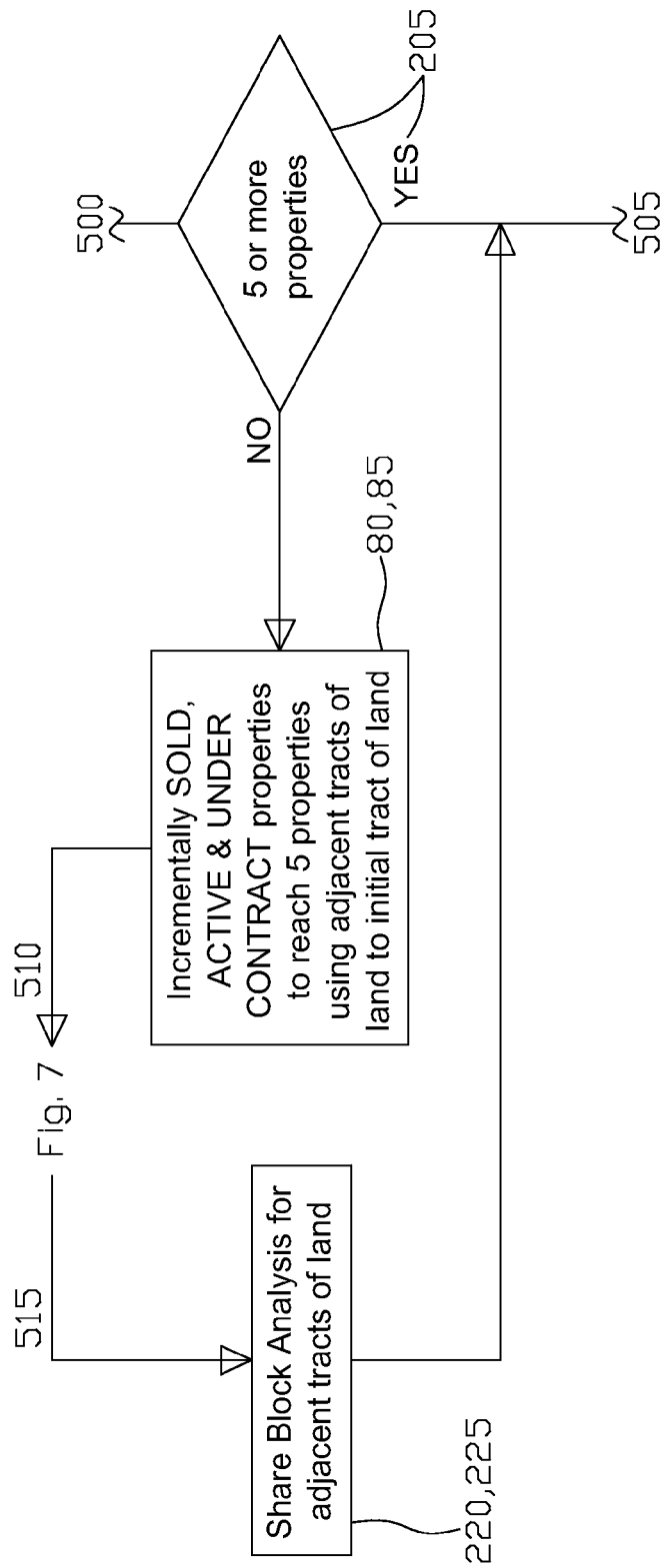
FIG. 3 flows from FIG. 2 to determine if five or more properties are qualified, and if not then looking toward adjacent or nearby tracts of land.
Figure 4:
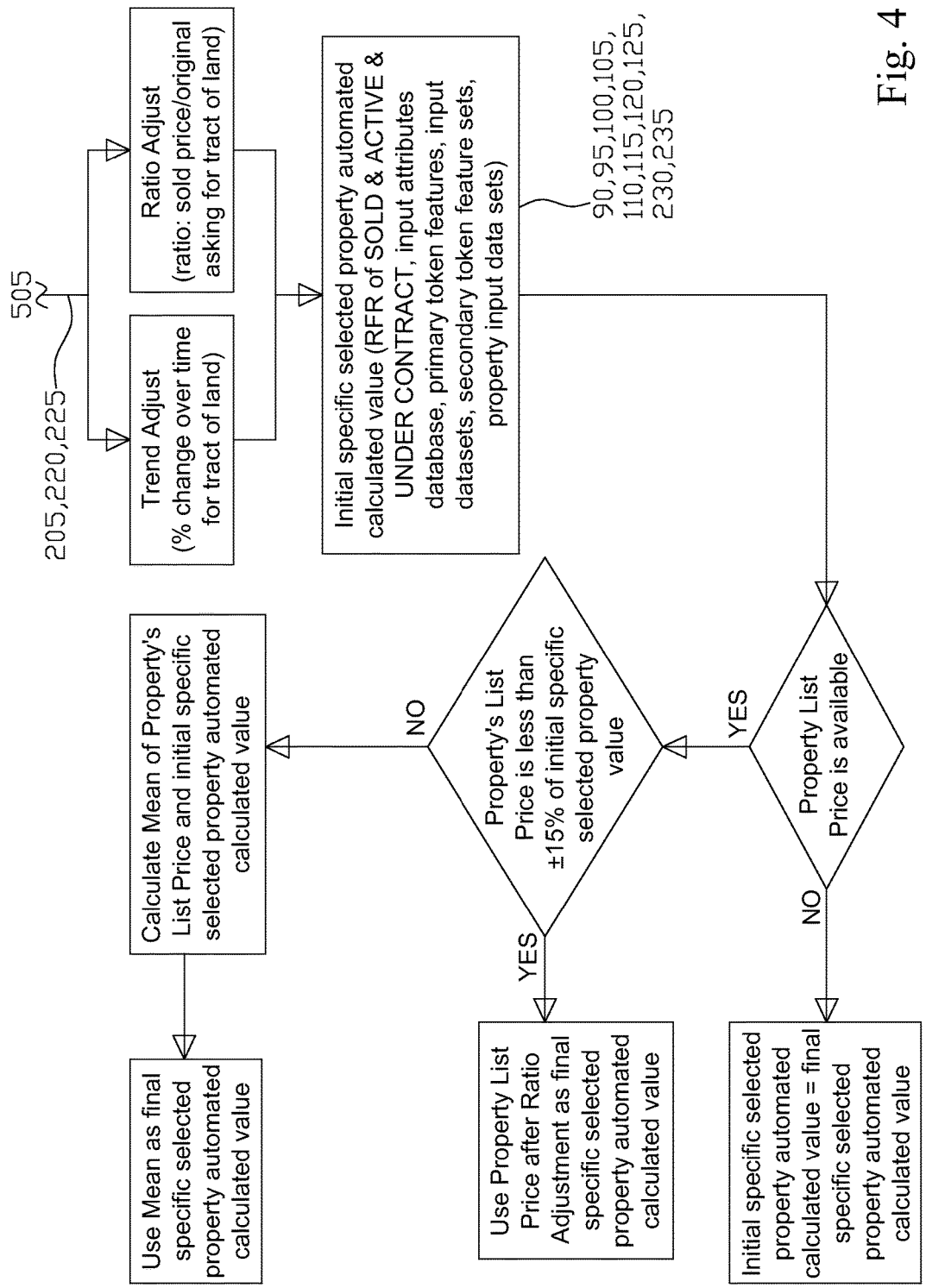
FIG. 4 flows from FIG. 3 if five or more properties are qualified into the first qualified assemblage wherein a trend adjustment is made for price change over time and a ratio adjustment is made for sold price to original asking price, wherein the automated real estate valuation system calculates a value for the selected specific property using the input attributes, primary token features, input data sets, and secondary token features, further if a list price is available for the selected specific property it would be used to adjust the calculated value depending upon the difference as between the list price and the calculated value.
Figure 5:
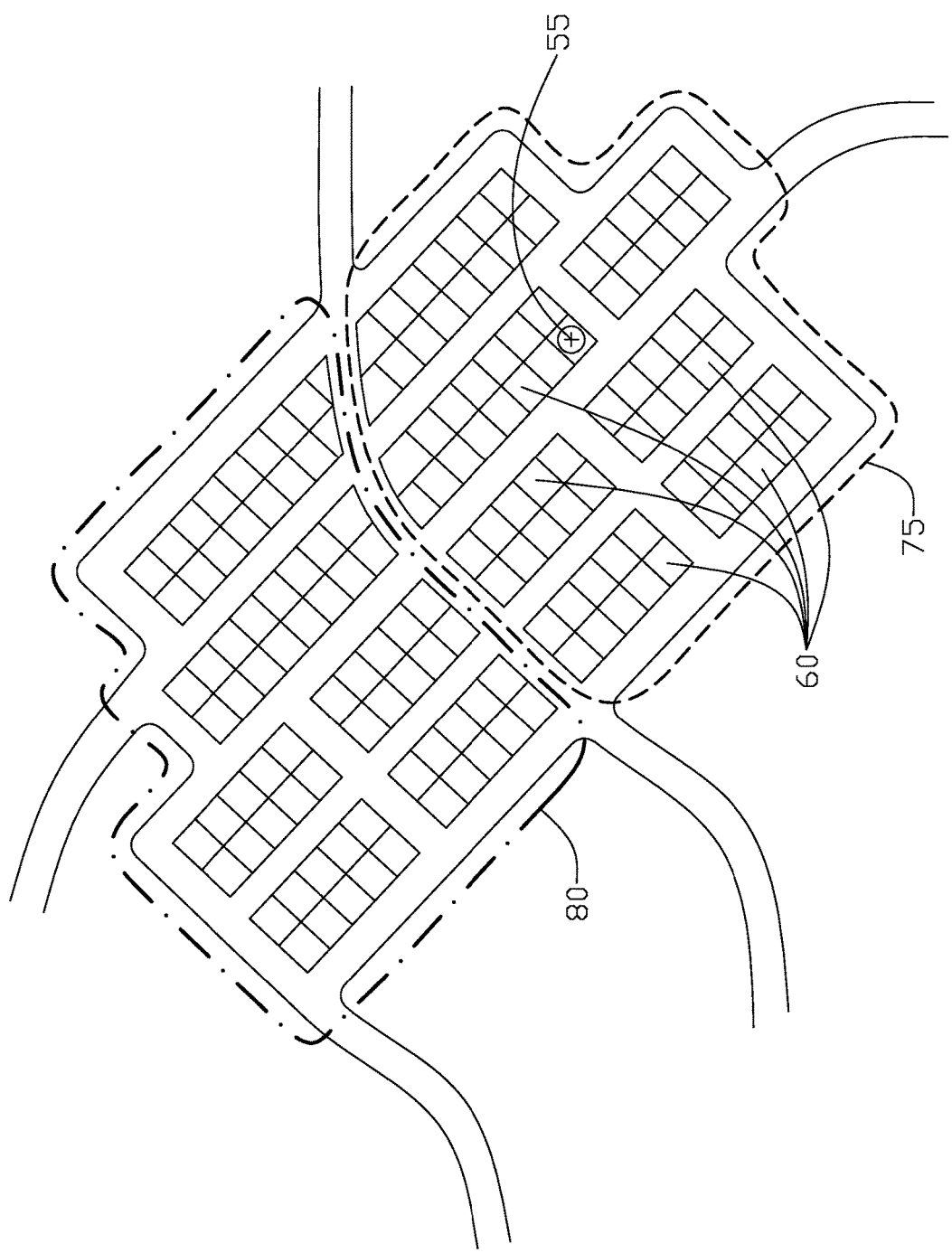
FIG. 5 shows a plan view of the specific tract of land and an adjacent tract of land, wherein house lots and streets are also shown.
Figure 6:
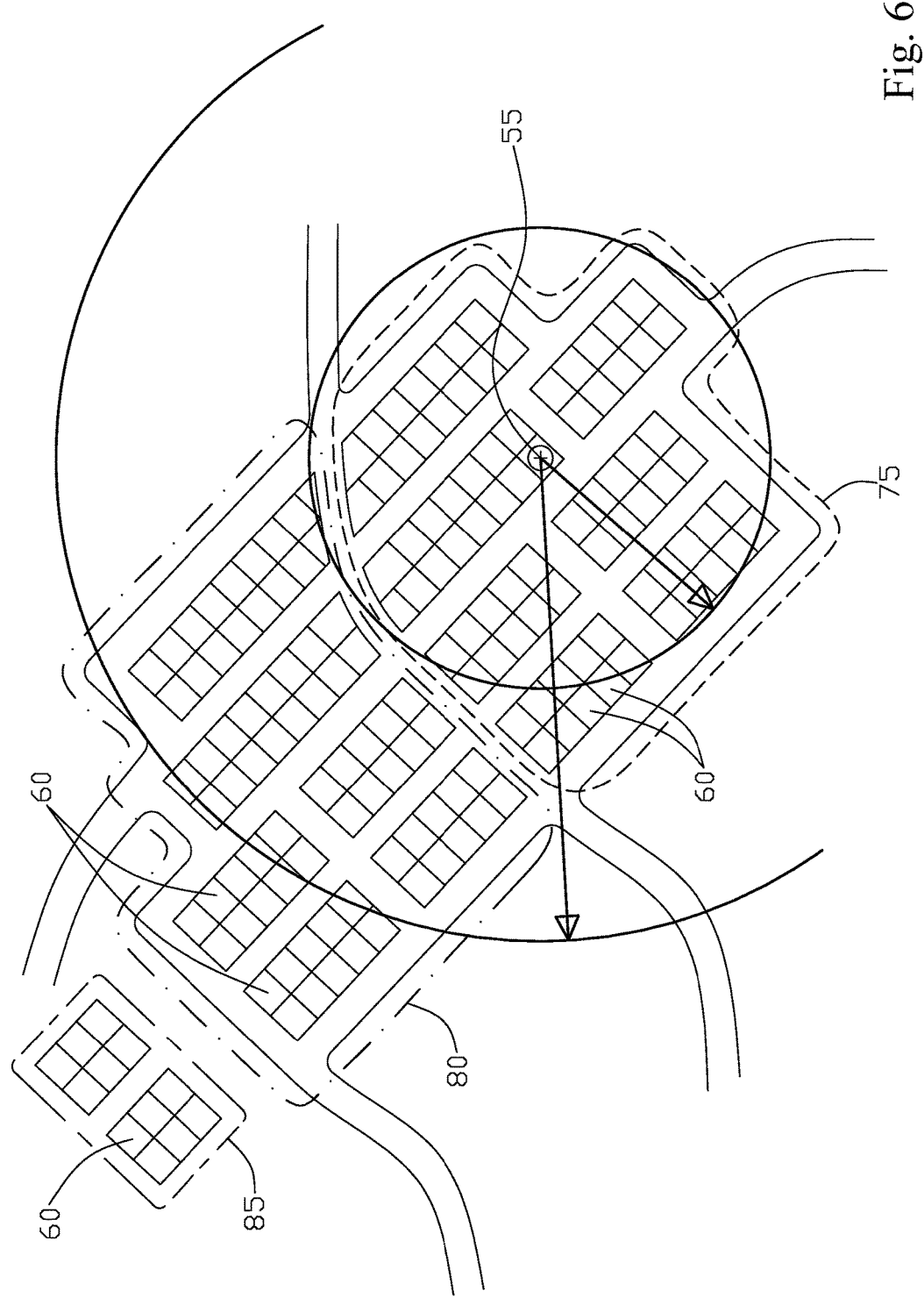
FIG. 6 basically shows FIG. 5 with the addition of a radius emanating from the selected specific property outward to ascertain for qualification an adjacent tract of land or a nearby (non-adjacent) tract of land.
Figure 7:
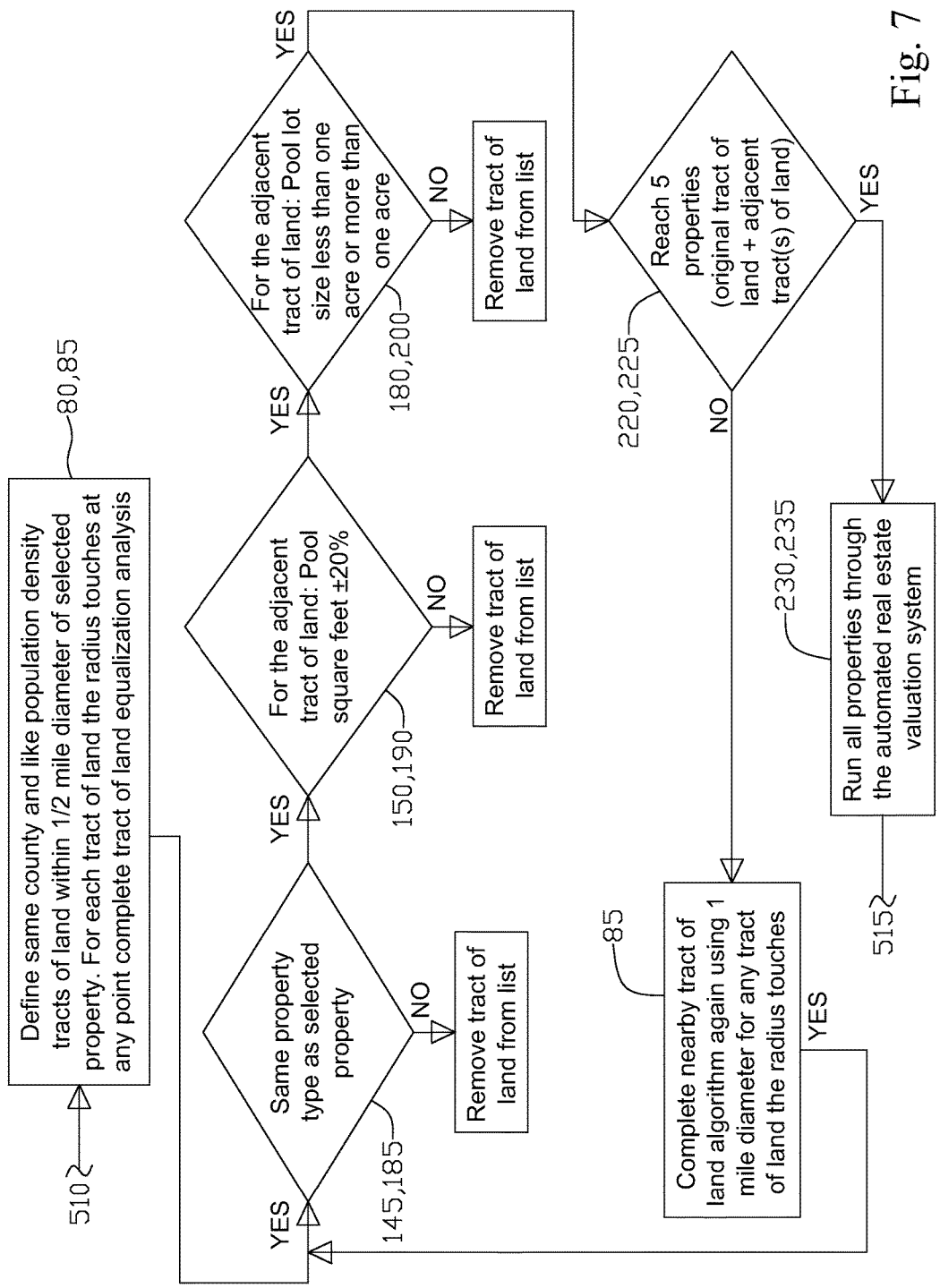
FIG. 7 shows a flow chart schematic that continues from FIG. 3 to give more detail on qualifying the adjacent tract of land and the nearby tract of land when there are an insufficient number of recently sold properties in the specific tract of land, thus the adjacent tract of land recently sold properties on a first matched item of building structure style within a fourth selected range and a second matched item being square feet within a fifth selected range, and an optional fourth matched item of lot size within an eighth selected range, wherein the process is repeated for a nearby tract of land if an insufficient number of recently sold properties are added in the adjacent tract of land.

50 Automated real estate valuation system
55 Selected specific property
60 Recently sold property
65 Property under contract
70 Active listing property
75 Specific tract of land
80 Adjacent tract of land
85 Nearby tract of land
90 Input attributes database
95 Input data sets
100 Primary token features
105 Secondary token features 110 Raw text words and phrases from the remarks section of a property listing (species)
115 Genus clusters formed from one or more raw text words and phrases 110
120 Index identifier for each genus cluster 115
125 Weight given to each index identifier 120
130 Processor
135 Memory
140 Programs
145 First selected range
150 Second selected range
155 Third selected range
160 Fourth selected range
165 Fifth selected range
170 Sixth selected range
175 Seventh selected range
180 Eighth selected range
185 First matched item
190 Second matched item
195 Third matched item
200 Fourth matched item
205 First qualified assemblage
210 Second qualified assemblage
215 Third qualified assemblage
220 First combined qualified assemblage
225 Second combined qualified assemblage
230 Valuation algorithm
235 Calculated output value
240 Local host interface component
245 Local human perceptible interface device
250 Remote host server computer
255 Data communication structure
260 Local control module
500 Flowchart continuation from FIG. 2 to FIG. 3
505 Flowchart continuation from FIG. 3 to FIG. 4
510 Flowchart continuation from FIG. 3 to FIG. 7
515 Flowchart continuation from FIG. 7 to FIG. 3

DETAILED DESCRIPTION

With initial reference to FIG. 1 shown is a summary schematic diagram of the automated real estate valuation system 50 that includes the memory 135, the processor 130, the selected specific property 55 input attributes 90, the primary token features 100, the input data sets 95, the secondary token features 105, and the output calculated value 235 for the selected specific property 55. Continuing, FIG. 2 shows a flowchart schematic starting with the selected specific property 55 that is disposed within a particular or specific tract of land 75 with the selected specific property 55 input attributes 90 database and a step of locating a selected number of recently sold properties 60 in the specific tract of land 75 plus optionally locating actively for sale 70 and under contract properties 65 also within the specific tract of land 75. Wherein FIG. 2 shows the sold 69 or active 70/contract 65 properties are compared to building style, square footage, and lot size to further qualify into a first qualified assemblage 205 for the comparable properties in the specific tract of land 75.

Further, FIG. 3 flows from FIG. 2 at 500 to determine if five or more properties 60 are qualified, and if not then looking toward adjacent tracts of land 80. Next, FIG. 4 flows from FIG. 3 at 505 if five or more properties 60 are qualified into the first qualified assemblage 205 wherein a trend adjustment is made for price change over time and a ratio adjustment is made for sold price to original asking price. FIG. 4 also shows that the automated real estate valuation system 50 calculates a value 235 for the selected specific property 55 using the input attributes 90, primary token features 100, input data sets 95, and secondary token features 105, further if a list price is available for the selected specific property 55 it would be used to adjust the calculated value 235 depending upon the difference as between the list price and the calculated value 235.

Next, FIG. 5 shows a plan view of the specific tract of land 75 and an adjacent tract of land 80, wherein house lots and streets are also shown. Further, FIG. 6 basically shows FIG. 5 with the addition of a radius emanating from the selected specific property 55 outward to ascertain for qualification an adjacent tract 80 of land or a nearby (non-adjacent) tract of land 85. Continuing, FIG. 7 shows a flow chart schematic that continues from FIG. 3 at 510 to give more detail on qualifying the adjacent tract of land 80 and the nearby tract of land 85 when there are an insufficient number of recently sold properties 60 in the specific tract of land 75. Thus, in FIG. 7 the adjacent tract of land 80 recently sold properties 60 on a first matched item 185 of building structure style within a fourth selected range 160 and a second matched item 190 being square feet within a fifth selected range 165, and an optional fourth matched item 200 of lot size within an eighth selected range 180, wherein the process is repeated for a nearby tract of land 85 if an insufficient number of recently sold properties 60 are added in the adjacent tract of land 80.

Figure 8:
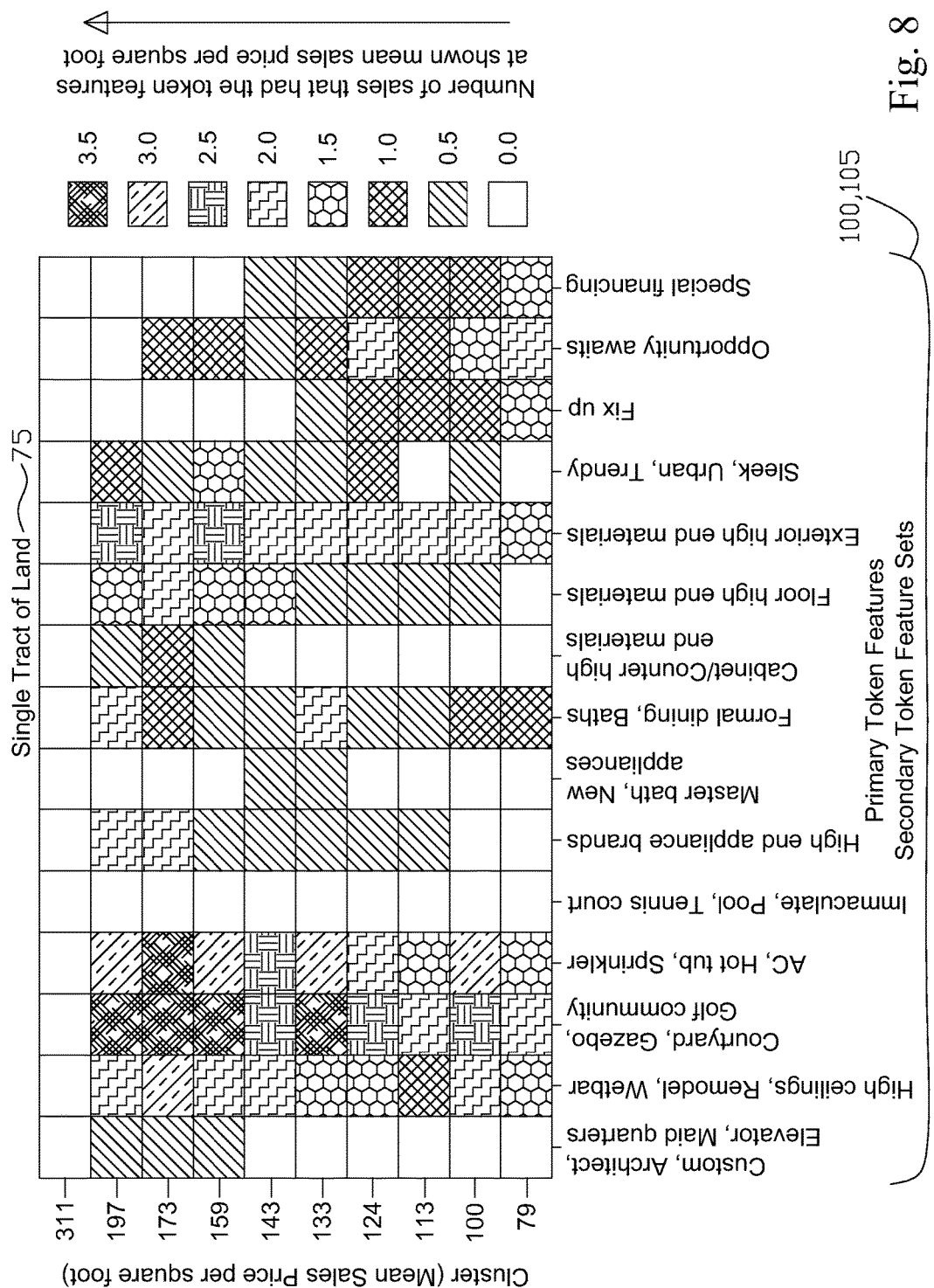
Figure 9:
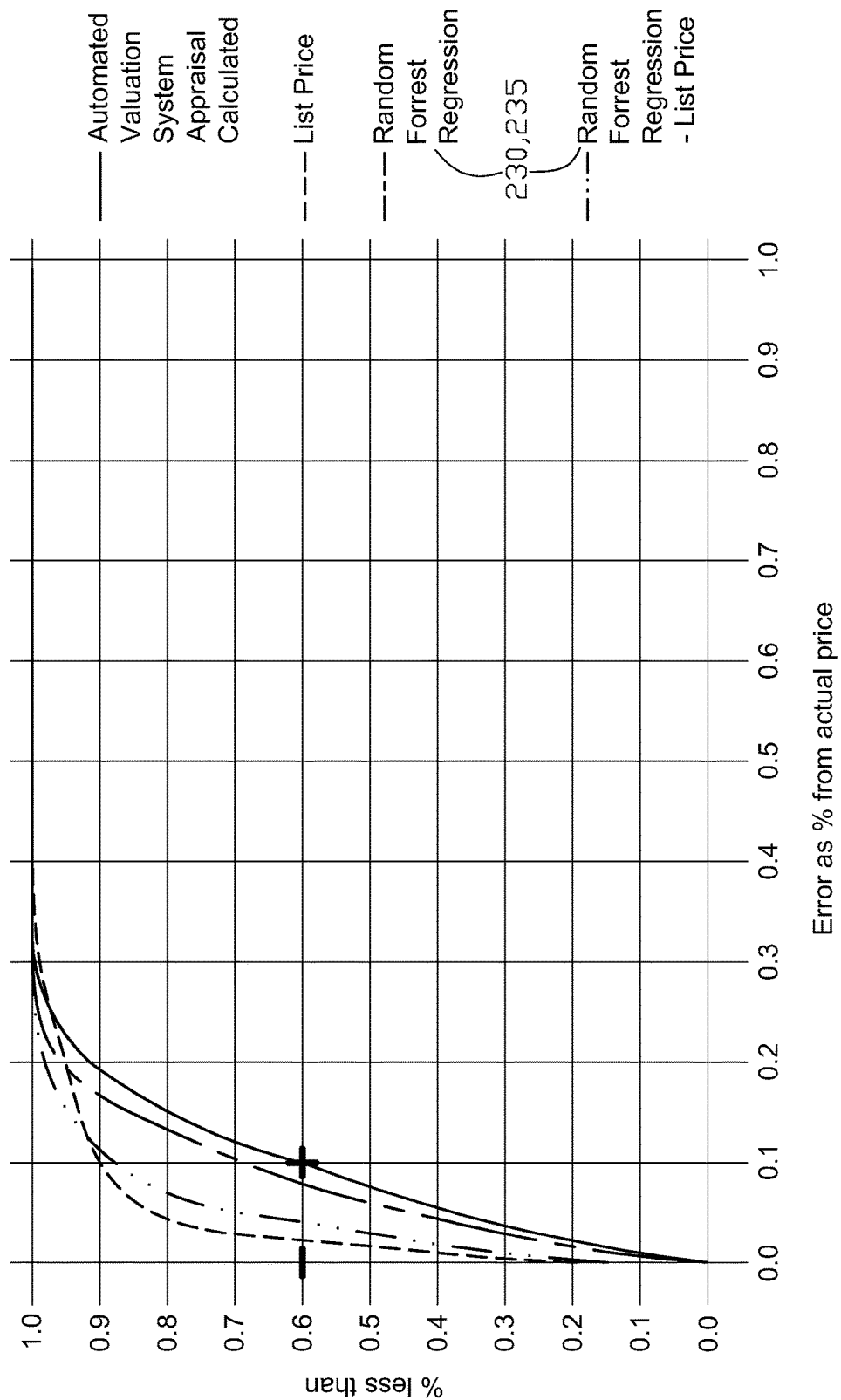
FIG. 9 shows a plot of time occurrences on the Y axis versus error as a percent of price on the X axis for multiple property valuation methods as indicated on the right side of the Y axis for a sampling of sold property data, wherein it can be seen that for the automated valuation system calculated appraisal method that sixty percent of the time the appraisal is within ten percent of the price, also note that for the majority of the time the list price has the least error, wherein the random forest regression method of the present invention has error levels between the list price and automated valuation system calculated appraisal methods.

Moving onward, FIG. 8 shows a graph for a single tract of land 75 wherein the left side Y axis has the mean sold price per square foot, the X axis has genus clusters of primary 100 and secondary 105 token features, and the right side Y axis has the number of occurrences of particular token features in certain sales price per square foot ranges, being basically to show at what price level specific token features 105 are prevalent at. Next, FIG. 9 shows a plot of time occurrences on the Y axis versus error as a percent of price on the X axis for multiple property valuation methods as indicated on the right side of the Y axis for a sampling of sold property 60 data, wherein it can be seen that for the automated valuation system calculated appraisal method—not an actual physical appraisal by an individual appraiser, but being the input attributes 90 and input data sets 95 that are originally based on the prior art appraisal criteria, see FIGS. 34, 35, 36, 37, and 38 that can be augmented, that sixty percent of the time the appraisal is within ten percent of the price, also noted that for the majority of the time the list price has the least error, wherein for the present invention of the automated real estate valuation system 50 the preferred algorithm 230 of the random forest regression method has error levels between the list price and appraisal methods.

Further, FIG. 10 shows a plot for a single tract 75 of land that is somewhat of a derivative of FIG. 8 that shows the effects of the Y axis changes in sold price per square foot over a sample of recently sold properties 60 has ranges of sold price per square foot going from low to high, wherein the slope of the curve changes based up the faction groupings which have like token features 105, thus again showing the effect of token features 105 upon sold price per square foot. Next, FIG. 11 shows a raw data plot that FIG. 10 is an idealized version of, wherein FIG. 11 shows the change in slope of the sold price per square foot over a range of properties 60 sale prices within a single tract 75 of land. Thus FIG. 11 shows the change in slope of the sold price per square foot over a range of properties 60, 65, 70 sale prices within a single tract of land 75 using the "K-Means" algorithm to create the horizontal divisions that are parallel to the "X" axis into what is termed "Q-Values" that are basically ranges of sold prices per square foot for various properties 60, 65, 70 within the specific tract of land 75.

Figure 12:
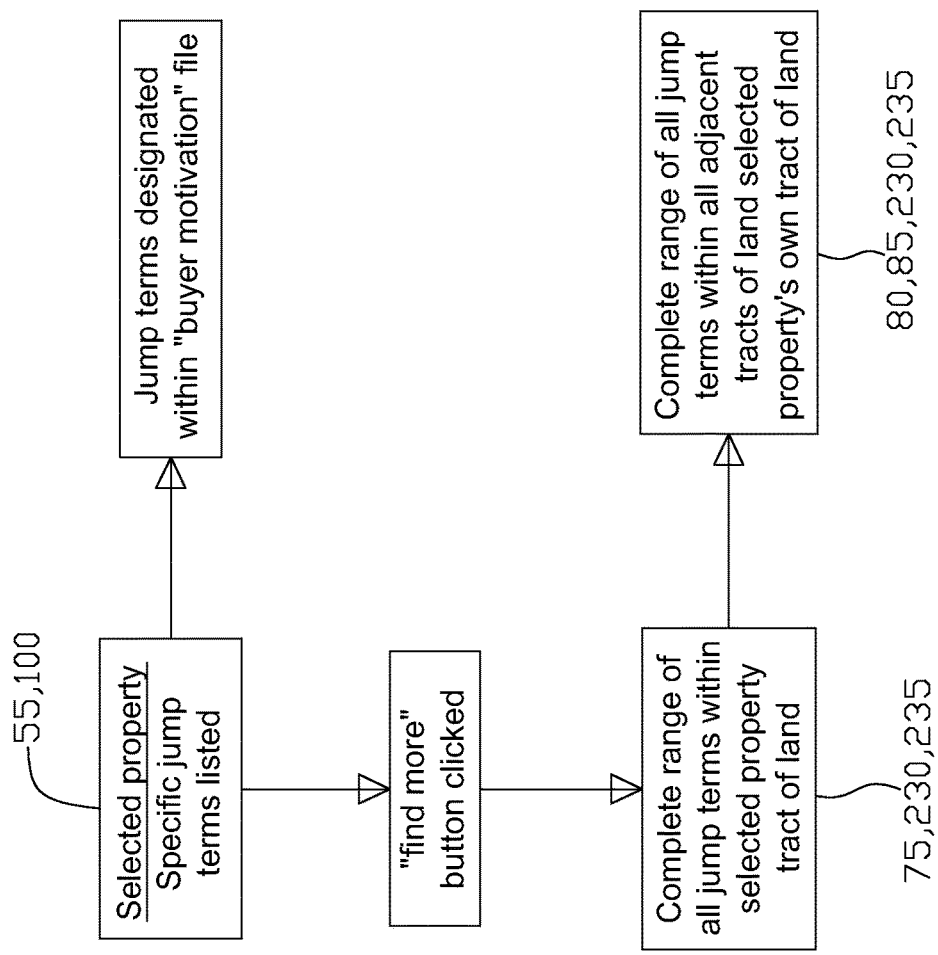
FIG. 12 shows a flow chart schematic specifically relating to the "find similar properties" button being clicked or alternatively the "find more" button being clicked or the "more like" button being clicked, reference the FIG. 20 sample screen shot, wherein specific token features are termed 'jump terms" that are inherent in the program that are used to either find additional properties available with token features similar to the selected specific property, or are used to find additional comparable properties for a valuation when not enough recently sold properties are present within the selected specific property's specific tract of land, using the valuation algorithm, the system seeks out properties with matching physical and token feature or emotional characteristics, while additionally controlling for prices relative to these features and location, all within specified ranges.

Continuing, FIG. 12 shows a flow chart schematic that gives a user the ability to evaluate the effects of the token features 105 upon calculated values for select specific properties 55 by selecting which token features they have an interest in.

Figure 20:
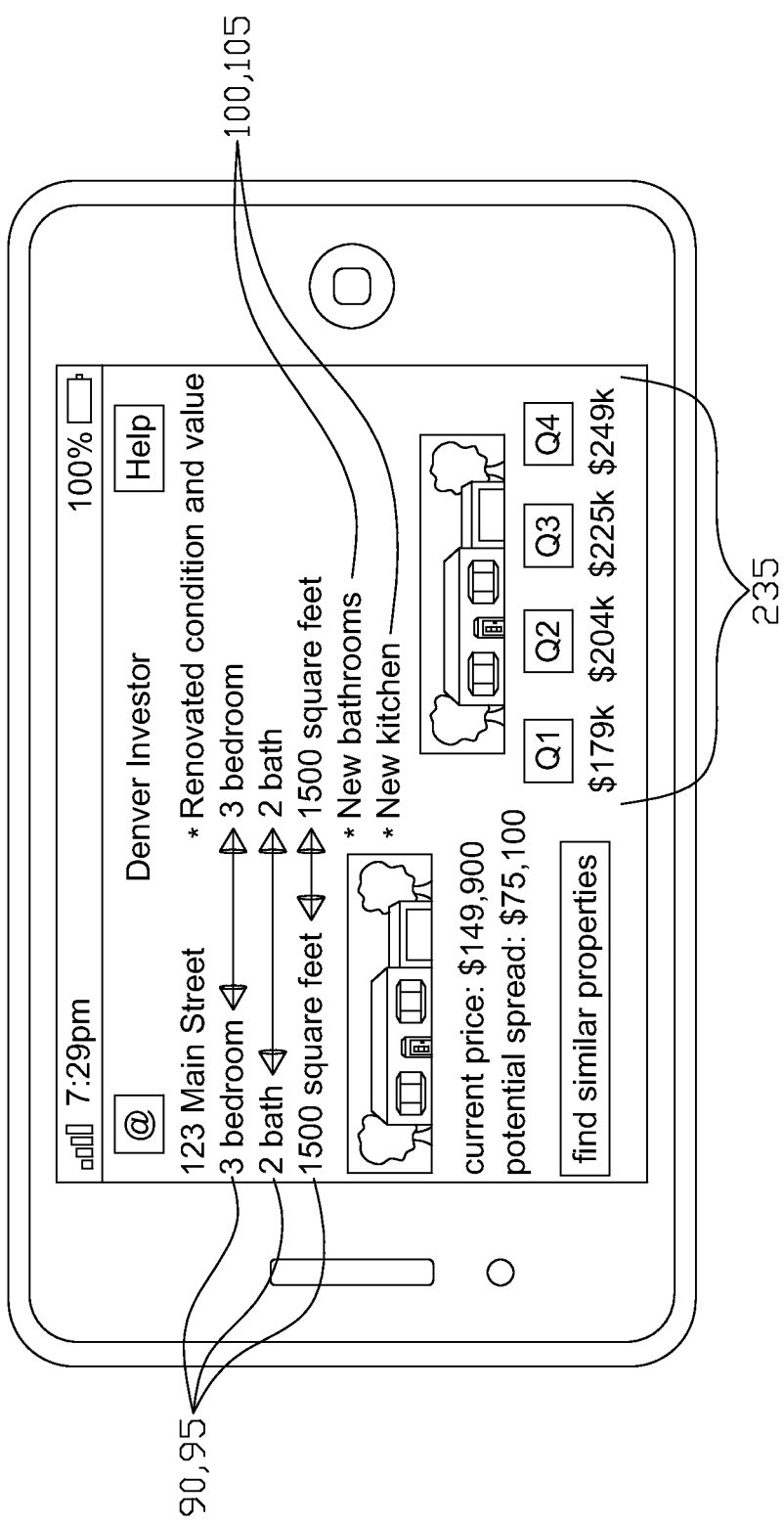
FIG. 20 shows the output of FIG. 17 that can be of high utility to the investor, wherein the output shows properties side by side to emphasize the similarities and differences in both tangible items such as square feet to the token features such as updated bath and kitchen, wherein the property value effect is shown based upon differences in tangible items and token features (being the emotional buying influences), wherein the differences are based upon real market data as calculated by the automated real estate valuation system, further an icon is provided for finding similar properties and the spread option in the form of the "Q" (being Q-Value) icons for various dollar amounts as in FIG. 17, as the differences in Q-Values are caused from various token features being added or subtracted.

Further, FIG. 12 shows a flow chart schematic specifically relating to the "find similar properties" button being clicked or alternatively the "find more" button being clicked or the "more like" button being clicked, reference the FIG. 20 sample screen shot, wherein specific token features 100, 105 are termed 'jump terms" that are used to either find additional properties 60, 65, or 70 available with secondary token features 105 similar to the selected specific property 55 primary token features 100, are used to find additional comparable properties 60, 65, or 70 for a potential calculated valuation 235 via accommodating differing groups of token features 100, 105 to see the effect of particular token feature 100, 105 groups on the potential calculated valuation 235, thus in effect seeing the calculated valuation 235 differences for potential token features 100, 105 to be added or taken away from the selected specific property 55, wherein the calculated valuation 235 differences are based on the valuation algorithm 230 determining an accounting of the effect of token features 100, 105 on the properties price 60, 65, or 70. When not enough recently sold properties 60 are present within the selected specific property's 55 specific tract of land 75, using adjacent tracts of land 80 and/or nearby tracts of land 85 are used as described in this specification, wherein the valuation algorithm 230 seeks out properties 60, 65, and/or 70 with matching physical 90, 95 and token features 100, 105 or emotional characteristics, while additionally controlling for prices of the properties 60, 65, or 70 relative to these features 90, 95, 100, 105 and location 75, 80, and/or 85, all within the first 145, second 150, third 155, fourth 160, fifth 165, sixth 170, seventh 175, or eighth 180 selected ranges as described in this specification.

Figure 13:
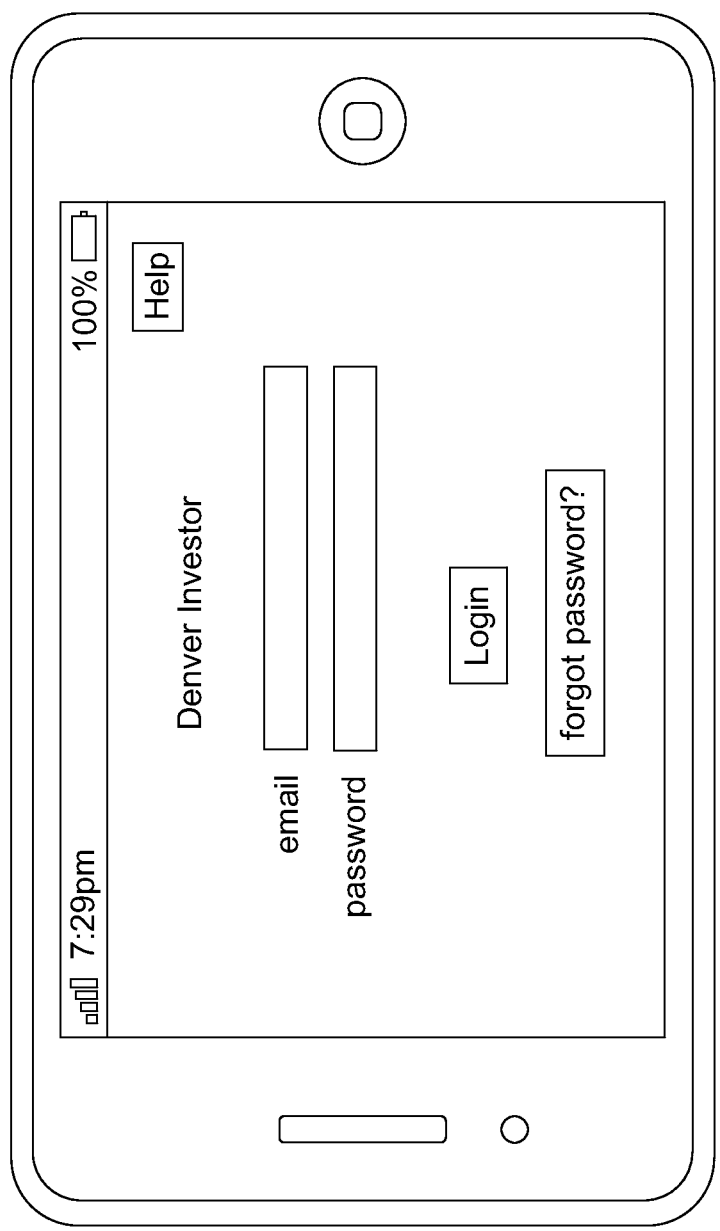
FIG. 13 shows a mobile screen shot of an investor user sign in page for the automated real estate valuation system.
Figure 14:
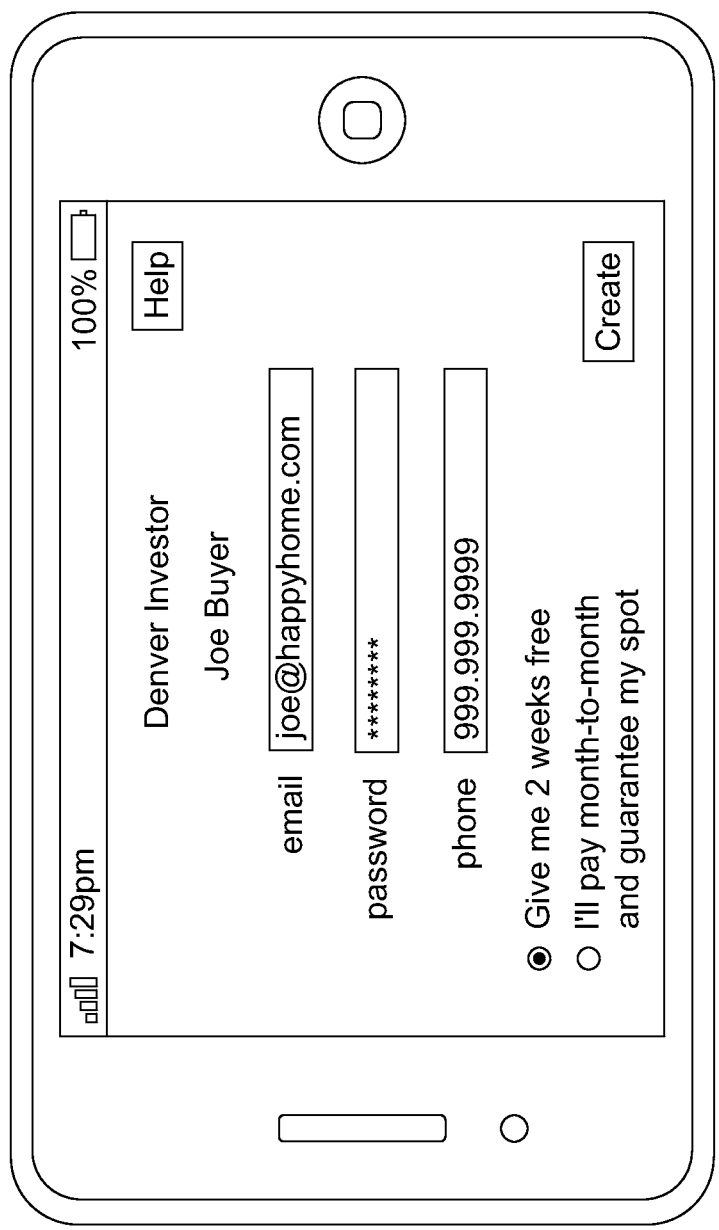
FIG. 14 shows a mobile screen shot of a continuation of the investor user sign in page for the automated real estate valuation system.
Figure 15:
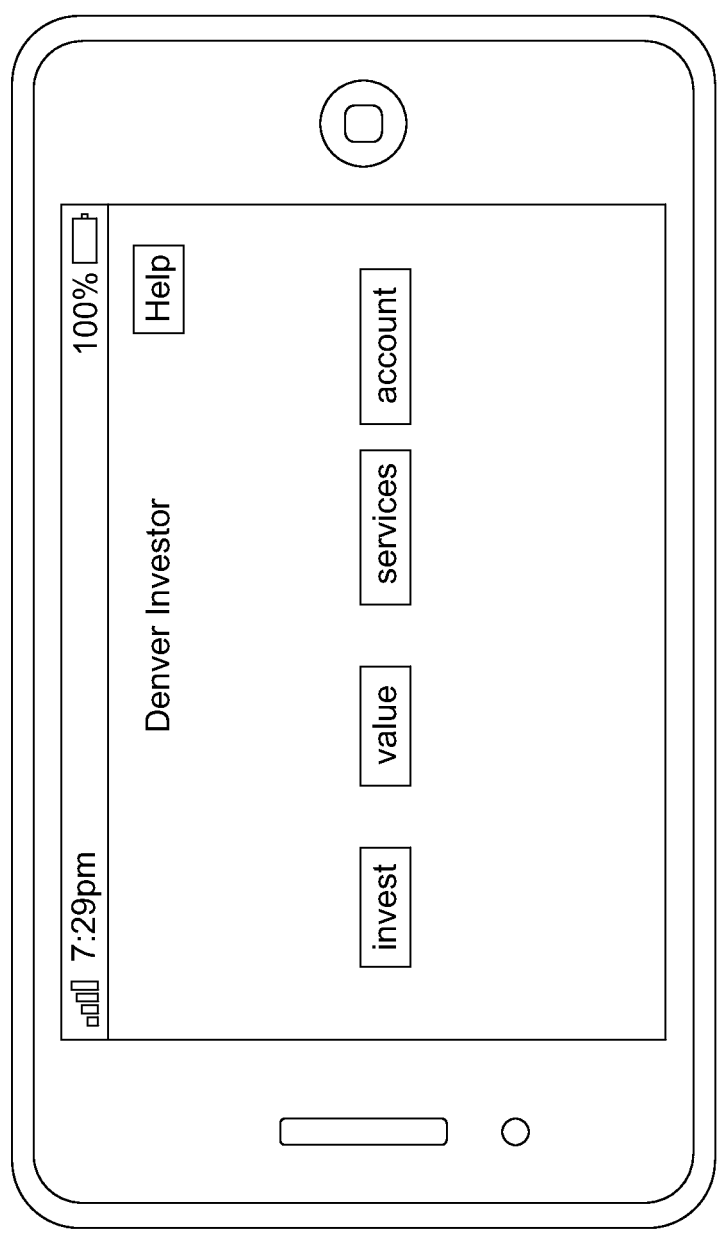
FIG. 15 shows a mobile screen shot of the investor user home page for the automated real estate valuation system.
Figure 16:
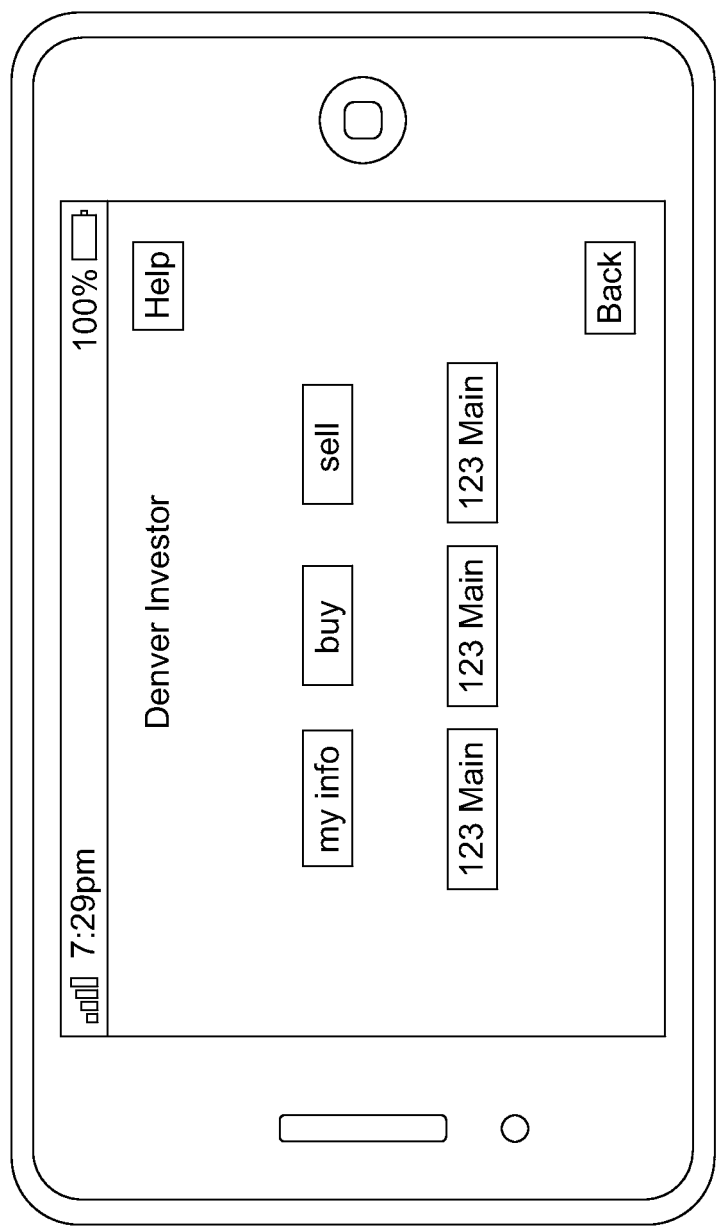
FIG. 16 shows a mobile screen shot of the investor user page after the "Invest" icon is tapped for the automated real estate valuation system.
Figure 17:
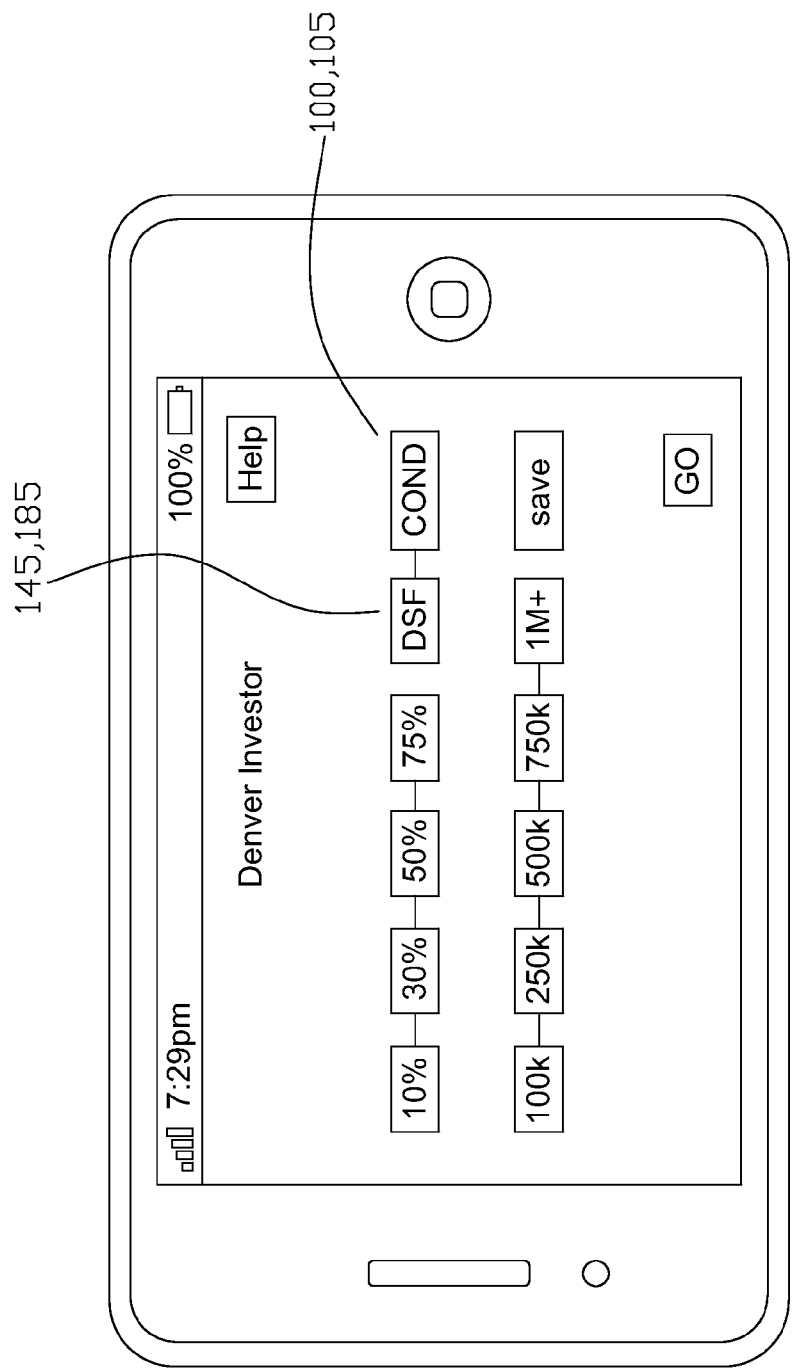
FIG. 17 shows a mobile screen shot of the investor user page after the "Search" icon is tapped for the automated real estate valuation system, wherein this starts to show the utility of the automated real estate valuation system data and property value calculations, wherein the property type is selected here being DSF meaning detached single family, further COND is a property condition pick, and then the percentage spread is selected which is the minimal difference between the specific property list price and the automated potential real estate valuation system calculated value based on various token features being added or subtracted, and then the maximum price of properties that the user is interested in is selected.

Moving onward, FIG. 13 shows a mobile screen shot of an investor user sign in page for the automated real estate valuation system 50 and FIG. 14 shows a mobile screen shot of a continuation of the investor user sign in page for the automated real estate valuation system 50. Next, FIG. 15 shows a mobile screen shot of the investor user home page for the automated real estate valuation system 50 and FIG. 16 shows a mobile screen shot of the investor user page after the "Invest" icon is tapped for the automated real estate valuation system 50. Continuing, FIG. 17 shows a mobile screen shot of the investor user page after the "search or invest" icon is tapped for the automated real estate valuation system 50, wherein this starts to show the utility of the automated real estate valuation system 50 data and property value calculation 235. As FIG. 17 shows the property type is selected here being DSF meaning Detached Single Family, further COND is a property 55 condition pick, and then the percentage spread is selected which is the minimal difference between the specific property 55 list price and the automated real estate valuation system 50 calculated value 235 after potential renovations, and then the maximum price of properties that the user is interested in is selected.

Figure 18:
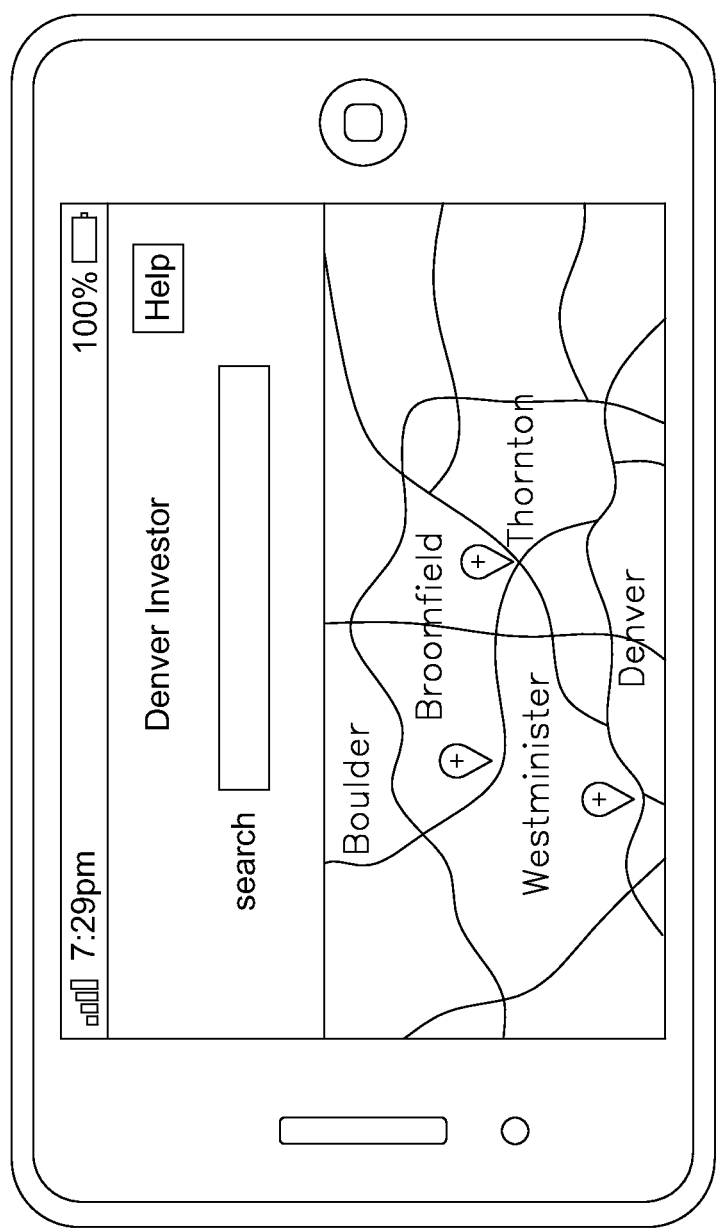
FIG. 18 shows a mapping function available for the selected property.
Figure 19:
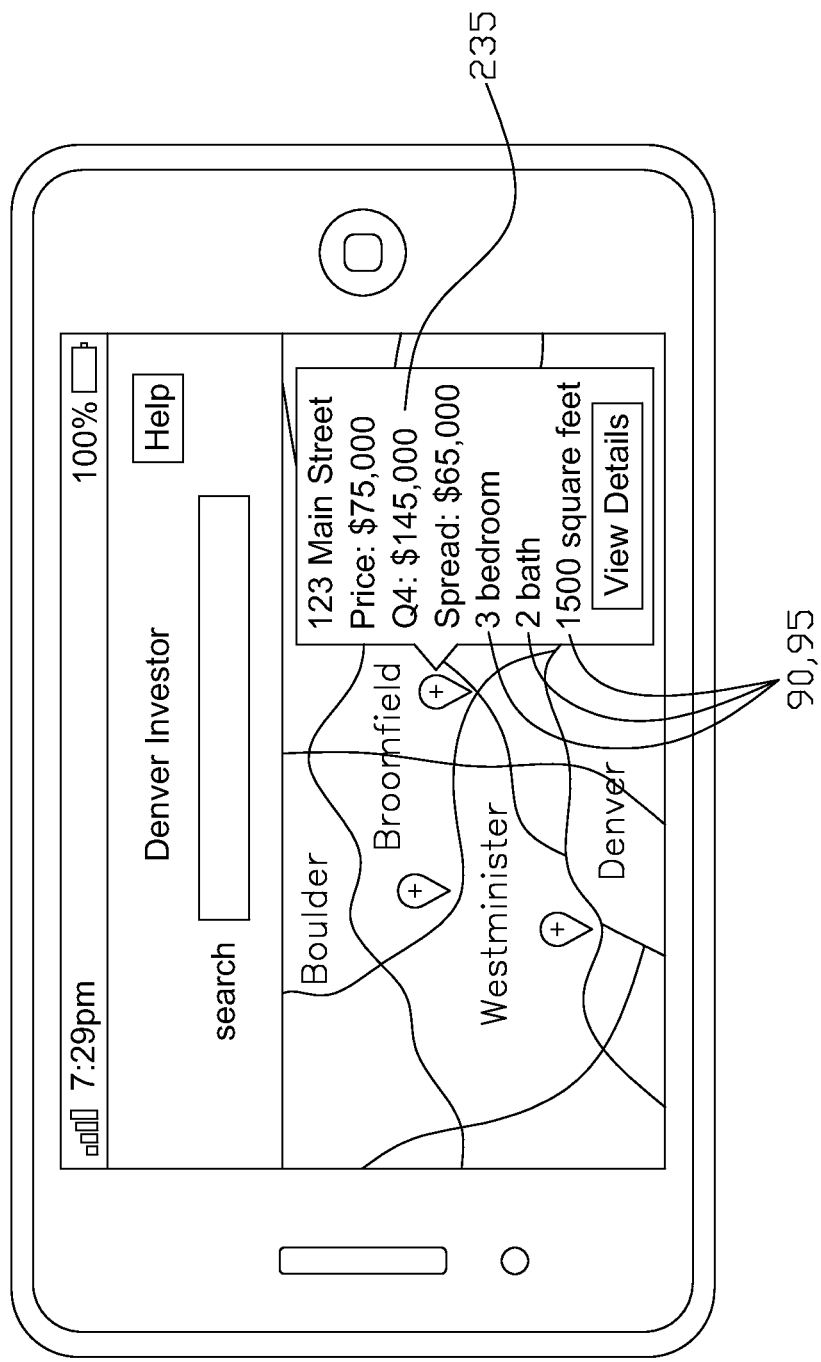
FIG. 19 shows a continuation of the mapping function that can give additional property detail in a pop up window on the map.

Further, FIG. 18 shows a mapping function available for the selected property 55 and FIG. 19 shows a continuation of the mapping function that can give additional property 55 detail in a pop up window on the map. Next, FIG. 20 shows the output of FIG. 17 that can be of high utility to the investor, wherein the output shows properties 55, 60 side by side to emphasize the similarities and differences in both tangible items 90, 95 such as square feet to the token features 100, 105 such as updated bath and kitchen, wherein the property value 235 effect is shown based upon differences in tangible items 90, 95 and token features 100, 105 (being the emotional buying influences), wherein the differences are based upon real market data derived from sold properties 60 as calculated 235 by the automated real estate valuation system 50, further an icon is provided for finding similar properties and the spread option in the form of the "Q" (being Q-Value) icons for various dollar amounts as in FIG. 17.

Figure 21:
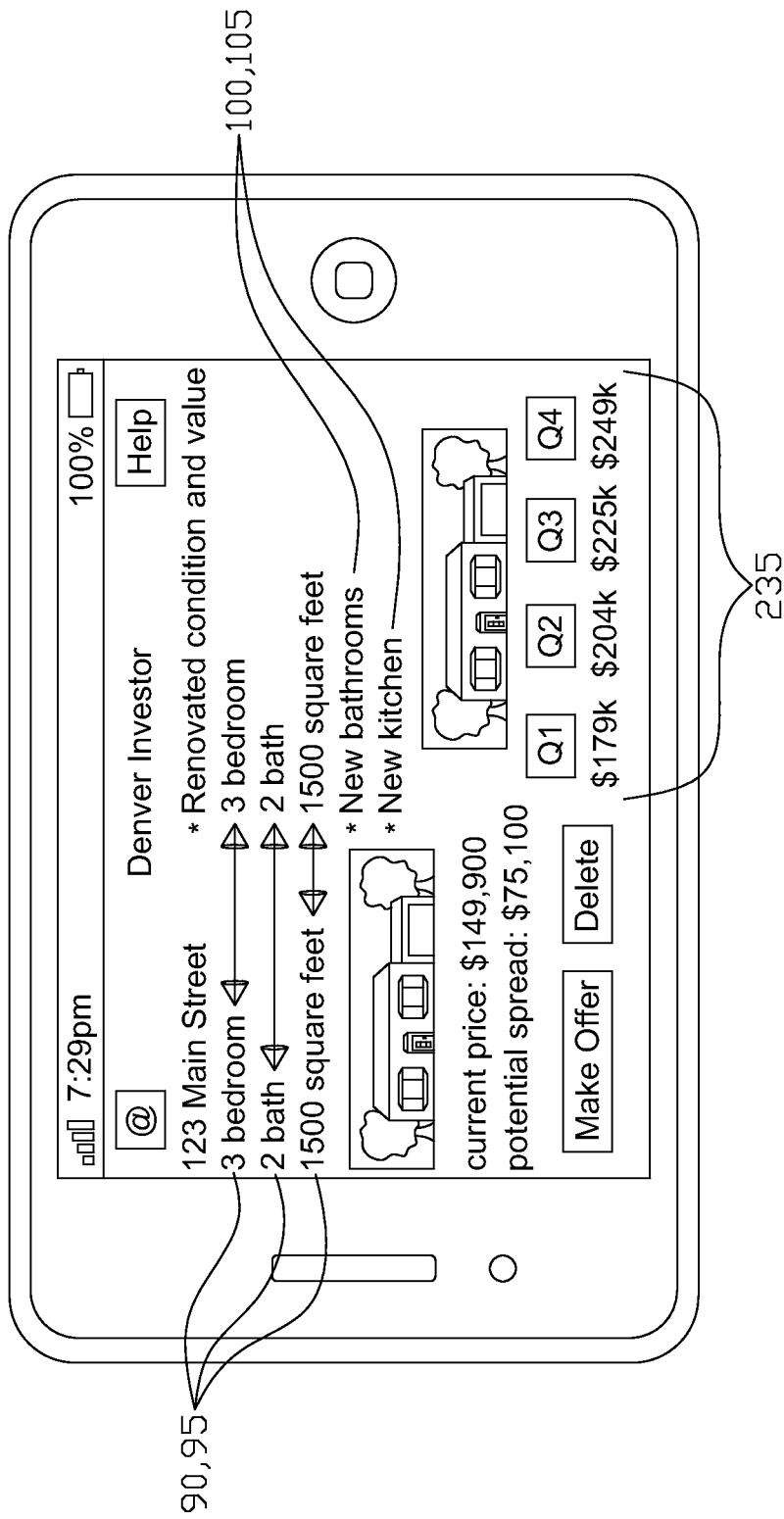
FIG. 21 basically shows FIG. 20 with the option of a "Make Offer" icon.
Figure 22:
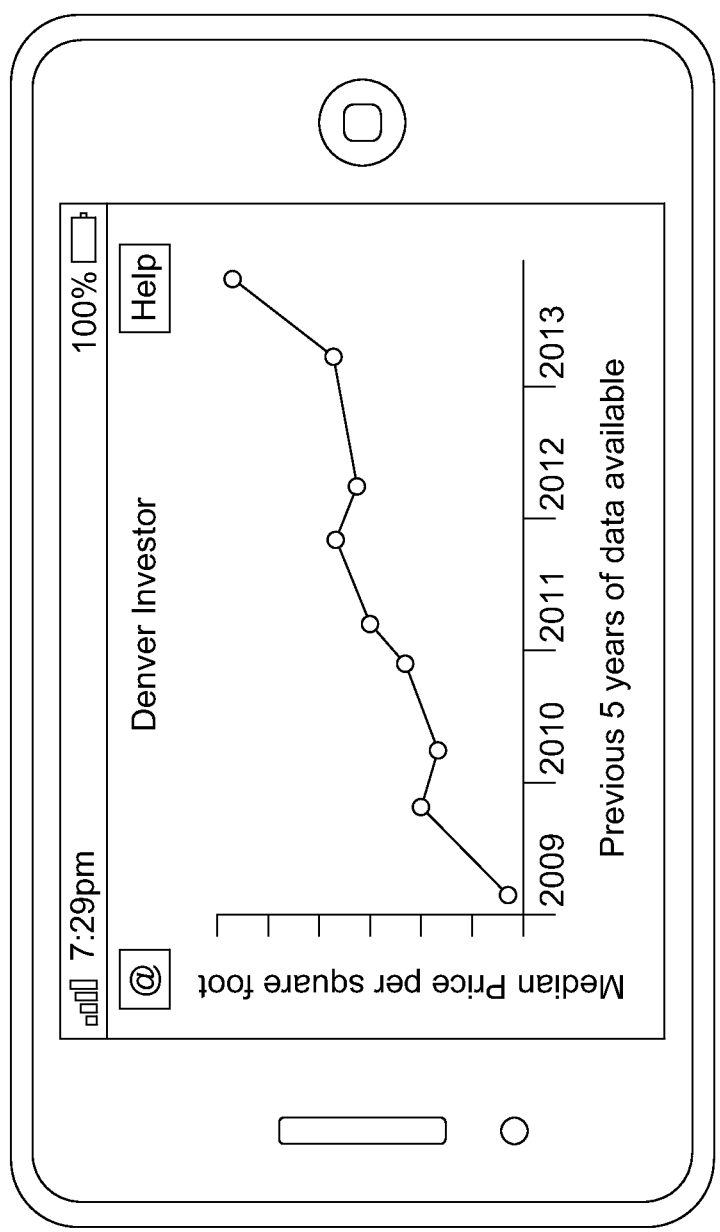
FIG. 22 is yet another use of the automated real estate valuation system output calculated data to show trends in various tracts of land in price per square foot over time.
Figure 23:
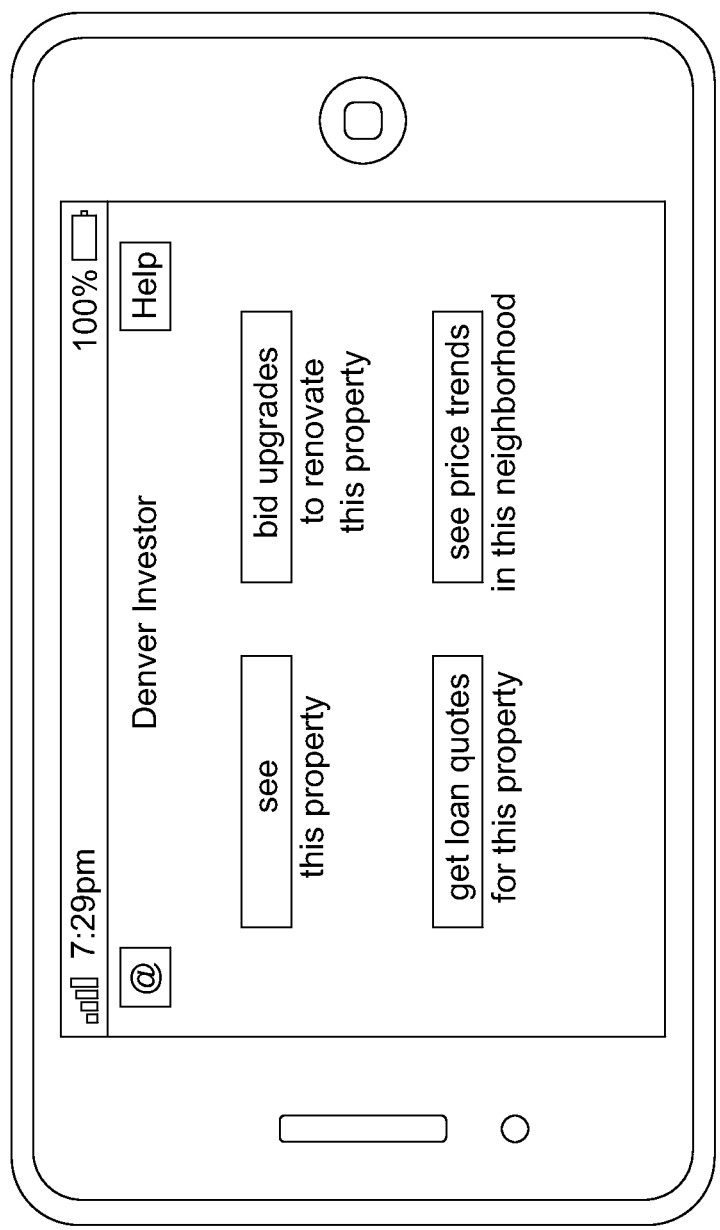
FIG. 23 shows a mobile screen shot for the investor user that facilitates option icons for a specific property, wherein the most useful icon would be the "Bid Upgrades" that would allow the investor to select those particular token features that have a desired value effect on the specific property from FIG. 20 to access the economic sense of making various property improvements.
Figure 24:
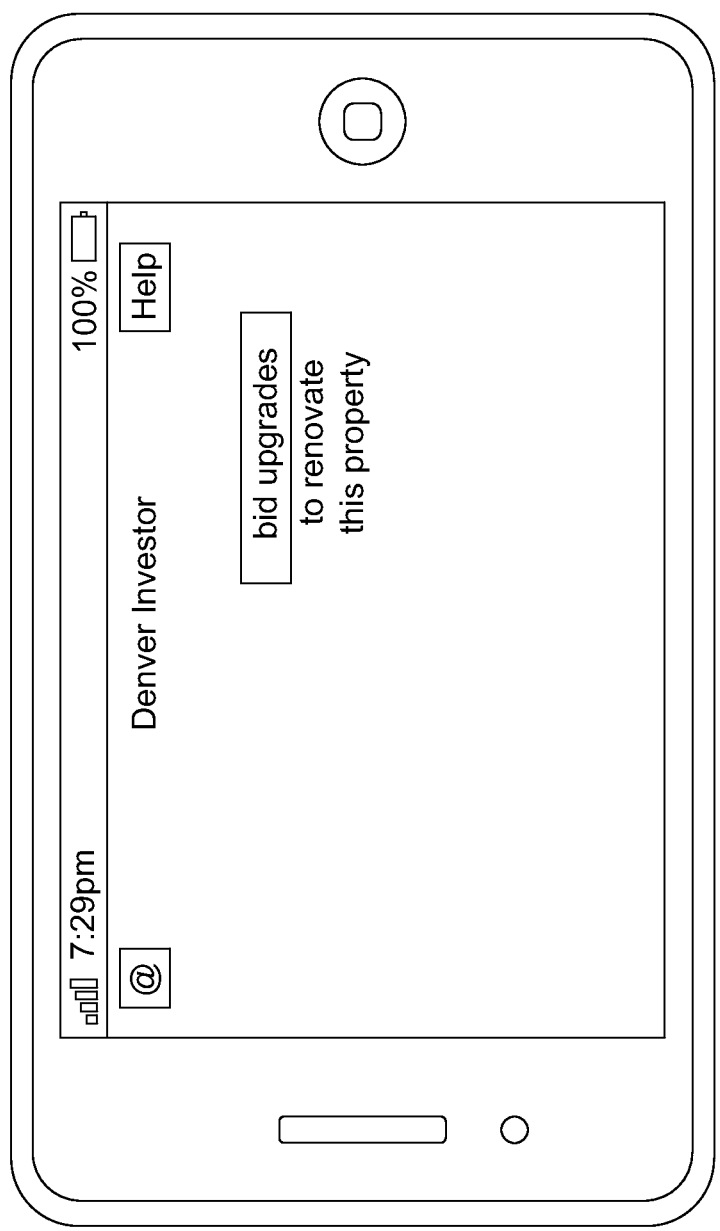
FIG. 24 shows a continuation on FIG. 23 for the "Bid Upgrades" icon being tapped.
Figure 25:
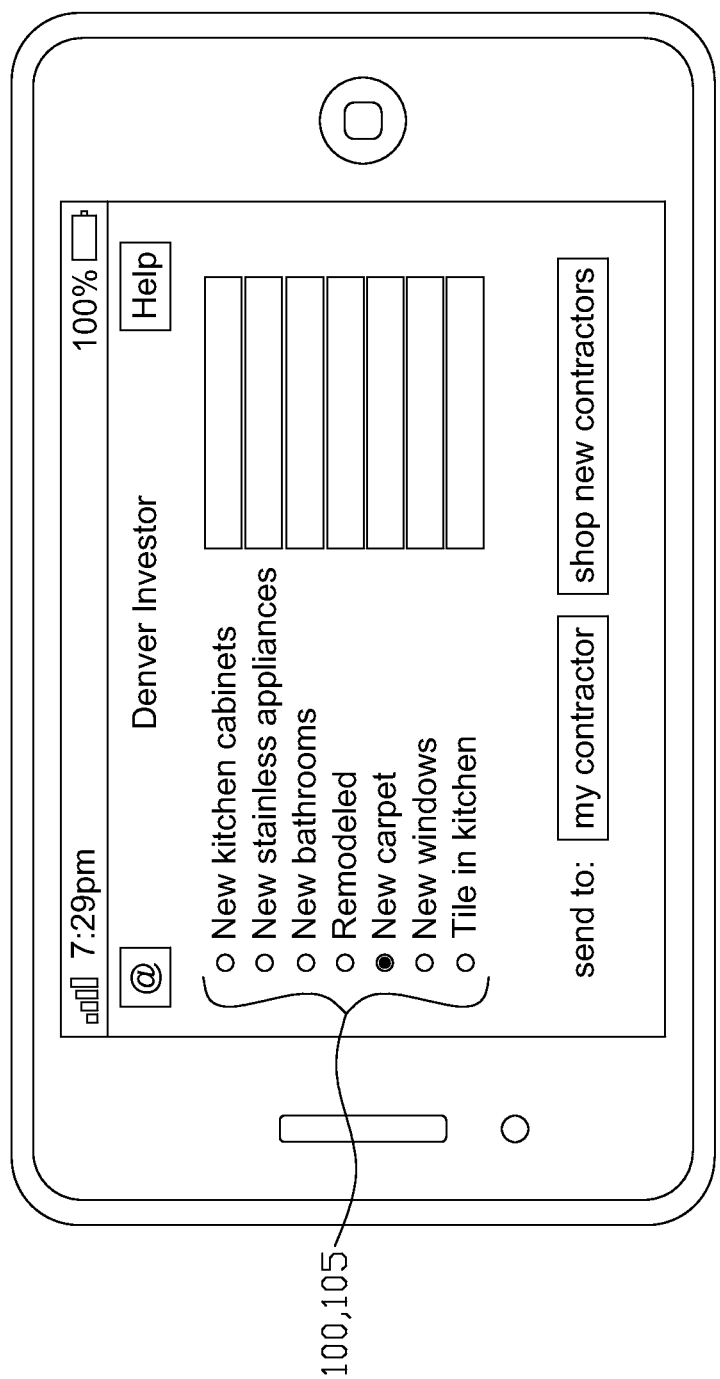
FIG. 25 shows a continuation on FIG. 24 for the "Bid Upgrades" icon being tapped, wherein specific upgrades can be selected.
Figure 26:
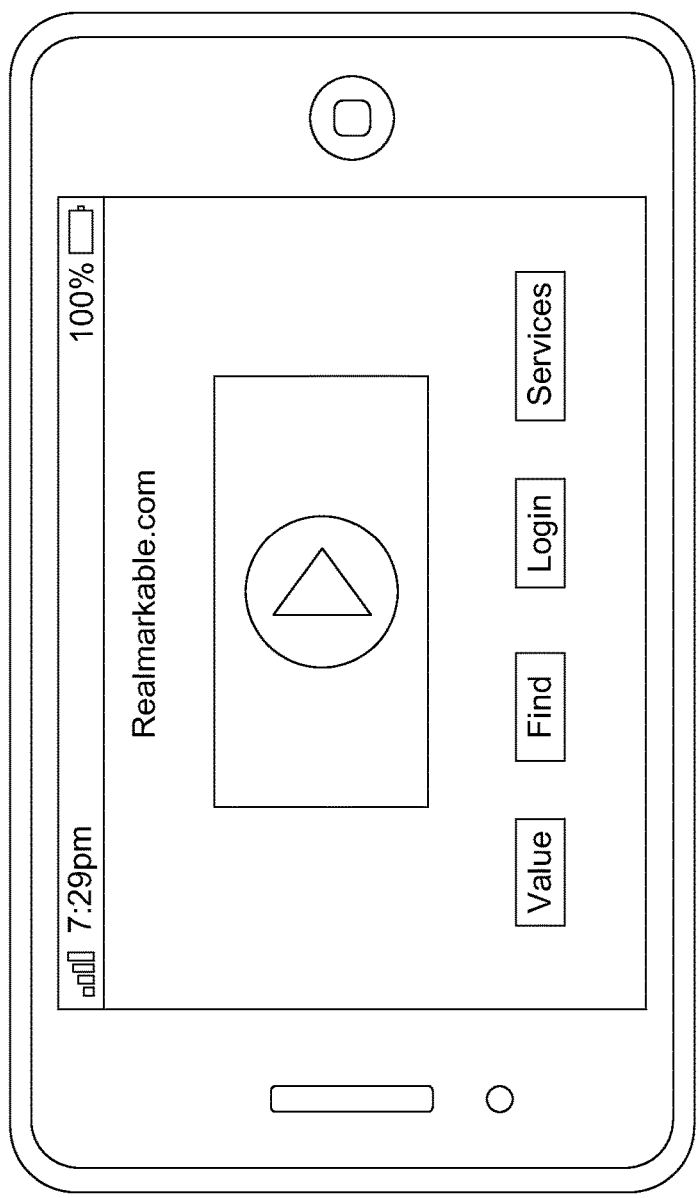
FIG. 26 shows a mobile screen shot of a home buyer user landing page for the automated real estate valuation system.
Figure 27:
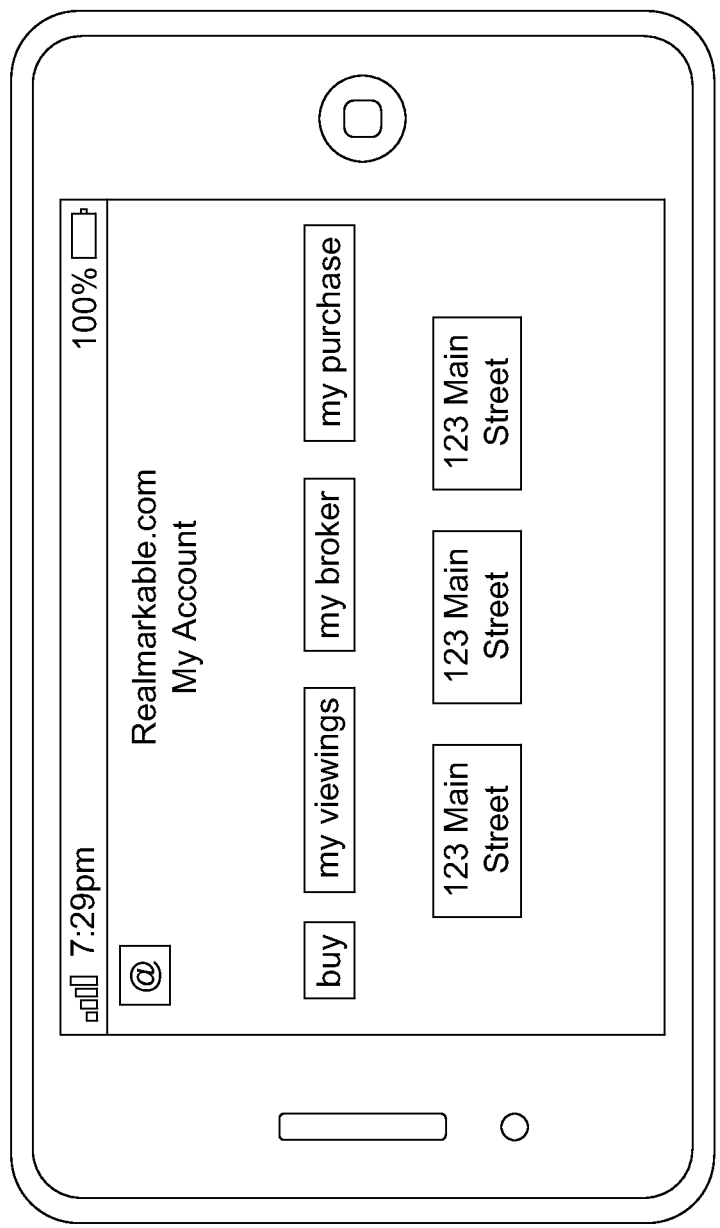
FIG. 27 shows a mobile screen shot of a home buyer user icon options page for the automated real estate valuation system.

Further, FIG. 21 basically shows FIG. 20 with the option of a "Make Offer" icon and FIG. 22 is yet another use of the automated real estate valuation system 50 output calculated data 235 to show trends in various tracts of land 75 in price per square foot over time. In addition, FIG. 23 shows a mobile screen shot for the investor user that facilitates option icons for a specific property 55, wherein the most useful icon would be the "Bid Upgrades" that would allow the investor to select those particular token features 100, 105 that have a desired value effect 235 on the specific property 55 from FIG. 20 to access the economic sense of making various property improvements. Further, FIG. 24 shows a continuation on FIG. 23 for the "Bid Upgrades" icon being tapped and FIG. 25 shows a continuation on FIG. 24 for the "Bid Upgrades" icon being tapped, wherein specific upgrades can be selected. Also, FIG. 26 shows a mobile screen shot of a home buyer user page for the automated real estate valuation system 50 and FIG. 27 shows a mobile screen shot of a home buyer user icon options page for the automated real estate valuation system 50.

Figure 28:
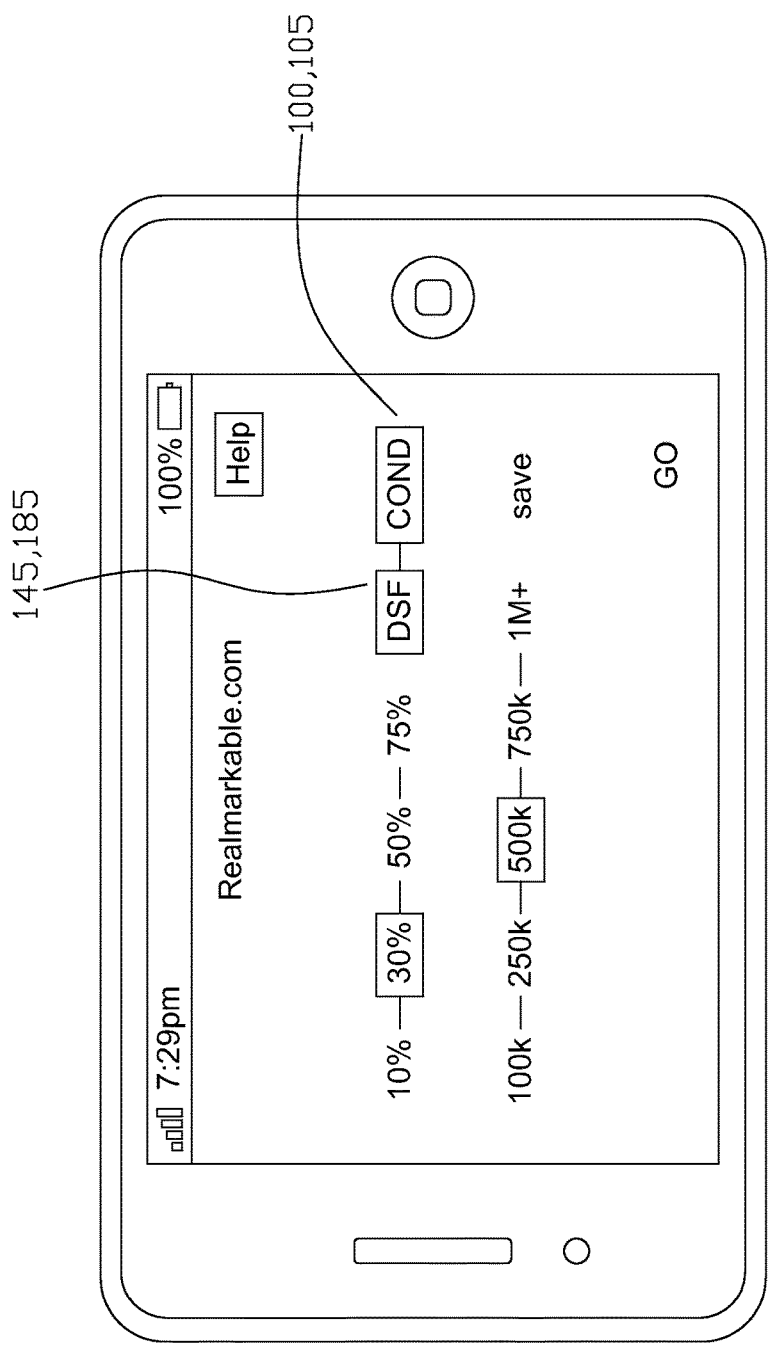
FIG. 28 shows a mobile screen shot of the home buyer user page after the "Invest or Search" icon is tapped for the automated real estate valuation system, wherein this starts to show the utility of the automated real estate valuation system data and property value calculation, wherein the property type is selected here being DSF meaning detached single family, further COND is a property condition pick, and then the percentage spread is selected which is the minimal difference between the specific property list price and the automated real estate valuation system calculated value based on various token features being added or subtracted, and then the maximum price of properties that the user is interested in is selected.

Continuing, FIG. 28 shows a mobile screen shot of the home buyer user page after the "Invest or Search" icon is tapped for the automated real estate valuation system 50, wherein this starts to show the utility of the automated real estate valuation system 50 data and property value calculation 235. As FIG. 28 shows the property type is selected here being DSF meaning Detached Single Family, further COND is a property 55 condition pick, and then the percentage spread is selected which is the minimal difference between the specific property list price and the automated real estate valuation system 50 calculated value 235 after potential renovations, and then the maximum price of properties that the user is interested in is selected.

Figure 29:
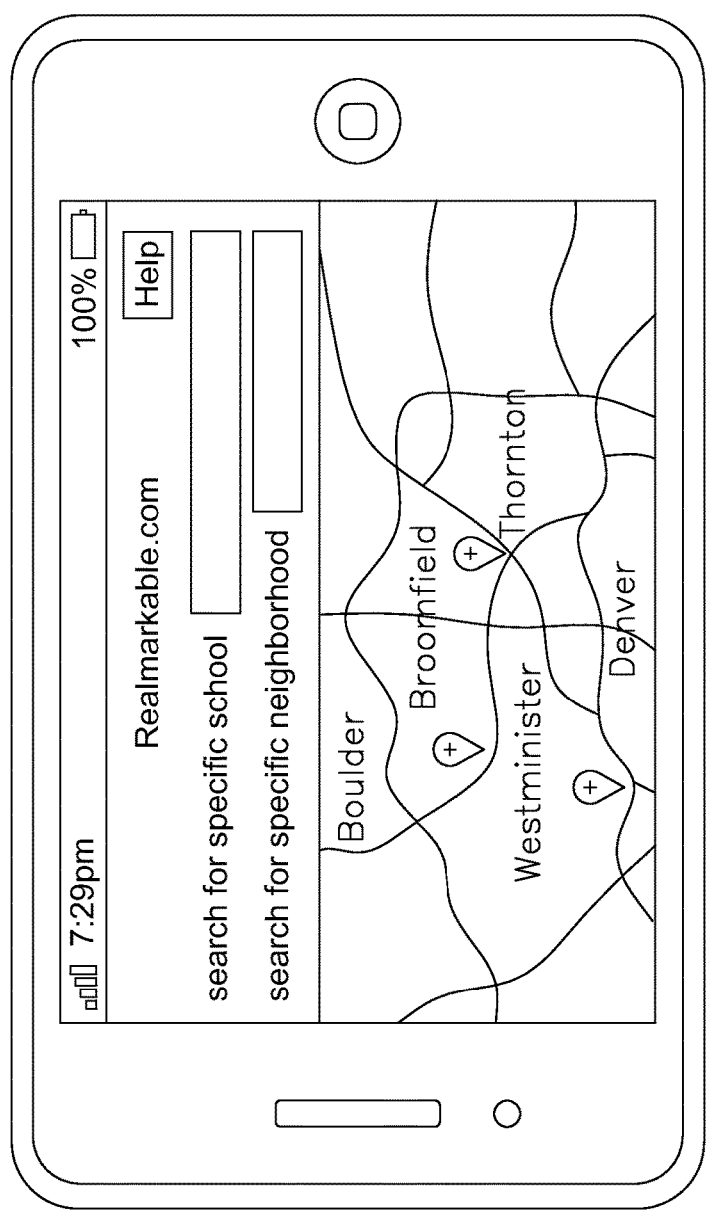
FIG. 29 shows a mapping function available for the selected property.

Next, FIG. 29 shows a mapping function available for the selected property 55. Then FIG. 30 shows the output of FIG. 28 that can be of high utility to the home buyer, wherein the output shows properties 55, 60 side by side to emphasize the similarities and differences in both tangible items 90, 95 such as square feet to the token features 100, 105 such as updated bath and kitchen, wherein the property value 235 effect is shown based upon differences in tangible items 90, 95 and token features 100, 105 (being the emotional buying influences), wherein the differences are based upon real market data as calculated by the automated real estate valuation system, further an icon is provided for finding similar properties 60 and the spread option in the form of the "Q" (being Q-Value) icons for various dollar amount as in FIG. 28.

Figure 30:
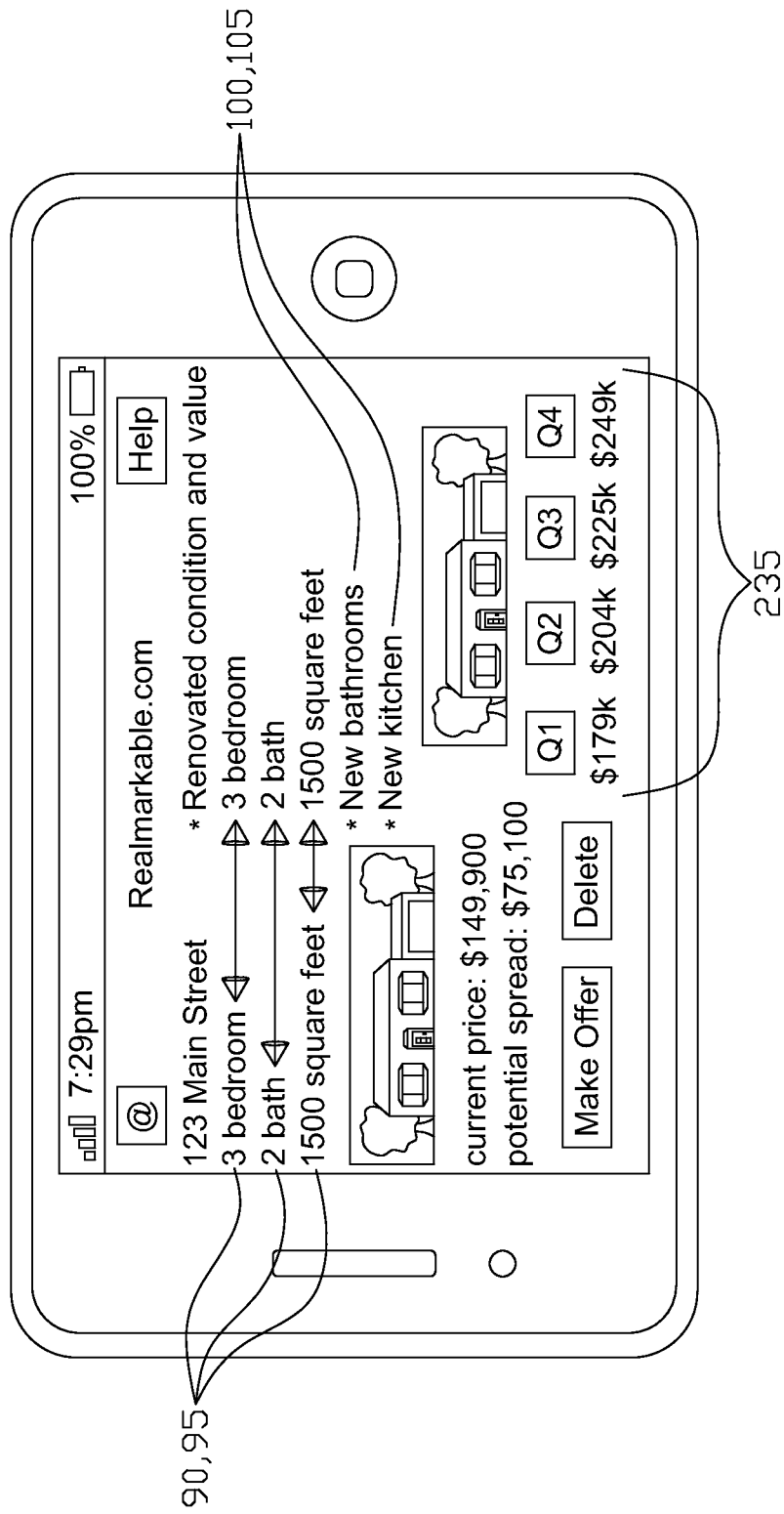
FIG. 30 shows the output of FIG. 28 that can be of high utility to the home buyer, wherein the output shows properties side by side to emphasize the similarities and differences in both tangible items such as square feet to the token features such as updated bath and kitchen, wherein the property value effect is shown based upon differences in tangible items and token features (being the emotional buying influences), wherein the differences are based upon real market data as calculated by the automated real estate valuation system, further an icon is provided for finding similar properties and the spread option in the form of the "Q" (being Q-Value) icons for various dollar amount as in FIG. 28, as the differences in Q-Values are caused from various token features being added or subtracted.

Continuing, FIG. 31 shows an expanded screen shot of FIGS. 20 and 30 to depict the effects of different Q values upon various groupings of token features 100, 105 that result in value deviations from the value 235 at Q 0, wherein in this particular screen shot Q 2 is highlighted that shows token feature 100, 105 differences that add to the value 235 at Q 0. Wherein in FIG. 31 the box on the left side represents the token feature set 100, 105 for the value 235 at Q 0 and the box on the right represents the token feature set that adds to value 235 Q 0 going to the value at Q 2, wherein the weights that the token features 100, 105 have upon the various Q values as shown are derived from the valuation algorithm 230 that reflect actual property 60, 65, or 70 market value influence of the various token features 100, 105. Note that as between the box on the left and the box on the right there is a group of common features 100, 105 identified as being in bold type and separated and a group of different features different features 100, 105 that are in non-bold type and separated-thus to allow the comparison to focus on the different features 100, 105 that affect the calculated value 235 via the valuation algorithm 230.

Further, FIG. 32 shows the opposite effect of what is shown in FIG. 31 also with an expanded screen shot of FIGS. 20 and 30 to depict the effects of different Q values upon various groupings of token features 100, 105 that result in value deviations from the value 235 at Q 0, wherein in this particular screen shot Q −2 is highlighted that shows token feature 100, 105 differences that detract from the value 235 at Q 0. Wherein in FIG. 32 the box on the left side represents the token feature 100, 105 set for the value 235 at Q 0 and the box on the right represents the token feature set 100, 105 that subtracts from value 235 Q 0 going to the value at Q −2, wherein the weights that the token features 100, 105 have upon the various Q values as shown are derived from the valuation algorithm 230 that reflect actual property 60, 65, or 70 market value influence of the various token features 100, 105. Note that as between the box on the left and the box on the right there is a group of common features 100, 105 identified as being in bold type and separated and a group of different features different features 100, 105 that are in non-bold type and separated-thus to allow the comparison to focus on the different features 100, 105 that affect the calculated value 235 via the valuation algorithm 230.

Figure 33:
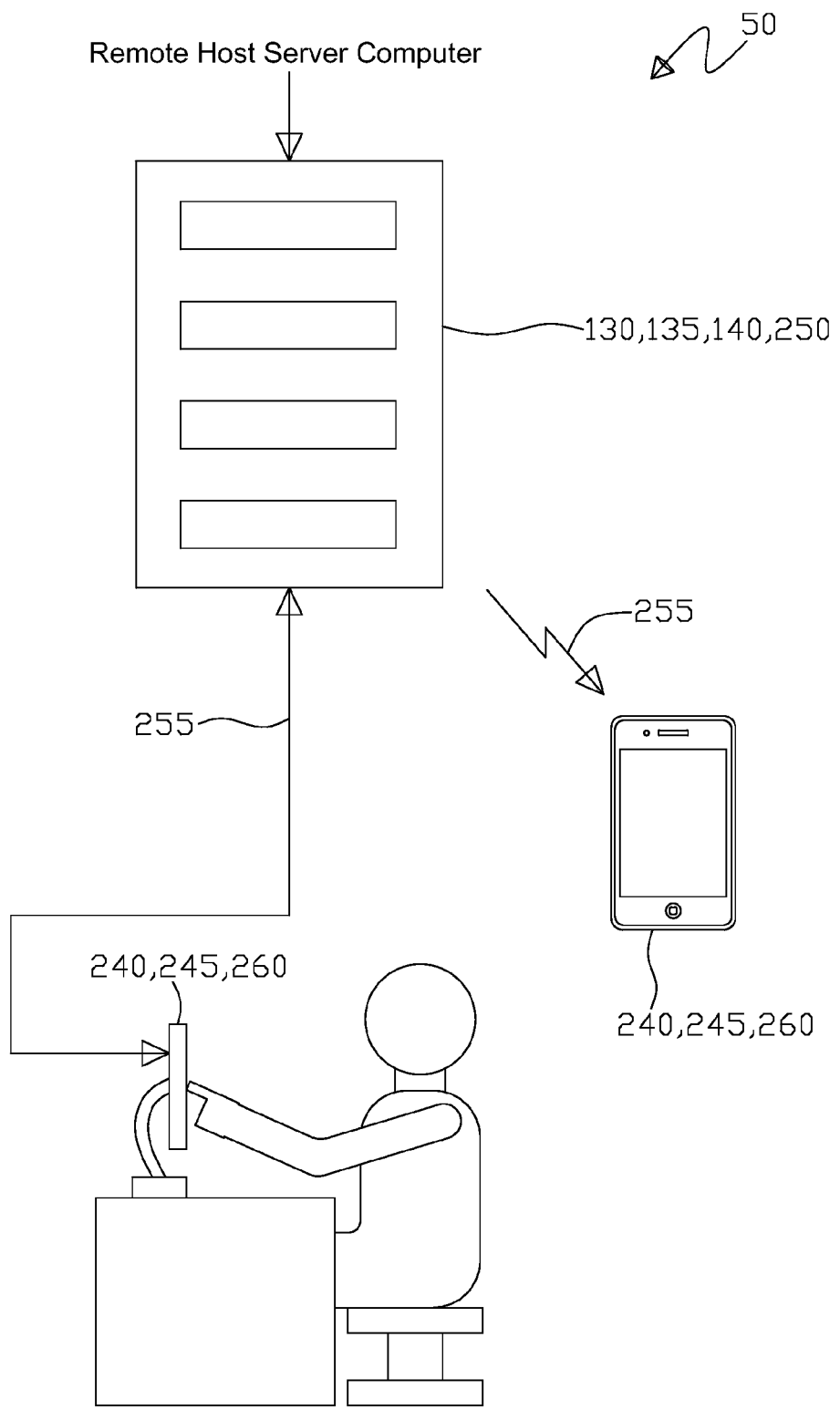
FIG. 33 shows a flow schematic diagram of the remote host server computer, the data communication structure, the local control module, the local host interface component, and the local human perceptible interface device as one of the means of using the present invention.

Moving ahead, FIG. 33 shows a flow schematic of the remote host server computer 250, the data communication structure 255, the local control module 260, the local host interface component 240, and the local human perceptible interface device 245 as one of the means for using the present invention.

Next, FIG. 34 shows a prior art sample of a portion of a standard appraisal report form that delineates the basic input attributes 90 that apply to the selected specific property 55 and the like grouping of input data 95 that apply to the comparable properties 60, 65, and/or 70, although additional input attributes 90 and input data 95 could also be included. Thus in FIG. 34 for prior art manual on-site appraisals by an individual appraiser use the basic input attributes 90 and input data 95 in comparing the selected specific property 55 to the comparable properties 60, 65, and/or 70, the basic input attributes 90 and input data 95 which could be termed comparing the fixed tangible physical aspects 90, 95 of various properties 55, plus 60, 65, and/or 70 to one another, wherein manual appraisal value adjustments + (−) are made for differences in the fixed tangible physical aspects 90, 95 of various properties 55, plus 60, 65, and/or 70 to one another (such as adding or subtracting a set property value amount from the manual appraisal for different numbers of bedrooms 90, 95 between properties 55, plus 60, 65, and/or 70), note that there is no consideration of unique individual property aspects of function/feature/finish/quality/material/groupings that the present application terms token features 100, 105 that do have a market influence upon property value 235 as described in this specification.

Thus, FIG. 35 shows a single tract of land 75, 80, or 85 specific group of sales data for a number of sold properties 60 disposed within the single tract of land 75, 80, or 85 with the lower bar chart showing the eight typical basic fixed tangible physical aspects 90, 95 of various properties 60, and their relative varying influence upon property sold price which correlates with the upper plot that shows the deviation of actual property sold 60 prices in relation to the linear sloped line, such that if the eight typical basic fixed tangible physical aspects 90, 95 of various properties 60 are given equal weight from the prior art manual on-site appraisal by an individual for their influence in actual property 60 sold price then the property 60 sold prices would fall on the linear sloped line. However, as shown in FIG. 35 the deviation of property sold 60 prices from the linear sloped line that is explained by the varying heights of the lower bar charts, wherein for this particular tract of land 75, 80, or 85 the lot size 90, 95 had a large price influence on the sold property 60 and the finished basement 90, 95 had a small price influence on the sold property 60. Note that for FIG. 35 the eight typical basic fixed tangible physical aspects 90, 95 are pulled from the standard appraisal report portion described in FIG. 34, there could be more than eight typical basic fixed tangible physical aspects 90, 95, however, these eight typical basic fixed tangible physical aspects 90, 95 are used as being the most common.

Following, FIG. 36 is the same setup as FIG. 35 except for a different tract of land 75, 80, or 85 that shows a group of sales data for a number of sold properties 60 disposed within the different tract of land 75, 80, or 85 with the lower bar chart showing the eight typical basic fixed tangible physical aspects 90, 95 of various properties 60 and their relative varying influence upon property 60 price which correlates with the upper plot that shows the deviation of actual property sold 60 prices in relation to the linear sloped line, noting that the fixed tangible physical 90, 95 aspects of various properties 60 have a differing variance from what is shown in FIG. 35. Such that in FIG. 36, if the eight typical basic fixed tangible physical aspects 90, 95 of various properties 60 are given equal weight from the prior art manual on-site appraisal by an individual for their influence in actual property sold 60 price then the property sold 60 prices would fall on the linear sloped line.

However, as shown in FIG. 36 the deviation of property sold 60 prices from the linear sloped line that is explained by the varying heights of the lower bar charts, wherein for this different tract of land 75, 80, or 85 the age 90, 95 of the property 60 had a large price influence and the finished basement 90, 95 had a small price influence. Thus as comparing between FIGS. 35 and 36 it can be seen that the influence in sold price of each of the eight fixed tangible physical aspects 90, 95 of the various properties 60 changes depending upon what tract of land 75, 80, or 85 the sales data is taken from, meaning that giving each one of the eight fixed tangible physical aspects 90, 95 of the various properties 60 equal weight upon sold price as do prior art manual appraisal methods does not accurately reflect the dynamic importance (tract 75, 80, or 85 by tract 75, 80, or 85 differences) that buyers place upon each of the eight fixed tangible physical aspects 90, 95 of the various properties 60 in what they will pay for a particular property. Note that for FIG. 36 the eight typical basic fixed tangible physical aspects 90, 95 are pulled from the standard appraisal report portion described in FIG. 34, there could be more than eight typical basic fixed tangible physical aspects 90, 95, however, these eight typical basic fixed tangible physical aspects 90, 95 are used as being the most common.

Following next, FIG. 37 is the same setup as FIGS. 35 and 36 except for yet another different tract of land 75, 80, or 85 that shows a group of sales data for a number of sold properties 60 disposed within the different tract of land 75, 80, or 85 with the lower bar chart showing the eight typical basic fixed tangible physical aspects 90, 95 of various properties 60 and their relative varying influence upon property 60 price which correlates with the upper plot that shows the deviation of actual property sold 60 prices in relation to the linear sloped line, noting that the fixed tangible physical aspects 90, 95 of various properties 60 have a differing variance from what is shown in FIGS. 35 and 36. Such that in FIG. 37 if the eight typical basic fixed tangible physical aspects 90, 95 of various properties 60 are given equal weight from the prior art manual on-site appraisal by an individual for their influence in actual property sold 60 price then the property sold 60 prices would fall on the linear sloped line.

However, as shown in FIG. 37 the deviation of property sold 60 prices from the linear sloped line that is explained by the varying heights of the lower bar charts, wherein for this different tract of land 75, 80, or 85 the square feet 90, 95 of the property 60 had a large price influence and the age 90, 95 of the property 60 had a small price influence. Thus as comparing between FIGS. 35 and 36 it can be seen that the influence in sold price of each of the eight fixed tangible physical aspects 90, 95 of the various properties 60 changes depending upon what tract of land 75, 80, or 85 the sales data is taken from, meaning that giving each one of the eight fixed tangible physical aspects 90, 95 of the various properties 60 equal weight upon sold price as do prior art manual appraisal methods does not accurately reflect the dynamic importance (tract 75, 80, or 85 by tract 75, 80, or 85 differences) that buyers place upon each of the eight fixed tangible physical aspects 90, 95 of the various properties 60 in what they will pay for a particular property. Note that for FIG. 37 the eight typical basic fixed tangible physical aspects 90, 95 are pulled from the standard appraisal report portion described in FIG. 34, there could be more than eight typical basic fixed tangible physical aspects 90, 95, however, these eight typical basic fixed tangible physical aspects 90, 95 are used as being the most common.

Figure 38:
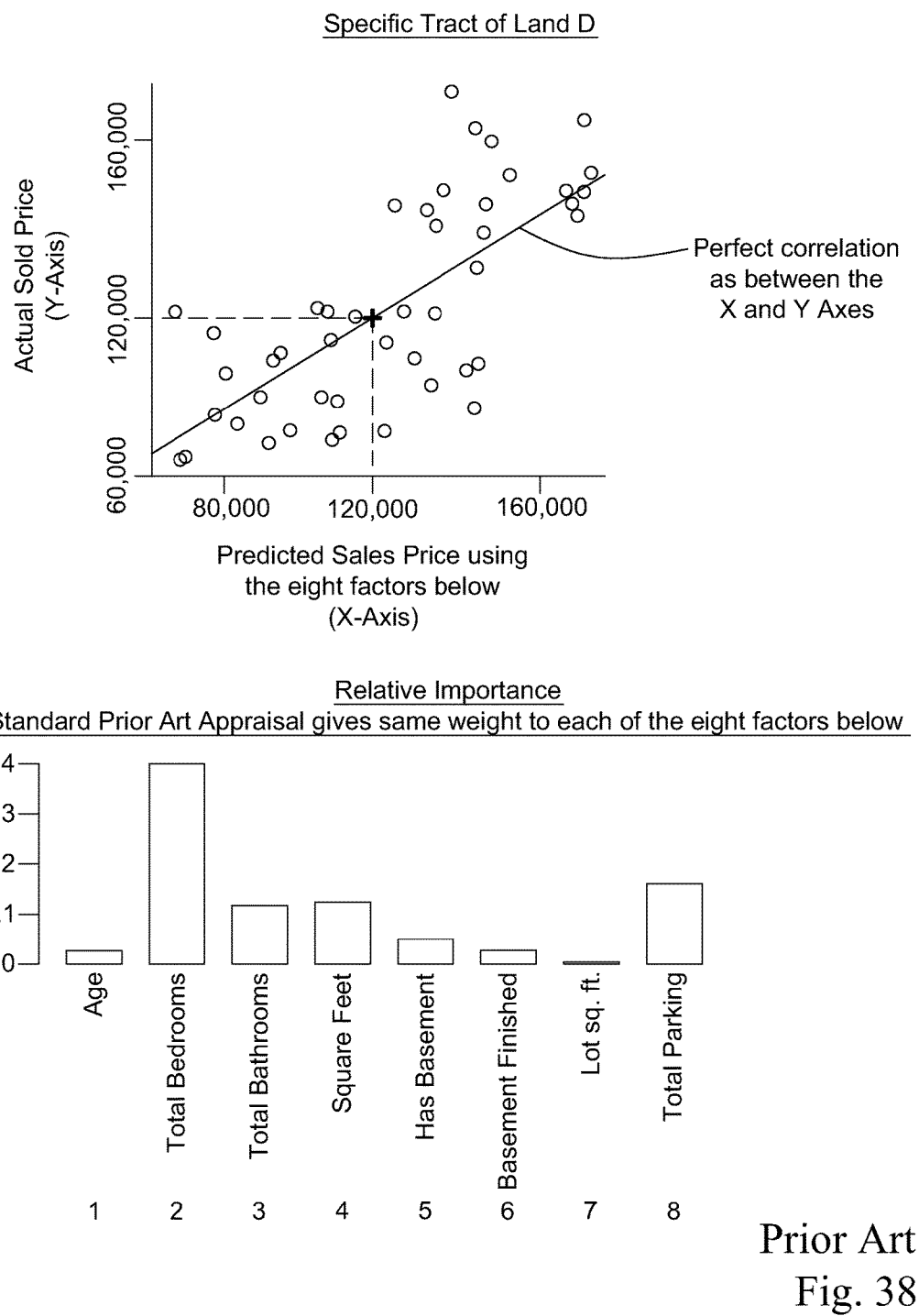
FIG. 38 is the same setup as FIGS. 35, 36, and 37 except for yet another different tract of land that shows a group of sales data for a number of sold properties disposed within the different tract of land with the lower bar chart showing the eight typical basic fixed tangible physical aspects of various properties and their relative varying influence upon property price which correlates with the upper plot that shows the deviation of actual property sold prices in relation to the linear sloped line, noting that the fixed tangible physical aspects of various properties have a differing variance from what is shown in FIGS. 35, 36, and 37 such that if the eight typical basic fixed tangible physical aspects of various properties are given equal weight for their influence in actual property sold price then the property sold prices would fall on the linear sloped line, however, as shown the deviation of property sold prices from the linear sloped line that is explained by the varying heights of the lower bar charts, wherein for this different tract of land the total bedrooms of the property had a large price influence and the square footage of the lot of the property had a small price influence, thus as comparing between FIGS. 35, 36, and 37 it can be seen that the influence in sold price of each of the eight fixed tangible physical aspects of the various properties changes depending upon what tract of land the sales data is taken from, meaning that giving each one of the eight fixed tangible physical aspects of the various properties equal weight upon sold price as do prior art manual appraisal methods does not accurately reflect the dynamic importance (tract by tract differences) that buyers place upon each of the eight fixed tangible physical aspects of the various properties in what they will pay for a particular property.

Further, following next, FIG. 38 is the same setup as FIGS. 35, 36, and 37 except for yet another different tract of land 75, 80, or 85 that shows a group of sales data for a number of sold properties 60 disposed within the different tract of land 75, 80, or 85 with the lower bar chart showing the eight typical basic fixed tangible physical aspects 90, 95 of various properties 60 and their relative varying influence upon property 60 price which correlates with the upper plot that shows the deviation of actual property sold 60 prices in relation to the linear sloped line, noting that the fixed tangible physical aspects 90, 95 of various properties 60 have a differing variance from what is shown in FIGS. 35, 36, and 37. Such that in FIG. 38 if the eight typical basic fixed tangible physical aspects 90, 95 of various properties 60 are given equal weight from the prior art manual on-site appraisal by an individual for their influence in actual property sold 60 price then the property sold 60 prices would fall on the linear sloped line.

However, as shown in FIG. 38 the deviation of property sold 60 prices from the linear sloped line that is explained by the varying heights of the lower bar charts, wherein for this different tract of land 75, 80, or 85 the total bedrooms 90, 95 of the property 60 had a large price influence and the square footage of the lot 90, 95 of the property 60 had a small price influence. Thus as comparing between FIGS. 35, 36, and 37 it can be seen that the influence in sold price of each of the eight fixed tangible physical aspects 90, 95 of the various properties 60 changes depending upon what tract of land 75, 80, or 85 the sales data is taken from, meaning that giving each one of the eight fixed tangible physical aspects 90, 95 of the various properties 60 equal weight upon sold price as do prior art manual appraisal methods does not accurately reflect the dynamic importance (tract 75, 80, or 85 by tract 75, 80, or 85 differences) that buyers place upon each of the eight fixed tangible physical aspects 90, 95 of the various properties 60 in what they will pay for a particular property. Note that for FIG. 38 the eight typical basic fixed tangible physical aspects 90, 95 are pulled from the standard appraisal report portion described in FIG. 34, there could be more than eight typical basic fixed tangible physical aspects 90, 95, however, these eight typical basic fixed tangible physical aspects 90, 95 are used as being the most common.

Broadly, the present invention is defined by FIGS. 1 to 38, that is of the automated real estate valuation system 50 for the selected specific property 55, that includes a direct physical selected specific property input attributes database 90 that is existing being affixed to the selected specific property 55, the attributes database 90 includes a plurality of input attributes 90 that are fixed, tangible, and existing for the selected specific property 55 that is disposed within the specific tract of land 75. Further included in the automated real estate valuation system 50 is a plurality of primary token features 100 associated with the selected specific property 55 that are within the specific tract of land 75. In addition, for the automated real estate valuation system 50 included are a plurality of direct physical property input data sets 95, wherein each of the direct physical property input data 95 sets are defined by sales data for a recently sold property 60 that are existing being affixed to each recently sold property 60, each input data set 95 includes a plurality of input data 95 that are fixed, tangible, and existing for each recently sold property 60 that is disposed within the specific tract of land 75. Also for the recently sold properties 60 a group of secondary token feature sets 105 that are each formed from a plurality of secondary token features 105 associated with each recently sold property 60 that is disposed within the specific tract of land 75, see FIG. 1.

Continuing for the automated real estate valuation system 50 included are one or more processors 130, memory 135, and one or more programs 140, wherein the one or more programs 140 are stored in the memory 135 and configured to be executed by the one or more processors 130, the one or more programs 140 including instructions to locate at least a selected number of recently sold properties 60 that are all disposed within the specific tract of land 75, see FIGS. 2, 5, and 33. The selected number recently sold properties 60 include the direct physical property input data sets 95, with one input data set 95 for each recently sold property 60, each input data set 95 for each recently sold property 60 and the selected specific property input attributes database 90 are each further compared to one another to be within a first selected range 145 of a first matched item 185 from each input data set 95, see FIG. 2. Further, the input attributes database 90 are each further compared to a second selected range 150 of a second matched item 190 from each input data set 95 to the input attributes database 90 forming a first qualified assemblage 205 of the recently sold properties 60 disposed within the specific tract of land 75 that include a group of secondary token feature sets 105 associated with the recently sold properties 60 in the first qualified assemblage 205, again see FIG. 2.

Continuing, for the automated real estate valuation system 50 are instructions for utilizing from the first qualified assemblage 205 the group of secondary token feature sets 105 wherein each secondary token feature set 105 is associated with a recently sold property 60 within the first qualified assemblage 205. Wherein each of the secondary token feature sets 105 as between each of the first qualified assemblage 205 recently sold properties 60 are compared on a matching feature basis, wherein matching features are removed to form a remaining group of first qualified secondary differentiated token feature sets 105 wherein each first qualified secondary token feature set 105 is associated with each recently sold property 60 of the first qualified assemblage 205. Further, each of a remaining collection of first qualified secondary token features 105 are given a weight 125 to explain differences in input data set 95 items of a third matched item 195 as between the first qualified assemblage 205 recently sold properties via the valuation algorithm 230.

Next, for the automated real estate valuation system 50 are instructions for determining a calculated output value 235 for the selected specific property 55 by utilizing the weights 125 of the first qualified secondary token features 105 that have the highest number of matching equivalents to the plurality of primary token features 100 forming an equivalent batch portion of the first qualified weighted secondary token features 105 that are used to adjust the third matched item 195 to calculate a value for the third matched item 195 defined as a secondary tokenized value that is applied to the third matched item 195 to output a calculated value 235 for the selected specific property 55 via the valuation algorithm 230. What this is essentially is that the recently sold properties 60 in the first qualified assemblage 205 all have differing sold prices per square foot that can be explained by the token features 105 that are different (first qualified secondary token features 105) as between each of the sold 60 properties wherein the random forest regression algorithm 230 gives a unique dynamic weight 125 for each sold property 60 sold price per square foot difference to the different token features 105 so that these weighted token features 105 can be matched with the primary token features 100 to calculate a price per square foot value for the selected specific property 55, or alternatively the price per square foot effect for selected token features 100, 105 can be used by investors and home buyers to see what token features 100, 105 add or subtract value from a property.

Alternatively, looking is particular at FIGS. 5, 6, and 7 for the automated real estate valuation system 50 for a selected specific property 55 can further comprise programming instructions for the use of an adjacent tract of land 80 in addition to the specific tract of land 75 when the program 140 instructions fail to locate at least the selected number of preferred recently sold properties 60 being about five in number that are disposed within the specific tract of land 75. Wherein, then the adjacent tract of land 80 is used to find an adjacent selected number of additional recently sold properties 60 to meet the selected number of about five of the recently sold properties 60, criterion for determining that the adjacent tract of land 80 is qualified. Thus to qualify the adjacent tract of land 80 requires a series of tests; are that it must be in contact with at least a portion of the specific tract of land 75, see FIG. 5, further the adjacent tract of land 80 must be in the same county as the specific tract of land 75, and the adjacent tract of land 80 must be within a selected population density of the specific tract of land 75. Within the qualified adjacent tract of land 80 there are further programming 140 instructions to locate at least an adjacent selected number of the recently sold properties 60 in the qualified adjacent tract of land 80 that include the direct physical property input data sets 95 with one input data set 95 for each recently sold property 60.

Wherein, the adjacent selected number of recently sold properties 60 are all disposed within the qualified adjacent tract of land 80, each input data set 95 for each recently sold adjacent property 60 and the selected specific property input attributes 90 database are each further compared to one another to be within a fourth selected range 160 that is less than the second selected range 150, the fourth selected range 160 is of a first matched item 185 from the input data sets 95 from the selected adjacent tract 80 recently sold properties 60 and the input attributes database 90. Within a fifth selected range 165 that is less than said second selected range 150, the fifth selected range 165 is of a second matched item 190 from the input data sets 95 from the selected adjacent tract 80 recently sold properties 60 and the input attributes database 90 forming a second qualified assemblage 210 of the recently sold properties 60 in the qualified adjacent tract of land 80. Wherein the first 205 and second 210 qualified assemblages are combined to form a first combined assemblage 220 to meet the selected number (being preferably at least about five) of recently sold properties 60, wherein the first combined assemblage 220 replaces the first qualified assemblage 205 in the automated real estate valuation system 50 valuation algorithm 230 calculated output value 235.

Further, alternatively, looking in particular at FIGS. 5, 6, and 7 for the automated real estate valuation system 50 for a selected specific property 55 can further comprise programming 140 instructions for the use of a nearby tract of land 85 in addition to the adjacent tract of land 80 and the specific tract of land 75 when the selected number of recently sold properties 60 that are disposed both within the adjacent tract of land 80 and specific tract of land 75, then the nearby tract of land 85 is used to find additional recently sold properties 60 to meet the selected number of recently sold properties 60 which is preferably at least about five recently sold properties 60. Criterion for determining that the nearby tract of land 85 is qualified; is that the nearby tract of land must be in the same county as the specific tract of land 75 and within a selected population density of the specific tract 75 of land. Once the nearby tract of land 85 is qualified, then within the qualified nearby tract of land 85 there are further programming instructions to locate at least a nearby selected number of recently sold properties 60 in the qualified nearby tract of land 85 that include the direct physical property input data sets 95 with one input data set 95 for each recently sold property 60, wherein the nearby selected number of recently sold properties 60 are all disposed within the qualified nearby tract of land 85.

Each input data set for each recently sold nearby tract 85 property 60 and the selected specific property input attributes database 90 are each further compared to one another to be within a sixth selected range 170 that is less than the second selected range. The sixth selected range 170 is of a first matched item 185 from the input data sets 95 from the selected nearby tract 85 recently sold properties 60 and the input attributes database 90 and within a seventh selected range 175 that is less than said fourth selected range 160, the seventh selected range 175 is of the second matched item 190 from the input data sets 95 from the selected nearby tract 85 recently sold properties 60 and the input attributes database 90 forming the third qualified assemblage 215 of the recently sold properties 60 in the qualified nearby tract of land 85. Wherein the first 205, second 210, and third 215 qualified assemblages are combined to form the second combined assemblage 225 to meet the selected number of recently sold properties 60, wherein the second combined assemblage 225 replaces the first qualified assemblage 205 in the automated real estate valuation system 50 valuation algorithm 230 calculated output value 235. Thus as the sold properties 60 are pulled from further tracts of land 80, 85, the ranges for comparing items 95 tighten up to compensate for the higher risk of dissimilar sold properties 60 in remote tracts 80, 85 due to differences in amenities and the like as explained in the definitions section.

Further, for the automated real estate valuation system 50 for the selected specific property 55 the valuation algorithm 230 is preferably a Random Forest Regression or a suitable equivalent.

In addition, looking in particular at FIG. 4 for the automated real estate valuation system 50 for the selected specific property 55, can further comprise programming 140 instructions wherein the input attributes database 90 further includes a list price for the selected specific property 55 wherein a difference is calculated as between the list price and the output calculated value 235 for the selected specific property 55. Wherein if the difference is less than a selected percentage, being preferably about twenty percent, the list price is substituted for the output calculated value 235 for the specific property 55 and if the difference is greater than the selected percentage stated above, the list price and the output value 235 for the selected specific property 55 are averaged to form a modified output value for the selected specific property 55.

Also to further expand the available recently sold properties 60 input data sets 95 for the automated real estate valuation system 50, looking at particular at FIGS. 2 and 3, for the selected specific property 55 can further comprise programming 140 instructions to add properties under a sales contract 65 to the recently sold properties 60. Wherein the properties under contract 65 are all disposed within the specific tract of land 75, the contract price is substituted for the sales price of a recently sold property 60, and each property under contract 65 includes an input data set 95 and the secondary token feature sets 105. Wherein the properties under contract 65 are combined with the recently sold properties 60 to form the first qualified assemblage 205 to be used in the algorithm 230 to eventually output 235 the calculated value for the selected specific property 55.

In addition, to even further expand the available recently sold properties 60 input data sets 95, also in looking at FIGS. 2 and 3, for the automated real estate valuation system 50 for the selected specific property 55 can further comprise programming 140 instructions to add actively listed properties 70 to the recently sold properties 60. Wherein the actively listed properties 70 are all disposed within the specific tract of land 75, a list price for the actively listed property 70 is substituted for the sales price of a recently sold property 60, and each of the actively listed properties 70 include an input data set 95 and the secondary token feature sets 105. Wherein the actively listed properties 70 are combined with the recently sold properties 60 to form the first qualified assemblage 205 to be used in the algorithm 230 to eventually output 235 the calculated value for the selected specific property 55.

Also, in looking at FIGS. 8, 10, and 11, for the automated real estate valuation system 50 for the selected specific property 55 the primary token features 100 and secondary token feature sets 105 are preferably derived from text descriptions 110 that are given in each property listing being potentially properties 60, 65, or 70. The text descriptions 110 are further analyzed and broken down into species of singular words and phrases that are categorized in a consolidated manner into a plurality of genus clusters 115 that each represent a unique token descriptive feature that is assigned a unique index identifier 120 resulting in a plurality of unique token descriptive features that are each assigned the unique index identifier 120. Therefore the particular property 60, 65, or 70 is attached to a plurality of the unique index identifiers 120 that are applicable only to the particular property 60, 65, or 70, each unique index identifier 120 represents numerically one or more of the species of singular words and phrases 110, wherein the valuation algorithm 230 substitutes the plurality of unique index identifiers 120 to represent one or more of the first qualified secondary token features to complete the output calculated value 235 for the selected specific property 55.

As a further optional refinement, again in looking at FIGS. 8, 10, and 11, for the automated real estate valuation system 50 for the selected specific property 55, a further weighted ranking of each one of the plurality of the genus clusters 115 is based upon a number of the species of singular words and phrases 110 within each genus cluster 115. Wherein a higher number of the species of singular words and phrases 110 equaling a higher relative weighting of each genus cluster 115 relative to other genus clusters 115, wherein the valuation algorithm 230 substitutes the weighted genus clusters 115 one for one for the first qualified secondary token features to complete the output calculated value 235 for the selected specific property 55.

Preferably as an option for the automated real estate valuation system 50 for the selected specific property 55, see FIG. 2 in particular, wherein the first matched item 185 is typically a building style for the properties 60, 65, or 70, that is selected from the group that includes ranch, multi-story, bi-level, split-level, tri-level, patio home, town house, condo, row house, loft, apartment and the like from the input data sets 95 to form the first qualified assemblage 205. Furthermore, alternatively for the automated real estate valuation system 50 for the selected specific property 55, again see FIG. 2 in particular, the second matched item 190 for the properties 60, 65, or 70 is preferably building square footage from the input data sets 95 to form the first qualified assemblage 205. Also, optionally for the automated real estate valuation system 50 for the selected specific property 55, again see FIG. 2 in particular, the fourth matched item 200 for the properties 60, 65, or 70 is preferably the property lot square footage to be within an eighth selected range 180 from the input data sets 95 to form the first qualified assemblage 205, preferably as an initial criterion of lot size 65 for the properties 60, 65, or 70 is whether they are greater than one acre in size or less than one acre in size for logically comparing properties 60, 65, or 70 that have rural type land area—greater than one acre or city type lot area—less than one acre.

As a further explanation of the effect of the subjective or emotional factors in the determination of a property's value which are accounted for in the previously described primary token features 100 associated with the selected specific property 55 and the secondary token features 105 associated with the previously described properties 60, 65, or 70, wherein there is crossover of features 100 and 105, as the features 105 are used with properties 60, 65, or 70 to determine the amount of buying emotional influence upon the properties 60, 65, or 70 price differences that are then applied to matching features 100 on the selected specific property 55 to arrive at the AVM 50 calculated value 235 for the selected specific property 55 via the algorithm 230, FIGS. 8, 10, and 11 show based on basically sold properties 60, 65, or 70 data the property 60, 65, or 70 value effects of various features 105. FIG. 8, shows where the various features 105 occur in relation to price sold per square foot levels, thus the influence of a particular feature 105 is very dynamic depending upon the subject property, as an example the feature 105 of a Gazebo is common at the higher price per square foot levels and thus would not have much weight upon the property value as being a more normal or expected feature as compared to the same feature 105 of a Gazebo at the lower price per square foot levels wherein this feature would carry a higher value added weight to the property value as being a more unique of unusual feature 105.

FIG. 10 shows this feature 105 effect idealized for clarity of price per square foot via the curve slope being non-linear for a given tract of land 75 wherein presumably the properties 60, 65, or 70 are of a fairly common type, size, and style in a single tract of land 75 that also exhibits commonality of area amenities such as access to parks, shopping, schools, and the like, thus in effect trying to factor out the common or close factors of house type, size, and style along with area amenities, leaving the price per square foot differences to be attributed to the features 105. FIG. 11 shows the raw data of FIG. 10, again showing price per square foot via the curve slope being non-linear for a given tract of land 75 wherein presumably the properties 60, 65, or 70 are of a fairly common type, size, and style in a single tract of land 75.

Thus returning in detail for FIG. 10 for the automated real estate valuation system 50 for a selected specific property 55, wherein the third matched item 195 is a sold price per square foot for each recently sold property 60, 65, or 70, resulting in a varied grouping being a range of sold prices per square foot for all properties 60, 65, or 70 in the first qualified assemblage 205, wherein the curve is generated with the sold prices per square foot going from low to high on the "Y" axis and the "X" axis showing a cumulative number of properties 60, 65, or 70, wherein the curve is parsed into a plurality of factions that are determined by where there is a cluster grouping of sold property 60 sold price per square foot 150, 190, see the definition of "Factions" for more detailed information. Each of the plurality of factions begins and ends on the "Y" axis where there is a natural grouping of sold prices per square foot 150, 190 about a centroid sold price per square foot 150, 190. Wherein a faction represents one or more recently sold properties 60, 65, or 70, the secondary token feature sets 105 that are associated with the properties 60, 65, or 70 in each faction are congregated in each faction. Wherein as between each faction that is adjoining, common secondary token features 105 are removed and each of a remaining group of first qualified secondary token features sets are as between two adjoining factions having the weighted ranking are used to explain differences in the sold prices per square foot for the properties 60, 65, or 70 via the valuation algorithm 230.

In order to make the weighted property 55, 60, 65, or 70 effect of the features 100 and 105 upon property 55, 60, 65, or 70 value to have utility to for instance property investors and home buyers as shown in various screen shots depicted in FIGS. 12, 17, 20, 21, 23, 25, 28, and 30, multiple runs of the automated real estate valuation system 50 can be made to see what features 100 or 105 can be beneficial to add to existing properties 55 for increasing property 55 value, plus evaluating the cost of adding these particular features 100 or 105 based upon the actual effect of the features 100 or 105 upon sales price of properties 55, 60, 65, or 70 of interest to the property investor or home buyer. Further, in looking at FIGS. 20, 21, and 30 in particular the a "K-Means" algorithm from FIG. 11 is used to create the horizontal divisions that are parallel to the "X" axis into what is termed "Q-Values" that are basically ranges of sold prices per square foot for various properties within a specific tract of land, thus FIGS. 20, 21, and 30 show the output 235 "Q-Values" for that specific tract 75 that the selected specific property 55 is disposed within, wherein the "Q-Values" depict a range of sold price groupings from low to high for that specific tract of land 75.

Thus, as an added option for the automated real estate valuation system 50 in the form of the remote access apparatus as shown in FIG. 31, i.e. using a cloud based system 50 with desktop computers, tablets, or smart phones-wired or wireless, the local host interface component 240 and the remote host server computer 250, or combination thereof can further comprise programming 140 instructions to a search screen depicted in FIGS. 12, 17, 20, 21, 23, 25, 28, and 30 for sold real estate properties 60, 65, or 70 that includes a property style that is user selected from the group that includes ranch, multi-story, bi-level, split-level, patio home, town house, condo, apartment, and the like. Further a maximum property price 60, 65, or 70 is input by the user, and a minimum percentage spread as between the automated output calculated value 235 for the selected specific property 55 and the list price with the resulting output 235 being a search result specific property 55 including a description, picture, and list price. Plus utilizing the faction generating curve that the search result property 55 is disposed on, a plurality of automated output values 235 are created based upon the weighted secondary token features 105 to show an effect of the secondary token features 105 upon the plurality of output calculated values 235 for the search result specific property 55, wherein the user sees the effect on a property 55 price of various secondary token features 105 based upon sold property data.

Incorporation by reference to the specification for the source code as follows:
Source code—concurrently submitted as ASCII text files;
Files description: Source code for the novel code of the patent application.
Polygon Code Follows
File name: multipartpyASCII
File size (KB): 6.0
File creation date: Feb. 7, 2014
Author: Hayk Yeritsian
File name: subdivisions_2004 PostProcesscpgASCII
File size (KB): 1.0
File creation date: Feb. 7, 2014
Author: Hayk Yeritsian
File name: subdivisions_2004 PostProcessdbfASCII
File size (KB): 23,328.0
File creation date: Feb. 7, 2014
Author: Hayk Yeritsian
File name: subdivisions_2004 PostProcessprjASCII
File size (KB): 1.0
File creation date: Feb. 7, 2014
Author: Hayk Yeritsian
File name: subdivisions_2004 PostProcesssbnASCII
File size (KB): 233.0
File creation date: Feb. 7, 2014
Author: Hayk Yeritsian
File name: subdivisions_2004 PostProcesssbxASCII
File size (KB): 8.0
File creation date: Feb. 7, 2014
Author: Hayk Yeritsian File name: subdivisions_2004PostProcessshpxmlASCII
File size (KB): 7.0
File creation date: Feb. 7, 2014
Author: Hayk Yeritsian
File name: subdivisions_2004 PostProcessshxASCII
File size (KB): 393.0
File creation date: Feb. 7, 2014
Author: Hayk Yeritsian
Backend Code Follows
File name: Auto_Email_Client_ListingsphpASCII
File size (KB): 8.0
File creation date: Jun. 19, 2014
Author: Neelesh Chouksey
File name: Auto_Email_Client_Listings_ChangesphpASCII
File size (KB): 5.0
File creation date: May 29, 2014
Author: Neelesh Chouksey
File name: combine_geodnaphpASCII
File size (KB): 1.0
File creation date: Jun. 9, 2014
Author: Neelesh Chouksey
File name: Combine_QDNA_ProcessingphpASCII
File size (KB): 4.0
File creation date: Jan. 29, 2015
Author: Neelesh Chouksey
File name: compile_polygon_statsphpASCII
File size (KB): 9.0
File creation date: Jan. 5, 2015
Author: Neelesh Chouksey
File name: Compile_Subdivision_NamesphpASCII
File size (KB): 24.0
File creation date: Feb. 26, 2015
Author: Neelesh Chouksey
File name: Copy_Valuation_R_Baseline_tablesphpASCII
File size (KB): 7.0
File creation date: Oct. 1, 2014
Author: Neelesh Chouksey
File name: decode_feature_codesphpASCII
File size (KB): 5.0
File creation date: Dec. 2, 2014
Author: Aleksander Babayev
File name: findmore_batchphpASCII
File size (KB): 36.0
File creation date: Feb. 22, 2015
Author: Neelesh Chouksey
File name: findmore_soldphpASCII
File size (KB): 34.0
File creation date: Feb. 14, 2015
Author: Neelesh Chouksey
File name: getretsdataphpASCII
File size (KB): 15.0
File creation date: Feb. 20, 2015
Author: Aleksander Babayev
File name: getretsdata_dictbuilderphpASCII
File size (KB): 17.0
File creation date: Jan. 2, 2015
Author: Aleksander Babayev
File name: getretsdata_dictneighbourhoodphpASCII
File size (KB): 21.0
File creation date: Dec. 30, 2014
Author: M Apurva
File name: getretsdata_dictschoolphpASCII
File size (KB): 18.0
File creation date: Aug. 5, 2014
Author: M Apurva
File name: getretsdata_parkingphpASCII
File size (KB): 18.0
File creation date: Feb. 14, 2015
Author: M Apurva
File name: importretsdataphpASCII
File size (KB): 99.0
File creation date: Feb. 12, 2015
Author: Aleksander Babayev
File name: keyword_text_analysisphpASCII
File size (KB): 18.0
File creation date: Jan. 6, 2015
Author: Aleksander Babayev
File name: Missing_Real_Features_recordsphpASCII
File size (KB): 6.0
File creation date: Jan. 6, 2015
Author: M Apurva
File name: movefilephpASCII
File size (KB): 1.0
File creation date: Jun. 22, 2014
Author: Neelesh Chouksey
File name: mysqlconfig_productionphpASCII
File size (KB): 1.0
File creation date: Jul. 31, 2014
Author: Aleksander Babayev
File name: mysqlhandler_2_0 phpASCII
File size (KB): 12.0
File creation date: Feb. 12, 2015
Author: Aleksander Babayev
File name: neighborhoodphpASCII
File size (KB): 7.0
File creation date: Jan. 28, 2015
Author: Neeshesh Chouksey
File name: process_QDNA_fieldsphpASCII
File size (KB): 7.0
File creation date: Jan. 12, 2015
Author: Neelesh Chouksey
File name: process_status_log_insertphpASCII
File size (KB): 1.0
File creation date: Sep. 26, 2014
Author: Neelesh Chouksey
File name: Process_ExecutionphpASCII
File size (KB): 5.0
File creation date: Aug. 26, 2014
Author: Aleksander Babayev
File name: Qword_Baseline_CompilationphpASCII
File size (KB): 4.0
File creation date: Jan. 16, 2015
Author: Neelesh Chouksey
File name: Qword_CompilationphpASCII
File size (KB): 5.0
File creation date: Jan. 6, 2015
Author: Neelesh Chouksey
File name: real_agent_rets_keymapphpASCII
File size (KB): 1.0
File creation date: Apr. 11, 2014
Author: Aleksander Babayev
File name: real_features_keysphpASCII
File size (KB): 1.0
File creation date: Apr. 16, 2014
Author: Aleksander Babayev
File name: real_listing_rets_keymapphpASCII
File size (KB): 4.0
File creation date: Nov. 26, 2014
Author: Aleksander Babayev File name: real_listing_update_rets_keymapphpASCII
File size (KB): 3.0
File creation date: Apr. 11, 2014
Author: Aleksander Babayev
File name: real_location_rets_keymapphpASCII
File size (KB): 1.0
File creation date: Feb. 16, 2015
Author: Aleksander Babayev
File name: real_office_rets_keymapphpASCII
File size (KB): 1.0
File creation date: Apr. 11, 2014
Author: Aleksander Babayev
File name: real_qwordsphpASCII
File size (KB): 5.0
File creation date: Aug. 16, 2014
Author: Aleksander Babayev
File name: ret_correctionphpASCII
File size (KB): 28.0
File creation date: Jan. 25, 2015
Author: M Apurva
File name: ret_verify_newphpASCII
File size (KB): 15.0
File creation date: Jan. 22, 2015
Author: M Apurva
File name: rets_image_downloadphpASCII
File size (KB): 13.0
File creation date: May 23, 2014
Author: M Apurva
File name: RETS_Verify_StatusphpASCII
File size (KB): 12.0
File creation date: Feb. 16, 2015
Author: Neelesh Chouksey
File name: RETS_Withdrawn_ListingsphpASCII
File size (KB): 4.0
File creation date: Jan. 6, 2015
Author: Neelesh Chouksey
File name: retsconfig_productionphpASCII
File size (KB): 1.0
File creation date: Apr. 11, 2014
Author: Aleksander Babayev
File name: set_active_locationphpASCII
File size (KB): 4.0
File creation date: Jan. 31, 2015
Author: Neelesh Chouksey
File name: update_real_listing_by_RETSphpASCII
File size (KB): 5.0
File creation date: Feb. 3, 2015
Author: M Apurva
File name: update_real_location_subdivision_namephpASCII
File size (KB): 6.0
File creation date: Feb. 3, 2015
Author: M Apurva
File name: Update_reallisting_closedateandpricephpASCII
File size (KB): 5.0
File creation date: Jan. 30, 2015
Author: M Apurva
File name: walk_scorephpASCII
File size (KB): 12.0
File creation date: May 12, 2014
Author: M Apurva
GeoDNA Code Follows
File name: geodnaASCII
File size (KB): 11.0
File creation date: Jan. 23, 2014
Author: Neelesh Chouksey
File name: geodnaphpASCII
File size (KB): 2.0
File creation date: Jun. 9, 2014
Author: Neelesh Chouksey
File name: geodna_ajax_scriptphpASCII
File size (KB): 1.0
File creation date: Jun. 9, 2014
Author: Neelesh Chouksey
File name: Polygon_Center_ajax_scriptphpASCII
File size (KB): 1.0
File creation date: Jun. 9, 2014
Author: Neelesh Chouksey
File name: Polygon_Center_geodnaphpASCII
File size (KB): 2.0
File creation date: Jun. 9, 2014
Author: Neelesh Chouksey
Valuation Code Follows
File name: BaselineASCII
File size (KB): 3.0
File creation date: Dec. 14, 2014
Author: Adi Andrei
File name: BaselineExtASCII
File size (KB): 7.0
File creation date: Dec. 16, 2014
Author: Adi Andrei
File name: ClustersASCII
File size (KB): 6.0
File creation date: Dec. 13, 2014
Author: Adi Andrei
File name: dbGetDataASCII
File size (KB): 4.0
File creation date: Dec. 5, 2014
Author: Adi Andrei
File name: dbPricesASCII
File size (KB): 12.0
File creation date: Dec. 14, 2014
Author: Adi Andrei
File name: dbQValuesASCII
File size (KB): 11.0
File creation date: Dec. 16, 2014
Author: Adi Andrei
File name: mainASCII
File size (KB): 5.0
File creation date: Dec. 17, 2014
Author: Adi Andrei
File name: mainccASCII
File size (KB): 1.0
File creation date: Dec. 5, 2014
Author: Adi Andrei
File name: mainppASCII
File size (KB): 2.0
File creation date: Dec. 5, 2014
Author: Adi Andrei
File name: mainttASCII
File size (KB): 3.0
File creation date: Dec. 5, 2014
Author: Adi Andrei
File name: ReadmeASCII
File size (KB): 1.0
File creation date: Nov. 4, 2014
Author: Adi Andrei
File name: RForestASCII
File size (KB): 2.0
File creation date: Jun. 9, 2014
Author: Adi Andrei File name: TrendingASCII
File size (KB): 2.0
File creation date: Apr. 13, 2014
Author: Adi Andrei
File name: utilASCII
File size (KB): 6.0
File creation date: Dec. 16, 2014
Author: Adi Andrei
File name: utillogASCII
File size (KB): 1.0
File creation date: Apr. 13, 2014
Author: Adi Andrei
File name: utilplotASCII
File size (KB): 5.0
File creation date: Nov. 25, 2014
Author: Adi Andrei
File name: VModelASCII
File size (KB): 10.0
File creation date: Nov. 25, 2014
Author: Adi Andrei
File name: ccASCII
File size (KB): 1.0
File creation date: Dec. 16, 2014
Author: Adi Andrei
File name: runASCII
File size (KB): 1.0
File creation date: Dec. 16, 2014
Author: Adi Andrei
File name: run_termASCII
File size (KB): 1.0
File creation date: May 10, 2014
Author: Adi Andrei
Investor Code Follows
File name: DBLocalASCII
File size (KB): 3.0
File creation date: Sep. 8, 2014
Authors: Adi Andrei
File name: DenverInvestorASCII
File size (KB): 13.0
File creation date: Sep. 8, 2014
Authors: Adi Andrei
File name: MyTableModelASCII
File size (KB): 1.0
File creation date: Sep. 8, 2014
Authors: Adi Andrei
File name: utilASCII
File size (KB): 2.0
File creation date: Sep. 8, 2014
Authors: Adi Andrei
File name: ConfigurationManagerASCII
File size (KB): 2.0
File creation date: Sep. 8, 2014
Authors: Adi Andrei
Find More Properties Code Follows
File name: FindMoreASCII
File size (KB): 32.0
File creation date: Jan. 5, 2015
Authors: Adi Andrei
File name: findmore_batchphpASCII
File size (KB): 32.0
File creation date: Jan. 5, 2015
Authors: Adi Andrei
Geographic Information System GIS Process Code Follows
File name: gisProcesspyASCII
File size (KB): 25.0
File creation date: Jan. 11, 2015
Author: Laura Tateosian

CONCLUSION

Accordingly, the present invention of an automated real estate valuation system has been described with some degree of particularity directed to the embodiments of the present invention. It should be appreciated, though; that the present invention is defined by the following claims construed in light of the prior art so modifications of the changes may be made to the exemplary embodiments of the present invention without departing from the inventive concepts contained therein.

The invention claimed is:

1. An automated real estate valuation system for a selected specific property, comprising:
a network-connected valuation computer, for automatically quantifying qualitative characteristics associated to a selected property within a specific tract of land to determine valuation, comprising a processor, a database, a memory, and programming instructions stored in the memory, the programming instructions when executed by the processor, cause the processor to:
receive, from a remote access apparatus a property style, the property style comprising a plurality of input attributes associated to the selected property;
receive a plurality of connections from a plurality of remote access apparatuses;
receive, from a first remote access apparatus of the plurality of remote access apparatuses, a maximum value;
receive, from the first remote access apparatus, a plurality of primary token features associated to the selected property;
(c) receive, from the input attributes database, a plurality of property input data sets, each property input data set comprising data associated to a recently sold property of a plurality of recently sold properties disposed within the specific tract of land, wherein at least a portion of the plurality of input datasets are secondary token features sets, each secondary token feature set comprising secondary token features;
locate, in the database via a database search, at least a selected number of data records associated to the plurality of recently sold properties for each property input data set of the plurality of property input data sets compare the plurality of input attributes for the selected property to a first property input data set to find at a first matched feature within a first selected range and a second matched feature within a second selected range, and a third matched feature to be within a third selected range to form a first qualified assemblage associated to recently sold properties;
utilize from the first qualified assemblage the group of secondary token feature sets wherein each secondary token feature set is associated to a recently sold property within said first qualified assemblage, wherein each of secondary token feature sets as between each of said first qualified assemblage recently sold properties are compared on a matching feature basis, wherein matching features are removed to form a remaining group of first qualified secondary differentiated token feature sets wherein each first qualified secondary token feature set is associated with each recently sold property of the first qualified assemblage, each of a remaining collection of first qualified secondary token features are given a weight to explain differences in input data set features between the first qualified assemblage associated to recently sold properties via a valuation computation, the valuation computation comprising a random forest regression of, at least, the first qualified secondary token features to provide a unique dynamic weight associated to each recently sold property; and determine a first calculated value associated to the selected specific property by utilizing the weights of the first qualified secondary token features that have the highest number of matching equivalents to the plurality of primary token features forming an equivalent batch portion of the first qualified weighted secondary token features that are used to adjust the third matched feature to calculate a value for the third matched feature defined as a secondary tokenized value that is applied to the third matched feature to output the first calculated value associated to the selected specific property via the valuation computation;

assign a unique index identifier for a plurality of unique token descriptive features that are each assigned a unique index identifier associated to a plurality of unique index identifiers, each unique index identifier represents numerically one or more of species of singular words and phrases, the valuation computation substitutes the plurality of unique index identifiers one for one for said first qualified secondary token features to compute a second calculated value for the selected specific property;

(e) (v) compute a weighted ranking of each genus cluster of a plurality of genus clusters based upon a number of species of singular words and phrases within each genus cluster, with a higher number of species of singular words and phrases equaling a higher weighting of each genus cluster relative to other genus clusters, of the plurality of genus clusters, the valuation computation substitutes the weighted genus clusters one for one for the first qualified secondary token features to compute a third calculated value for said selected specific property;

sending, to an interface component of the first remote access apparatus, the first, second, and third calculated values;

wherein the weights associated to the remaining collection of first qualified secondary token features are received by at least a portion of the plurality remote access apparatuses;

wherein criterion for determining if an assemblage is qualified is that there is contact of one or more token features with at least a portion of the specific tract of land;

wherein the plurality of primary token features and the plurality of secondary token feature sets are derived from text descriptions that are given in each property listing, the text descriptions are further analyzed and broken down into species of singular words and phrases, that are categorized into clusters, via k-means clustering, in a consolidated manner into the plurality of genus clusters;

wherein the input attributes database further includes a list price for the selected specific property wherein a difference is calculated as between said list price and said output calculated value for the selected specific property, wherein if the difference is less than the minimum percentage the list price is substituted for the output calculated value for the specific property, if the difference is greater than the selected percentage, the list price and the output value for the selected specific property are averaged to form a modified output value for the selected specific property.

2. An automated real estate valuation system for a selected property according to claim 1 further comprising programming instructions for the use of an adjacent tract of land in addition to the specific tract of land when there is a failure to locate at least a predefined number of recently sold properties, then the adjacent tract of land is used to find an adjacent selected number of additional recently sold properties wherein criterion for determining that the adjacent tract of land is qualified is that the adjacent tract of land must be in contact with at least a portion of the specific tract of land, wherein the first qualified assemblage further comprises the adjacent selected number of additional recently sold properties.

3. An automated real estate valuation system for a selected property according to claim 2 further comprising programming instructions for the use of a nearby tract of land in addition to the adjacent tract of land and said specific tract of land when the instructions fail to locate at least the predefined number of recently sold properties that are disposed within the adjacent tract of land, then the nearby tract of land is used to find additional recently sold properties to meet the predefined number of recently sold properties, criterion for determining that the nearby tract of land is qualified; is that said nearby tract of land must be in the same county as said specific tract of land and within a selected population density of the specific tract of land, wherein the first qualified assemblage further comprises the adjacent selected number of additional recently sold properties of the nearby tract of land.

4. An automated real estate valuation system for a selected property according to claim 1 further comprising programming instructions to add properties under a sales contract to the recently sold properties, wherein the properties under contract are all disposed within the specific tract of land, a contract price is substituted for a sales price, and each property under contract includes an input data set and a secondary token feature set, wherein the properties under contract are combined with the recently sold properties to eventually output the calculated value for the selected property.

5. An automated real estate valuation system for a selected property according to claim 1 further comprising programming instructions to add actively listed properties to the recently sold properties, wherein the actively listed properties are all disposed within the specific tract of land, a list price is substituted for a sales price, and each actively listed properties include an input data set and a secondary token feature set, wherein the actively listed properties are combined with the recently sold properties to eventually output the calculated value for the selected property.

6. An automated real estate valuation system for a selected property according to claim 1 wherein the first matched item is a building style that is selected from the group consisting essentially of ranch, multi-story, bi-level, split-level, tri-level, patio home, town house, condo, row house, loft, and apartment.

7. An automated real estate valuation system for a selected property according to claim 6 wherein the second matched item is building square footage.

8. An automated real estate valuation system for a selected property according to claim 7 wherein the step (e)(i) further comprises a fourth matched item of a property lot square footage to be within an eighth selected range from the input data sets to form the first qualified assemblage.

9. An automated real estate valuation system for a selected property according to claim 8 wherein the third matched feature is a sold price per square foot for each recently sold property, resulting in a varied grouping being a range of sold prices per square foot for all properties in the first qualified assemblage, wherein a curve is generated with the sold prices per square foot going from low to high on an "Y" axis and a "X" axis showing a cumulative number of properties, wherein the curve is parsed into a plurality of factions that are determined by where there is a clustering of the sold prices per square foot about a faction centroid sold price per square foot, wherein a faction represents one or more recently sold properties, the secondary token feature sets that are associated with the properties in each the faction are congregated in each the faction, wherein as between each the faction that is adjoining common secondary token features are removed and each of a remaining group of first qualified secondary token features set are as between two the adjoining factions having the weighted ranking are used to explain differences in the sold prices per square foot via the valuation computation.

* * * * *